US007689497B2

(12) United States Patent
May

(10) Patent No.: US 7,689,497 B2
(45) Date of Patent: Mar. 30, 2010

(54) SWITCH ENGINE FOR RISK POSITION DISCOVERY IN AN ELECTRONIC TRADING SYSTEM

(75) Inventor: R. Raymond May, Mathews, NC (US)

(73) Assignee: Blackbird Holdings, Inc., Charlotte, NC (US)

( * ) Notice: Subject to any disclaimer, the term of this patent is extended or adjusted under 35 U.S.C. 154(b) by 1741 days.

(21) Appl. No.: 10/377,254

(22) Filed: Feb. 28, 2003

(65) Prior Publication Data

US 2004/0015430 A1    Jan. 22, 2004

Related U.S. Application Data

(63) Continuation of application No. 09/169,879, filed on Oct. 12, 1998, now abandoned.

(60) Provisional application No. 60/062,410, filed on Oct. 14, 1997.

(51) Int. Cl.
 *G06Q 40/00* (2006.01)
(52) U.S. Cl. .................................... 705/37; 705/36 R
(58) Field of Classification Search ............. 705/35–37
 See application file for complete search history.

(56) References Cited

U.S. PATENT DOCUMENTS

| 3,573,747 A | 4/1971 | Adams et al. |
| 3,581,072 A | 5/1971 | Nymeyer |
| 4,674,044 A | 6/1987 | Kaimus et al. |
| 4,677,552 A | 6/1987 | Sibley, Jr. |
| 4,799,156 A | 1/1989 | Shavit et al. |
| 4,903,201 A | 2/1990 | Wagner |
| 4,953,085 A | 8/1990 | Atkins |
| 4,980,826 A | 12/1990 | Wagner |
| 5,003,473 A | 3/1991 | Richards |
| 5,077,665 A | 12/1991 | Silvermann et al. |

(Continued)

FOREIGN PATENT DOCUMENTS

CH        675 982        11/1990

(Continued)

OTHER PUBLICATIONS

Higgens, *Managing the Risk of Your Global Bond Portfolio*, Journal, Apr. 1996, pp. 13-16, Issue 0951-3604, Global Investor.
Jerome Yen, Ho Geun, Lee and Tung Bui; *Intelligent Clearinghouse:Electronic Marketplace with Computer-Mediated Negotiation Supports*; Proceedings of the Twenty-Ninth Hawaii International Conference on System Sciences, Proceedings of HICSS-29; 29th Hawaii International conference on System Sciences, Wailea, HI, US, Jan. 3-6, 1996; pp. 219-2217, vol. 3: XP002097382 ISBN 0-8186-7330-3, 1996; Los Alamitos, California, IEEE Computer Soc. Press.

(Continued)

*Primary Examiner*—Charles R Kyle
*Assistant Examiner*—Seth Weis
(74) *Attorney, Agent, or Firm*—Alston & Bird LLP

(57) ABSTRACT

A switch engine module receives interest rate risk portfolios from a plurality of traders, and for each prospective trader, provides available switches based on positions in other counterparty portfolios that offset the viewing traders' positions. The offsetting positions are encoded with credit preference information in order to identify eligible trades based on both counterparties credit preferences. Another embodiment provides for a switch auction whereby users can use an auction process to trade for forward rate agreement switches with other counterparties. In the switch auction, the price is predetermined by the system prior to the auction so that parties can opt out of the transaction if desired. The credit preferences of the participating traders are taken in consideration in making matches.

36 Claims, 33 Drawing Sheets

U.S. PATENT DOCUMENTS

| | | | |
|---|---|---|---|
| 5,101,353 | A | 3/1992 | Lupien et al. |
| 5,126,936 | A | 6/1992 | Champion et al. |
| 5,136,501 | A | 8/1992 | Silverman et al. |
| 5,168,446 | A | 12/1992 | Wiseman |
| 5,193,056 | A | 3/1993 | Boes |
| 5,258,908 | A | 11/1993 | Hartheimer et al. |
| 5,270,922 | A | 12/1993 | Higgins |
| 5,285,383 | A | 2/1994 | Lindsey et al. |
| 5,297,031 | A | 3/1994 | Gutterman et al. |
| 5,375,055 | A | 12/1994 | Togher et al. |
| 5,396,552 | A | 3/1995 | Jahn et al. |
| 5,446,885 | A | 8/1995 | Moore et al. |
| 5,517,406 | A | 5/1996 | Harris et al. |
| 5,557,517 | A | 9/1996 | Daughterty, III |
| 5,594,639 | A | 1/1997 | Atsumi |
| 5,630,127 | A | 5/1997 | Moore et al. |
| 5,644,727 | A | 7/1997 | Atkins |
| 5,727,165 | A | 3/1998 | Ordish et al. |
| 5,732,400 | A | 3/1998 | Mandler et al. |
| 5,794,207 | A | 8/1998 | Walker et al. |
| 5,794,219 | A | 8/1998 | Brown |
| 5,799,287 | A | 8/1998 | Dembo |
| 5,802,499 | A | 9/1998 | Sampson et al. |
| 5,812,988 | A | 9/1998 | Sandretto |
| 5,819,237 | A | 10/1998 | Garman |
| 5,835,896 | A | 11/1998 | Fisher et al. |
| 5,845,266 | A | 12/1998 | Lupien et al. |
| 5,873,071 | A | 2/1999 | Ferstenberg et al. |
| 5,905,974 | A | 5/1999 | Fraser et al. |
| 5,915,209 | A | 6/1999 | Lawrence |
| 5,924,082 | A | 7/1999 | Silverman et al. |
| 5,924,083 | A | 7/1999 | Silverman et al. |
| 5,940,810 | A | 8/1999 | Traub et al. |
| 5,950,175 | A | 9/1999 | Austin |
| 5,950,176 | A | 9/1999 | Keiser et al. |
| 5,963,923 | A | 10/1999 | Garber |
| 5,970,479 | A | 10/1999 | Shepherd |
| 5,982,891 | A | 11/1999 | Ginter et al. |
| 6,012,046 | A | 1/2000 | Lupien et al. |
| 6,014,627 | A | 1/2000 | Togher et al. |
| 6,014,643 | A | 1/2000 | Minton |
| 6,029,146 | A | 2/2000 | Hawkins et al. |
| 6,098,051 | A | 8/2000 | Lupien et al. |
| 6,134,536 | A | 10/2000 | Shepherd |
| 6,134,600 | A | 10/2000 | Liu |
| 6,157,918 | A | 12/2000 | Shepherd |
| 6,161,099 | A | 12/2000 | Harrington et al. |
| 6,195,647 | B1 | 2/2001 | Martyn et al. |
| 6,260,025 | B1 | 7/2001 | Silverman et al. |
| 6,282,521 | B1 | 8/2001 | Howorka |
| 6,321,212 | B1 | 11/2001 | Lange |
| 6,362,838 | B1 | 3/2002 | Szlam et al. |
| 6,421,653 | B1 | 7/2002 | May |
| 6,629,082 | B1 | 9/2003 | Hambrecht et al. |
| 6,850,907 | B2 | 2/2005 | Lutnick et al. |
| 6,912,510 | B1 | 6/2005 | Shepherd |
| 6,963,856 | B2 | 11/2005 | Lutnick et al. |
| 6,996,540 | B1 | 2/2006 | May |
| 2005/0160032 | A1 | 7/2005 | Lutnick et al. |
| 2006/0059082 | A1 | 3/2006 | Silverman et al. |

FOREIGN PATENT DOCUMENTS

| | | | |
|---|---|---|---|
| EP | 0 399 850 | A2 | 11/1990 |
| EP | 0 407 026 | A2 | 1/1991 |
| EP | 0 411 748 | A2 | 2/1991 |
| EP | 0 512 702 | A2 | 4/1992 |
| EP | 0 647 866 | | 4/1995 |
| EP | 0 790 568 | A1 | 8/1997 |
| EP | 1 049 037 | A2 | 11/2000 |
| EP | 1 072 990 | A2 | 1/2001 |
| WO | WO 95 06918 | A | 3/1995 |
| WO | WO 96 05563 | A | 2/1996 |
| WO | WO 96 34357 | A | 10/1996 |
| WO | WO 97 03409 | A | 1/1997 |
| WO | WO 98 43121 | | 10/1998 |
| WO | WO 99/19821 | | 4/1999 |
| WO | WO 01/52091 | A2 | 7/2001 |

OTHER PUBLICATIONS

Avanzato, *How to Use the Collateral Carousel*, International Finance Law Review, v. 17, pp. 29-32, Jan. 1998.

Ludwig, *Supervision by Risk*, Journal of Commercial Lending, v. 78, p. 52-60, Nov. 1995; Dialog file 268, Accession No. 00274059.

*Derivatives Tool Merger*, C.ATS Software Inc..; LOR/Geske Bock Associates Inc., Software Industry Report, v. 28, No. 4, p. 4(1), Dialog file 148, Accession No. 08536443; Feb. 19, 1996.

Maguire, *Details on Derivatives: AIG Breaks Down Exposure by Industry*, Insurance Accountant, Jul. 13, 1994, p. 1, vol. 4, No. 23.

Track Data Corporation, *TDS Symbology Guide*, Googles.

Capeci, John; *Credit Risk, Credit Ratings, and Municipal Bond Yields: A Panel Study*; Proc. of Conf. on the Tax-Exempt Bond Market, National Tax Journal, vol. 44, No. 4, Dec. 1991; 11 pages.

Brady, Simon; *Bond Futures*, Euromoney Supplement, p. 3-4, Jun. 1992; 4 pages.

Neal, Robert; *Credit Derivatives: New Financial Instruments for Controlling Credit Risk*, Economic Review, vol. 81, No. 2, pp. 15-27, Second Quarter 1996; 11 pages.

Kojima, J. Christopher; *Product-Based Solutions to Financial Innovation: The Promise and Danger of Applying the Federal Securities Laws to OTC Derivatives (Over-The-Counter)*, Amer. Bus. Law. J., vol. 33, No. 2, Winter 1995; 54 pages.

Mark Parsley; *Credit Derivatives Get Cracking*; Euromoney n323; Mar. 1996; 12 pages.

Keiran Higgins; *Managing the Risk of Your Global Bond Portfolio*; Global Investor; Apr. 1996; 8 pages; ISSN 0951-3604.

Insurance Regulator; *AIG Breaks Down Exposure by Industry*; Jun. 1994; vol. 4, No. 23; 2 pages.

Simon Hotchin, Paul Dentskevich; *The Risk-Based Way to Asset Valuation*; Corporate Finance Risk Management & Derivatives Yearbook; Apr. 1996; 5 pages.

Peter Heap; *Inside Derivatives: Policies, $300 Million give Sumitomo Unit Triple-A Safety*; The Bond Buyer; Apr. 1995; 2 pages; vol. 313, No. 29326.

Carol Loomis; *The Risk that Won't Go Away (Financial Derivatives0*; Fortune; Mar. 1994; vol. 129, No. 5.

Bret D. Fromson; *Wall Street's Risky Bets Derivatives are Popular, Profitable and to Many a Big Danger to Markets*; The Washington Post; Oct. 1993;Final Edition.

Arthur Rabatin; *Adaptive Portfolio Trading Strategies for Forex Portfolios*; Working Papers in Financial Economics; 1997; 11 pages; Issue 4.

Mary Ann Burns; *Opportunity Knocks*; Futures Industry Magazine; Apr./May 2000; 6 pages; Futures Industry Association.

<http://www.marketcenter.com/search/symhelp.jsp.>; 2006; 6 pages.

*Parity* Trademark History; Aug. 25, 1992; 31 pages.

*Principles for the Management of Interest Rate Risk*; Basic Committee on Banking Supervision; Sep. 1997; 39 pages.

Triple Point Technology; *Real-Time Position Management in Today's Power Markets*; 8 pages; available at <www.tpt.com>.

Description of Forward Rate Agreement; 4 pages.

Form 10-K; Investment Technology Group Inc.—ITG; Mar. 2002; 70 pages; 10k Wizard SEC Power Search.

Eli M. Remolona et al.; *Risk Management by Structured Derivative Product Companies*; Economic Policy Review; Apr. 1996; 19 pages.

Bruce W. Weber; *Information Technology in the Major International Financial Markets*; Apr. 1993; 45 pages; Working Paper IS-93-12; Center for Digital Economy Research.

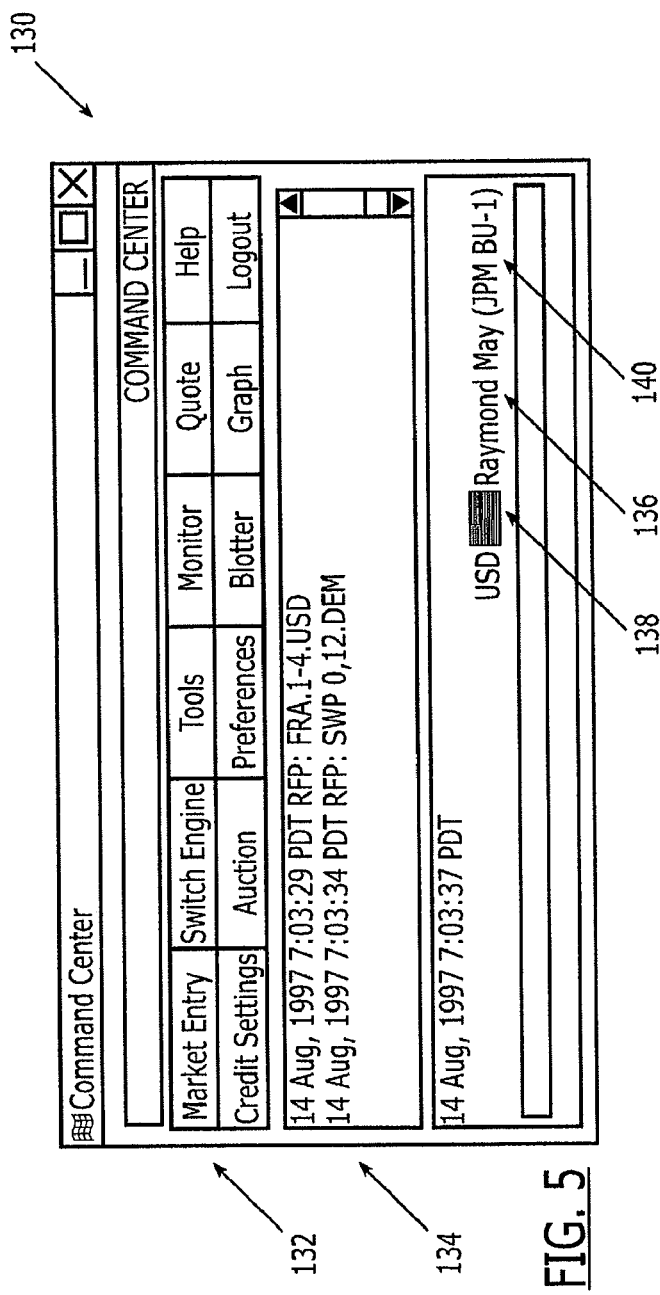

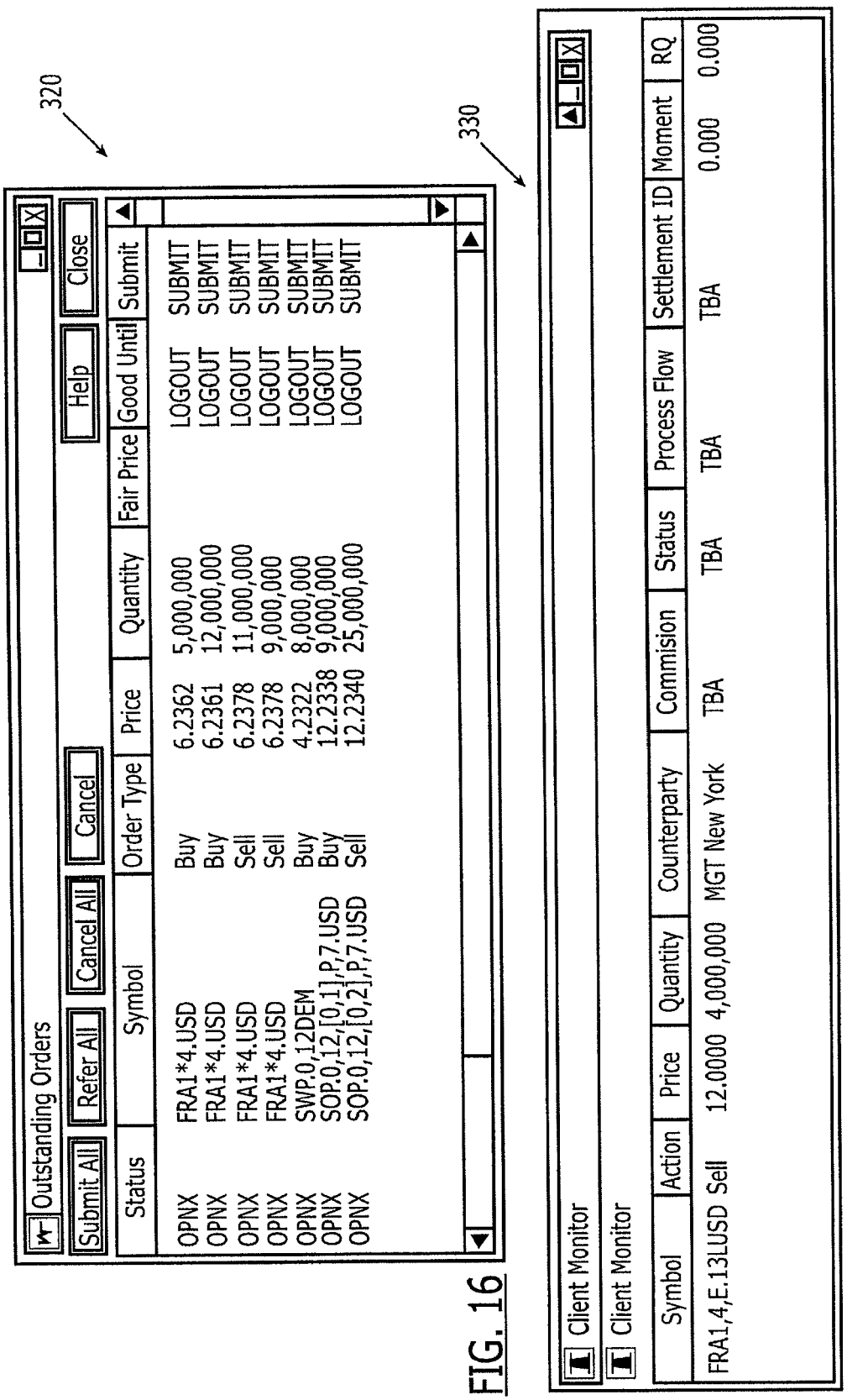

| Switch Auction | | |
|---|---|---|
| Flopt-CCY | Flopt-CCY | FIVE TILL |
| 1L-USD | 3L-USD | PENDING |
| | 6L-USD | PENDING |
| | 1C-CAD | PENDING |
| | 3C-CAD | PENDING |

| ID:SWAUSD1L1 Open:5:31 AM Close: 5:37 AM ||||
|---|---|---|---|
| Date | Position | Results | Rate |
| Thu, May 7 | 100.0 | 0.0 | |
| Fri, May 8 | -100.0 | 0.0 | |
| Mon, May 11 | 150.0 | 0.0 | |
| Tue, May 12 | 200.0 | 0.0 | |
| Wed, May 13 | -250.0 | 0.0 | |
| Thu, May 14 | 0.0 | 0.0 | |
| Fri, May 15 | 0.0 | 0.0 | |
| Mon, May 18 | 0.0 | 0.0 | |
| Tue, May 19 | 0.0 | 0.0 | |

FIG. 22B

SWITCH ENGINE FOR RISK POSITION DISCOVERY IN AN ELECTRONIC TRADING SYSTEM

CROSS-REFERENCE TO RELATED APPLICATIONS

This application is related to, and is a continuation of U.S. patent application Ser. No. 09/169,879, filed Oct. 12, 1998 now abandoned, which is hereby incorporated herein in its entirety by reference. U.S. patent application Ser. No. 09/169,879 claims benefit of abandoned U.S. Provisional Application No. 60/062,410 filed Oct. 14, 1997. In addition, the present application is related to the following U.S. applications, each of which is incorporated by reference as if set forth in full:

"Systems, Methods And Computer Program Products For Electronic Trading Of Financial Instruments," filed Oct. 12, 1998, and accorded application Ser. No. 09/169,906;

"Systems, Methods And Computer Program Products For Monitoring Credit Risks In Electronic Trading Systems," filed Oct. 12, 1998, and accorded application Ser. No. 09/169,878; and "Systems, Methods And Computer Program Products For Subject-Based Addressing In An Electronic Trading System," filed Oct. 12, 1998, and accorded application Ser. No. 09/169,767 (abandoned).

FIELD OF THE INVENTION

The present invention generally relates to brokerage systems and methods, and more particularly, to risk position assessment in an electronic trading system.

BACKGROUND OF THE INVENTION

In recent years, commodity exchanges have become more and more dependent upon electronic trading systems. The older manual methods by which trades were conducted have given way to advanced computer systems that have generally mimicked the manual methods of old. These relatively new electronic trading systems have many advantages over the manual systems, including the ability to provide such features as greater accuracy, reduced labor cost, real time market information, more efficient communications over greater distances, and automated record keeping. However, because the markets in which these commodities are being traded are so vastly different from the descriptions of the instruments to transaction methodologies, electronic trading systems are generally limited to a specific market such as futures, cash, oil, stock, securities, etc., and sometimes even to a specific commodity within a single market.

An example of one such automated trading system designed for the anonymous trading of foreign currencies is described in U.S. Pat. Nos. 5,077,665 and 5,136,501, both issued to Silverman et al. and assigned to Reuters Limited of London. In the Silverman et al. system, a single central host computer maintains a central data base that may consist of the trading instruments available for trade, credit information, and various bids and offers that are present throughout the system. The host computer may then use this information to match active bids and offers based on matching criteria which may include the gross counterparty credit limit between counterparties to a potential matching transaction, price, and available quantity. To that end, each client site may establish, and may subsequently vary or reset, a credit limit for each possible counterparty. The credit limits may be used by the host computer to establish the gross counterparty credit limit for each possible pair of parties and which may be equal to the minimum of the remaining credit (i.e., initial credit limit less any applicable transactions that have already been executed) from a first party to a second party and from the second party to the first party. The host computer may block completion of an otherwise eligible matching transaction between a given pair of potential counterparties when the transaction has an associated value in excess of the applicable gross credit limit. In the Silverman et al. system, the various client site computers (also referred to as keystations) merely maintain and display a restricted subset of the information available at the host computer such as a predetermined number of the best bids and offers, and communicate credit and other transaction orientated information to the host computer for execution. However, in an attempt to preserve the anonymity of the parties, the client sites may not have access to the credit limits set by their possible counterparties, or even to the identification of any other party to a particular transaction until after a transaction has been completed.

Thus, in the Silverman et al. system, confidential counterparty credit limit data is apparently maintained and utilized as part of the trade matching process by the central host computer. As a consequence, each client site may not have the ability to determine, prior to committing to buy or sell at a displayed price from one or more anonymous counterparties, whether it is in fact eligible to respond to any of the bids or offers currently being displayed. Further, the credit limit appears to be merely a cap value (or credit line) on the amount of trading one party will enter into with another party. It has little to no relationship to the credit risk the other party represents since the financial commitment associated with the financial instruments traded with this system ends at the consummation of the underlying contract. Thus, a cap value may be sufficient in this particular circumstance. The central host computer may not utilize the credit information until after a match has been found between counterparties to determine if the counterparties have sufficient credit with one another to execute the trade.

Consequently, unless a trader attempts to execute a trade at the best price currently displayed on the trader's screen, the trader using one of the anonymous matching systems may not know whether the trader has credit with, and is willing to extend credit to, the anonymous counterparty offering (i.e., bidding) the best price currently displayed on the trader's screen. Thus, the trader does not know whether any attempt to buy or sell at the displayed price may be subsequently invalidated by the system for lack of such credit. The Silverman et al. system also fails to provide for dialogue between the parties, much less anonymous dialogue which may facilitate the execution of a trade that might otherwise not occur.

Another automated trading system is disclosed in U.S. Pat. No. 5,375,055 issued to Togher et al. and assigned to Foreign Exchange Transaction Services, Inc. The Togher et al. system is an anonymous trading system which may identify the best bids and offers from those counterparties with which each client site is currently eligible to deal, while maintaining the anonymity of the potential counterparty and the confidentiality of any specific credit limitations imposed by the anonymous potential counterparty. This system is apparently designed to run as a closed system, with dedicated desk top terminals connected to various local computer centers which are in turn connected to regional computers.

In the Togher et al. system, each client site may only be able to view one foreign currency at a time per screen. The Togher et al. system is further limited by the fact that each client site may provide the system with only limited credit information for each potential counterparty (for example, a one bit flag indicating whether a predetermined limit has already been exceeded), and by the fact that each bid or offer for a particular type of financial instrument is apparently prescreened by the system for compatibility with that limited credit information before calculating an anonymous dealable price for presentation to the traders dealing with that particular financial instrument. The prescreening in Togher et al. is a simple check to determine whether any credit remains between the two counterparties to the potential transaction, and thus may be performed using a simple yes/no preauthorization.

The preauthorization matrixes may be maintained at each of the several regional nodes (also referred to as distributed nodes) of a distributed processing communication network, with each such regional node being connected by corresponding individual links of the communications network to the respective client sites ("access nodes") for which it is responsible for distributing market information including customized dealable bid and offer prices and global best prices.

The sensitive credit limit data indicating how much credit a particular client site is willing to extend to each possible counterparty is preferably maintained at an access node associated with that particular client, and a simple yes/no indication of whether the entity (for example, a trader, a trading floor, or a bank) associated with that particular client site is willing to transact business with a particular counterparty is transmitted to the other nodes of the communications network.

To further limit the data received and processed by each of the relevant regional node computers, (i.e., the regional nodes closest to the particular site and/or closest to the particular counterparty), merely the changes in the credit state between a particular client site and a particular counterparty (i.e., that credit is no longer available or credit is now available) may be transmitted to the distribution nodes, and any credit state information relevant to transactions between two client sites both associated with other distribution nodes may be altogether ignored.

In the Togher et al. system, if either of the two applicable credit limits has not previously been exceeded between a particular pair of counterparties, then the system displays the entire bid or offer as a dealable transaction, but apparently permits each client site to block any above-limit portion of any resultant buy or sell transaction during a subsequent deal execution/verification process. This may, however, add additional time consuming steps for the users of the Togher et al. system. Alternatively, possibly at the option of the party by or for whom the low limit has been set, the entire transaction may be blocked. As a second alternative, a preauthorization matrix may indicate whether sufficient credit remains to execute a predetermined standard deal amount in addition to, or instead of, a mere indication as to whether any credit from a particular potential counterparty had already been used up. In such an alternate embodiment of the Togher et al. system, it might also be possible to display to each trader two dealable prices: one at which at least the predetermined standard amount is available, and a second one at which only a small amount may be available. Thus, individual orders are not independently treated, and the user may not have the ability to look through the bids and offers and deal at a worst price, if the user so chooses because of a difference in counterparties credit qualities.

In accordance with another aspect of the Togher et al. system, at least a first trader having an open quote that is displayable as the best dealable or regular dealable quote at any of the other trading floors is automatically alerted that their bid (offer) quotation is the best price available to at least one potential counterparty with whom mutual credit exists, and thus could be hit (taken) at any time. Similarly, at least if the quoter's bid (offer) quote is not currently the best with at least one trading floor but is thus subject to immediately being hit (taken) by a trader at that trading floor, then the quoter is preferably also alerted if his/her quote is joined (i.e., equal to in price, but later in time) to such a best dealable or regular dealable price from another trading floor. In other words, in the Togher et al. system, the auto-matching process does not enable the active trader to select a price other than the best price to trade. This may force the trader to accept what the system offers, even if the trader would prefer a different counterparty for credit reasons. In addition, the Togher et al. system does not show the trader the total depth of the market, only those prices which are dealable, and thus, may fail to give the trader complete picture of the market. The is also limited to the quantity stated. No provision is made for the modification or negotiation of the quantity or other terms of the trade.

The systems described above are such that they focus on overnight settlement risk. These systems are apparently incapable of dealing with the actual credit requirements of a variety of different individual financial instruments simultaneously and the counterparty's long-term ability to meet these requirements. As a result, these systems have generally only been deployed in the markets where settlement takes place in a few days and there are no continuous or ongoing credit requirements between the counterparties. Specifically, as a result of these limitations, these designs may not be able to handle the anonymous trading of financial instruments such as interest rate swaps, caps and many other financial products. They may be unable to accommodate these more complex financial instruments because, among other things, these systems apparently treat all financial instruments alike, and therefore, may be incapable of handling more complex financial instruments which require a judgment about the financial strength of the opposing counterparties. Trades conducted with some financial instruments such as derivatives create multi-year financial commitments, and therefore, mere credit limit or credit cap systems are insufficient means for measuring and managing an institution's credit risk.

Accordingly, it is noted that no known system is designed to operate with derivative products such as interest rate swaps, caps, floors, forward rate agreements (FRA), interest rate basis swaps, interest rate options, switches, or other over-the-counter derivative instruments. Derivatives are considered by many to be too complex to be efficiently handled within an electronic trading system. Particularly, derivative products are typically define by certain terms and conditions, and each of the different types of derivatives products are defined by a different set of terms and conditions. For example, an FRA is defined by a start time, an end time, an over date, and a floating rate option, while an interest rate swap is defined by a start time, an end time, an over date, a floating rate option, a frequency of the fixed coupons, a basis, and a special rule(s) as applicable with some currencies. Accordingly, the variances in the specific information necessary to adequately define the different derivative products has apparently been a deterrence to the development of an electronic derivatives trading system.

Yet another deterrence is the difficulty of determining a trader's position (i.e., interest risk position), and then identifying potential counterparties with offsetting positions for initiating a transaction. No known electronic trading system has been able to do this on a real-time basis. In particular, a large new market has recently emerged as a result of interest rate swap dealer's needing to better manage the risk associated with changes in interest rates on their Interest Rate Swap portfolios. As these markets have become more competitive, and the bid-offer spreads have narrowed considerably. This factored with the wide spreads of exchange traded Eurodollar futures has made the use of exchange traded contracts for hedging short-term risks expensive and sub-optimal. As a result, the switch was created. A switch is simply the simultaneous purchase and sale of a pair of similar Forward Rate Agreements. This instrument along with the mutually offsetting needs of derivative portfolio risk managers provides a perfect risk management tool for a large portfolio of Interest Rate Swaps.

Despite the obvious advantages and demand from risk managers, the complexity and time consuming nature of completing a transaction has resulted in this market growing rather slowly. Risk managers are generally very wary of disclosing the exact nature and size of their own portfolios. Therefore, finding a counterparty that has an opposite need is often difficult. It is a time consuming and costly task to collect the market information needed to determine a specific trader's own position within the market, much less to be able to identify potential counterparties with offsetting positions. This is currently done manually by voice brokers who prepare and send faxes listing days that a client needs to buy or sell, but the amount or importance of any date is not provided. This fax goes to other voice brokers and institutions and begins a process which involves multiple faxes sent back and forth until a deal is finally negotiated. This deficiency of the prior art systems strikes to the essence of the derivatives market which is based upon large financial institutions to being able to manage their credit risk on a daily basis.

Yet another deterrence is the need to account for the credit risk in derivative trading. In many of the current electronic trading systems, buy and sell requests can be automatically matched without taking the credit risk of the counterparties into account because the counterparties are free from future financial commitments once the deal is consummated. However, in derivative trading, counterparties may incur a multi-year financial commitment. Thus, any system that automatically matches offers and bids without consideration of credit risk would be untrustworthy and inadequate from the perspective of a trader.

Thus, a heretofore unresolved need exist in the industry for an electronic trading system that automatically discovers the credit risk position of a trader for use in matching the trader with other traders having offsetting credit risk positions.

SUMMARY OF THE INVENTION

It is therefore an object of the present invention to provide an improved method for determining the risk position of a trader in an electronic trading system.

It is another object of the present invention to provide interest rate risk position information to a trader based upon an inputted portfolio in order to determine potentially offsetting interest rate risk positions of other counterparties.

It is another object of the present invention to provide complex position discovery for trading similar or tangible derivative instruments taking credit preferences of the traders into account.

These and other objects are provided for a switch engine module which receives interest rate risk portfolios from a plurality of traders, and for each prospective trader, provides available switches based on positions in other counterparty portfolios that offset the viewing traders' positions. The offsetting positions are encoded with credit preference information in order to identify eligible trades based on both counterparties credit preferences. Whereas switch position discovery is often a labor intensive and expensive task, it is now performed virtually instantaneously by the switch engine module of the present invention. Further, an embodiment of the present invention provides for a switch auction whereby users can use an auction process to trade for forward rate agreement switches with other counterparties. In the switch auction, the price is predetermined by the system prior to the auction so that parties can opt out of the transaction if desired. The credit preferences of the participating traders are taken in consideration in making matches.

In accordance with an aspect of the present invention, a system for risk portfolio management that enables switches between traders comprises means for receiving risk position portfolios inputted by the respective traders, means for calculating relative positions for each of the risk position portfolios inputted by respective traders, and means for presenting the relative positions to the respective traders. The risk position portfolios may be defined in terms of rate index and currency. The means for presenting may present to a first trader at least one possible switch combination with a second trader based on the respective risk position portfolios inputted by the first and second traders. The means for presenting may also present to the first trader at least one offsetting position in the risk position portfolio of the first trader which corresponds with a position in the risk position portfolio of the second trader.

The offsetting position may be visually encoded to reflect trade eligibility based on credit preferences of the first and second trader when presented to the first trader. The means for receiving may comprise means for uploading risk position portfolio data by file transfer. The system may further include means for updating the risk position portfolio in substantially real-time. The risk position portfolios may comprise interest rate reset risk, which may includes size and direction data. The risk position portfolio may include position data for at least 90 days forward.

In accordance with another aspect of the present invention, a system for performing a switch auction utilizing risk position portfolios inputted by at least a first trader and a second trader comprises means for receiving risk position portfolios inputted by the respective first and second traders, means for calculating relative risk positions for the first and second traders, means for determining an auction price, and means for matching offsetting risk positions of the first and second traders based on credit preferences of the first and second traders. Further, the system may include means for presenting the respective relative risk positions to the first and second traders.

The means for determining an auction price calculates the average auction price entered by the first and second traders. The means for matching offsetting risk positions selects matches between offsetting positions so that a minimum number of matches are made. The system may further comprise means for generating a confirmation notice for confining a match of offsetting risk positions.

In accordance with another aspect of the present invention, a method for risk portfolio management utilizing an electronic trading system that enables switches, wherein the electronic trading system includes a plurality of traders operationally connected, the method comprising the steps of receiving a risk position portfolio from at least a first trader and a second trader from the plurality of traders, and calculating relative risk positions of each risk position portfolio received from the first and second traders. The method may further include the steps of matching offsetting relative risk positions of the first and second traders, thereby executing a switch, and updating the risk position portfolios of the fist and second traders based on the executed switch. The method may further comprise means for generating a confirmation notice for confirming a switch of offsetting risk positions.

BRIEF DESCRIPTION OF THE DRAWINGS

The file of this patent contains at least one drawing executed in color. Copies of this patent with color drawings will be provided by the Patent and Trademark Office upon request and payment of the necessary fee.

FIG. 5 is an example of a command center interface.

FIGS. 6A-6B are examples of different tabbed partitions of a user preference interface.

FIG. 16 is an example of an outstanding order blotter interface.

FIG. 17 is an example of a client monitor interface.

FIGS. 22A and 22B are examples of an auction interface and a switch auction interface, respectively.

DETAILED DESCRIPTION OF THE PREFERRED EMBODIMENTS

Figure 1:
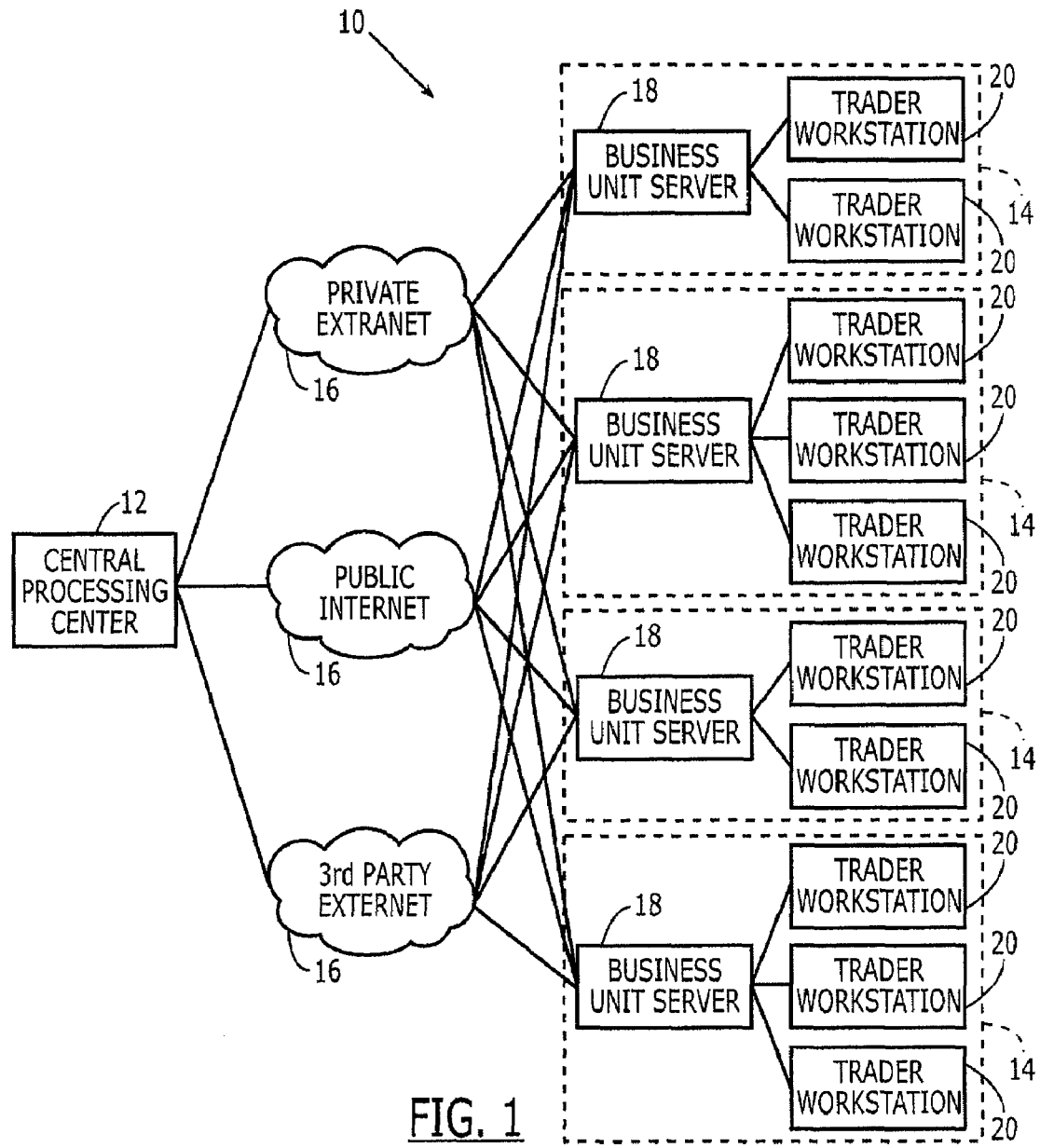
FIG. 1 is a schematic diagram of a computer network implementing an electronic trading system in accordance with an embodiment of the present invention.

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

I. Introduction

The following description is of a best-contemplated mode of carrying out the present invention. The systems, methods, and computer program products of the present invention have practical application in anonymously trading a very broad cross-section of credit-sensitive, bilateral financial instruments. However, a particular application of the present invention described hereinafter is directed to the use of the present invention for trading financial instruments in the derivatives market. The scope of the present invention should not be limited to that described hereinafter, but should be determined by referencing the appended claims.

The present invention provides for a standardized contract definition, and means for matching complex credit preferences of each counterparty before a trade is executed. Therefore, potential counterparty users are able to identify bids and offers that they are eligible to trade based on credit preference information provided before initiating a trade. The present invention also permits users to place passive orders (bids or offers on the various financial products for other counterparties to actively choose from to hit (bids) or lift (offers), without the posting user doing anything further) or active orders (where the viewing user actively initiates the trade by selecting passive bids or offers which are already in the system). This gives a user maximum control over the order flow process. For instance, there may be a situation whereby the bids in a particular market are higher than the offers, but no trading is taking place. This situation may occur when the credit quality of the best offer (which in this case would be below the bid) would not be good enough for a bidder to be willing to enter into a transaction with that counterparty. This is a significant difference from the prior art systems in which orders are automatically matched if the prices are equal because such prior art systems typically limited the user's control over the order flow.

The present invention also provides financial markets with electronic trading systems and methods for identifying possible counterparties and executing trades for forward rate agreement (FRA) switches and other financial products. The present invention further provides the ability for the users to place orders for various financial instruments via an auction process that can be one-to-many or many-to-many, whereby the system automatically matches all orders and determines the prices and quantities executed on the basis of several guidelines or parameters. A further feature of the present invention is an auction trading that is available to users, whereby users can use an auction process to trade FRA switches with the other counterparties. This form of auction is referred to hereinafter as a switch auction. In the auctions, the price is preferably pre-determined by the system prior to the auction taking place. The prices determined by the system are referred to hereafter as the fair price.

The systems and methods of the present invention are designed to reflect the fact that financial institutions operate under many different structures. In order to accomplish this, the following concepts/definitions are provided:

Legal Entity (LE):
   This is the incorporated entity in which contracts are negotiated on behalf of by users (traders) of the system.

Business Unit (BU):
   This is a grouping of individual users within a Legal Entity that act together and share attributes such as LE, manager, address, settlement information, credit preferences (see below), etc.

Risk Equivalent (RQ):
   This is the unique measure of Risk associated with financial contracts such that contracts with different attributes can be compared on a like basis for credit risk purposes.

Credit Preferences (CP):
   This is the model which allows the system to handle different measures of risk equivalent used by different institutions and different financial contracts, all with different internal structures.

Classes of Financial Instruments (CL):
   These are collections of financial contracts which share similar attributes.

Credit Groups (CG):
   A method to allocate credit preferences across classes of financial contracts.

User Preferences (UP):
   A method to allow institutions or users to control or manage access to the functions within the system.

Filters (FI):
   These allow users to limit the messages (i.e., request for price or request for switch they receive or view.

Symbology (SY):
   This enables users to quickly and easily reference financial contracts within the system in a systematic manner.

Term Negotiation (TN):
   This is a method which allows users to negotiate non-commercial terms of contract subsequently to a trade. For example, the exchange of bonds relating to a spread trade.

Credit Over-Ride Process:
   This process enables a user to disclose his/her identity to a counterparty to see if they will accept a trade with him/her even though they initially refused him due to credit issues.

Comprehensive Confirmations:
   This is a confirmation lay-out in order to fully define bilateral contracts across any classes of financial instruments.

Request For (RF)
   This is a method to broadcast to the other users (subject to their FI) an interest in a price or market.

II. System Architecture

As will be appreciated by one of ordinary skill in the art, the present invention may be embodied as a method, a data processing system, or a computer program product. Accordingly, the present invention may take the form of an entirely hardware embodiment, an entirely software embodiment or an embodiment combining software and hardware aspects. Furthermore, the present invention may take the form of a computer program product on a computer-readable storage medium having computer-readable program code means embodied in the storage medium. Any suitable computer readable storage medium may be utilized including hard disks, CD-ROMs, optical storage devices, or magnetic storage devices.

The present invention is described below with reference to block diagrams and flowchart illustrations of methods, apparatus (i.e., systems) and computer program products according to an embodiment of the invention. It will be understood that each block of the block diagrams and flowchart illustrations, and combinations of blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems which perform the specified functions or steps, or combinations of special purpose hardware and computer instructions.

A trading system in accordance with the present invention is an electronic brokerage system which may use Internet protocol-based communications networks for facilitating the trading (i.e., buying and selling) of financial derivatives by users, each of which is associated with the user's own desktop computer system (trader system) located on the trading floor of a financial institution (client site), as described below. At the user's desktop computer system, the present invention is preferably implemented by a Java-based software program, though other suitable program languages can be utilized such as dynamic hypertext markup language (DHTML), C+ or C++.

As shown in FIG. 1, a trading system 10 in accordance with the present invention comprises a central processing center 12 which is in communication with the client sites 14 via one or more of a variety of Internet protocol based networks 16. By way of illustration, a private extranet, a public Internet, and a third party extranet are shown, though it will be recognized by those skilled in the art that other networks such as the Public Switch Telephone Network (PSTN) may be implemented as a network 16. Further, by having multiple networks 16 available, the user is provided redundancy in case one network experiences a service interruption, and the user is able to choose between the several networks 16 for primary access based on factors such as toll charges or bandwidth.

Each client site 14 includes one or more business unit servers 18 which, among other things, can store copies of the Java applets which can be utilized to implement the present invention. The business unit servers 18 may also perform encryption/decryption functions for messages that are received and sent over the networks 16. The business unit servers 18 are preferably connected to the client sites 14 internal data network. Thus, one or more trader workstations 20 may be connected to a business unit server 18 of a client site 14. Accordingly, a user's own desktop computer which is connected to the client's internal data network may function as a trader workstation 20 and run the Java-based software of the present invention to enable interaction with other trader workstations 20 via the central processing center 12.

Figure 2:
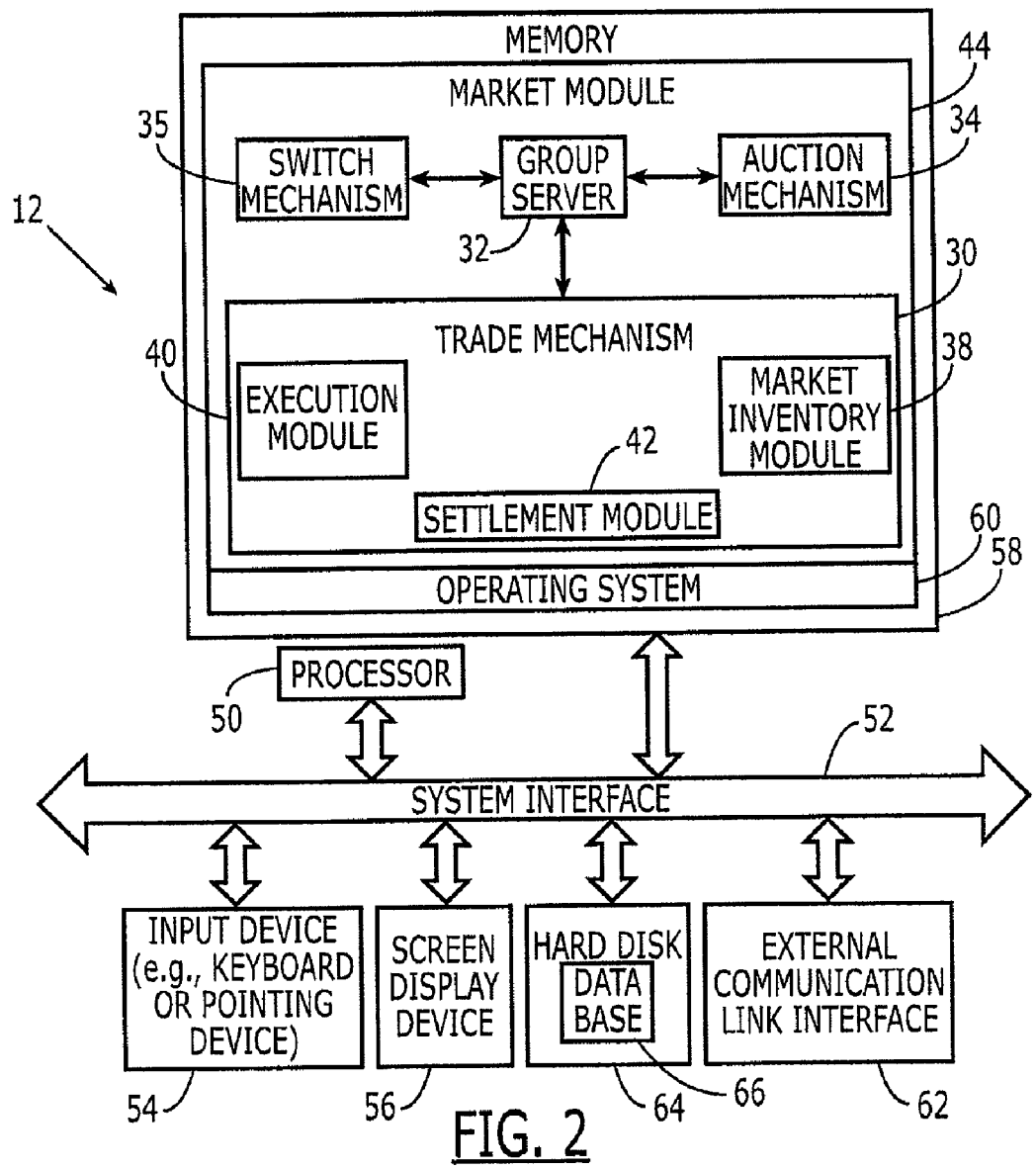
FIG. 2 is a block diagram illustrating the architecture and functionality of a central processing center in accordance with an embodiment of the present invention.

With reference to FIG. 2, illustrated is the central processing center 12 which includes a trade mechanism 30, a group server mechanism 32, auction mechanism 34, and a switch mechanism 35, all in accordance with the present invention. The trade mechanism 30 includes several modules including a market inventory module 38, an execution module 40, and a settlement module 42. The market inventory module 38 holds the passive orders for each market and broadcast the same to the trader workstations 20 when new orders are received, validates any proposed trade, performs a second and final credit preference check that cannot be performed at the trader workstation 20, validates that both traders are still on-line (i.e., active), executes the trade, and sends out a status update to the traders. The execution module 40 receives the executed trade and proposes a trade for a greater quantity if applicable (referred to as the will-do-more feature), and processes term negotiation if applicable. The settlement module 42 calculates the appropriate commission, generates the confirmation, and sends the confirmation to the two parties.

The group server mechanism 32 interfaces the trader module 30 with the trader workstations 20. The central processing center 12 may include a plurality of group server mechanisms 32, each of which preferably serves a subset of the users (i.e., trader workstations) of system 10, though the system 10 may be implemented with only one group server mechanism 32. The group server mechanism 32 monitors the connection of each trader workstation 20 so that log-in and log-out times and usage can be monitored. The group server mechanism 32 also caches market information being viewed at each trader workstation 20 and create an order identification code that uniquely identifies that order. The credit preference information of all users is cached in by the group server mechanism 32 for delivery to each trader workstation 20 when the associated user logs in. Any changes in the credit preference setting by a trader are detected and forwarded to the trader workstations 20 of the other users.

The switch mechanism 35 is configured to receive a portfolio of interest reset risk for a plurality of users and provide the users with an anonymous view at their relative position to other possible counterparties and available trades that may offset the user's interest rate reset risk. The auction mechanism 34 performs a switch auction function whereby orders or FRA's are received from the users and anonymously matched based on an algorithm that takes user credit preferences into consideration.

The trader mechanism 30, group server mechanism 32, auction mechanism 34, and switch mechanism 35 may be collectively implemented as market module 44.

The central processing center 12 includes a processor 50 that communicates with the other elements within the central processing center 12 via a system interface 52. An input device 54, for example a keyboard or a pointing device, is used to input data from a user, and a screen display device 56, for example, a monitor, is used to output data to the user. A memory 58 within a central processing center 12 includes the market module 44 and a conventional operating system 60 which communicates with the market module 44 and enables execution of the market module 44 (including the trade mechanism 30, group server mechanism 32, and auction mechanism 34) by processor 50. An external communication line 62 is provided to interface the central processing center 12 with other computer systems or computer-based devices such as networks 16. Lastly, a hard disk 64 may be provided as a persistence memory device, as well known to the industry. Preferably, a relational database 66 resides on the hard disk 64 for maintaining information such as current state information for each trader workstations 20, user and business unit data, financial instrument definitions, order states, transaction states, confirmation states, historical confirmation and transaction data, credit preferences of all business units, and historical market data. Preferably a relational database 66 is based on structured query language (SQL) management system, as well known in the industry.

Figure 3:
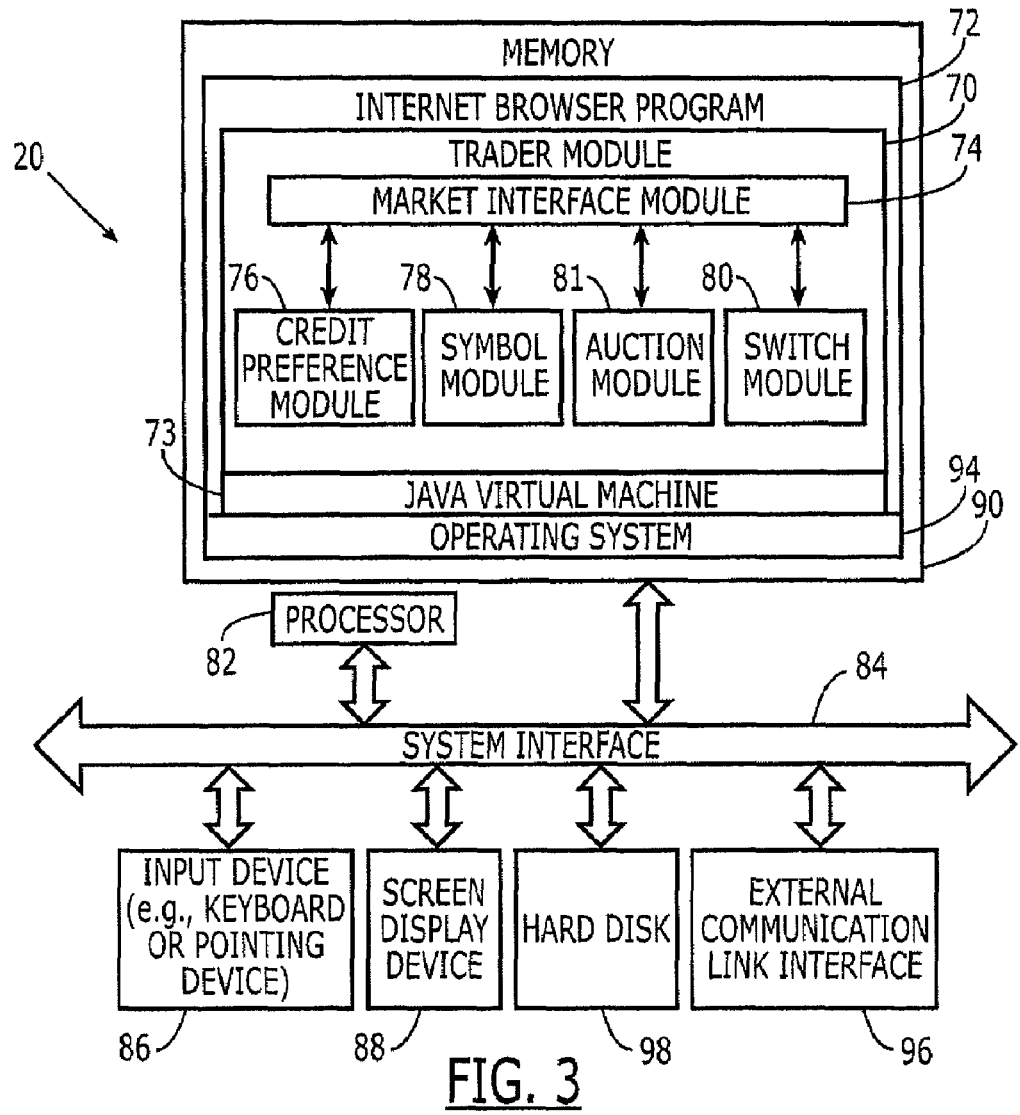
FIG. 3 is a block diagram illustrating the architecture and functionality of a trader system in accordance with an embodiment of the present invention.

With reference now to FIG. 3, illustrated is an embodiment of the trader workstations 20 which includes a trader module 70 in accordance with the present invention. The trader module 70 may be implemented as a component of a Java-capable, Internet browser program 72, such as Netscape Communicator® (Netscape Communication Company) or Microsoft® Internet Explorer (Microsoft Corporation) version 3.0 or higher. Thus, in a preferred embodiment, the trader module 70 is a Java-based program that is downloaded as Java applets for each session and implemented by a Java virtual machine (JVM) 73 within the Internet browser 72. The JVM 73 of the Internet browser program 72 may be a stand alone software application, a plug-in application, or a helper application, all of which is well known in the art. The trader module 70 includes a market interface module 74, a credit preference module 76, a symbol module 78, switch module 80, and an auction module 81. The market interface module 74 comprises one or more user interfaces for presenting information to the user. In the context of the present embodiment, a user interface is provided as a window within the context of the Internet browser program 72. However, a user interface in accordance with the present invention may take many forms such as a three dimensional virtual reality world based on virtual reality modeling language (VRML), an audio receiver/transmitter, or any other suitable form of interface between the user and trader workstations 20. In a preferred embodiment, the market interface module 74 comprises a control center interface, market entry interface, market detail interface, switch interface, and auction interface, all of which are described in more detail hereinafter.

The credit preference module 76 receives the stored credit preferences inputted by the user and stored at group server mechanism 32. The stored credit preferences include preferences directed to the other business unit's legal entities, and the preferences inputted by the other users directed toward the business unit's legal entity of the subject user. As mentioned above, the credit preference information is preferably stored in the database 66 (FIG. 2). The credit preference module 76 may encode the order information being presented to the user with the credit preferences of the user and the credit preferences of counterparty that posted the order. The credit preference module 76 also performs a credit preference check for each order when a trade is initiated. Because of the potential complexity associated with the different types of credit methods offered by the present invention, portions of the credit check process may be performed by the market inventory module 38 of the central processing center 12. The credit preference module 76 at each trader workstation 20 comprises a simplified matrix of yes's and no's, and associated maturities. If the business unit has selected an even more complex method (i.e., complex), a unit (such as a risk quotient, i.e., RQ) by maturity is also required. The trader workstation 20 will therefore not be able to determine whether the full quantity can be traded. Thus, the market inventory module 38 repeats the credit check to ensure the very latest credit preferences are used (in case of any latency in updating the credit preferences at the trader workstations 20) and to complete any complex credit preference check for quantity.

The symbol module 78 stores the symbol definitions utilized for the subject-based addressing of the different financial instruments traded in the system 10. The symbol module 78 also provides means for defining new symbols for use with the system 10. The switch module 80 is configured to receive interest rate reset risk portfolios from the user which are sent to the switch mechanism 35 at the central processing center 12. The relative position information generated by the switch mechanism 35 is returned to the switch module 80 which presents the position information to the user via the market interface module 74. The auction module 81 is configured to receive multiple or batch orders on a single instrument at different price levels, and in case of a switch auction, to receive a interest rate reset risk portfolio from the user. The inputted orders or portfolio is sent to the auction server 34 at the central processing center 12 where the auction or switch auction, respectively, is performed. The resulting matches are returned to the auction module 81 which presents the results to the user via the market interface module 74.

The trader workstations 20 includes a processor 82 that communicates with other elements within the trader via a system interface 84. An input device 86, for example, a keyboard or pointing device, is used to input data from the user, and a screen display device 88, for example, a monitor is used to output data to the user. A memory 90 within the trader workstations 20 includes the Internet browser program 72 (and thus, the trader module 70) and a conventional operating system 94 which communicates with the Internet browser program 72 and enables execution of the Internet browser program 72 (and thus, the trader module 70) by processor 82. It is noted, however, that the trader module is preferably implemented as a Java-based program that is downloaded into memory 90 for the execution during a single session, and the trader workstations 20 will not persistently store the trader module 70. Further, as a Java-based program, the trader module 70 will be executed on a JVM 73 which is a component of the Internet browser program 72.

An external communication link 96 is provided to interface the trader workstations 20 with other computer systems or computer-based devices such as respective business unit servers 18. Lastly, a hard disk 98 may be provided as a persistent memory device, as well known in the industry. It is noted that the trader workstation 20 may comprise a desktop computer system as previously mentioned, or alternatively, the trader workstation 20 may comprise a portable computing device such as a notebook computer, handheld PC, personal digital assistant (PDA) or any other suitable device capable of running an Internet browser program and creating a communication link for interfacing with a network.

Therefore, a user of the system 10 is not necessarily tied to a specific hardwired terminal, but has a virtual terminal that goes with the user wherever the user has access to a Java capable browser and Internet access. The trader module 70 may be implemented as an independent program capable of establishing a communication link to the central processing center 12 via the Internet, a local area network (LAN), or a wide area network (WAN). Thus, the user can even have access to the system 10 via direct modem dial-in to the central processing center 12 over the public switched telephone network (PSTN) or Internet.

Figure 4:
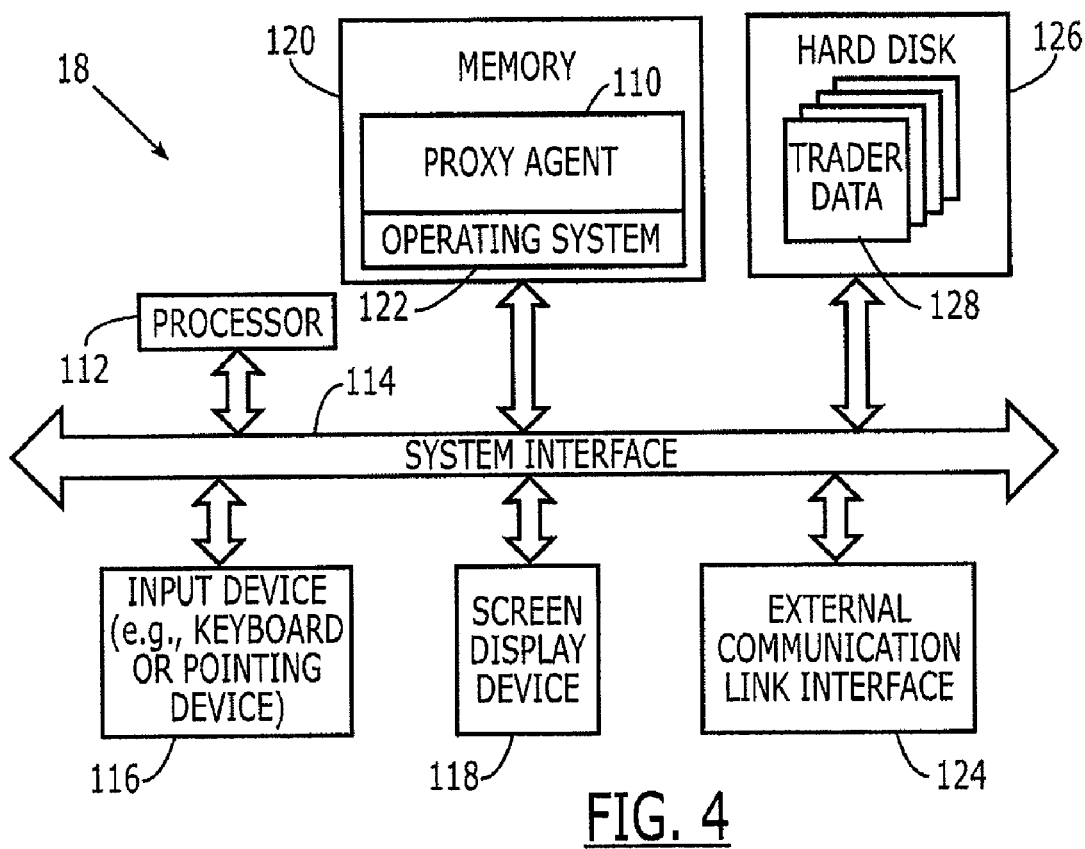
FIG. 4 is a block diagram illustrating the architecture and functionality of a business unit proxy in accordance with an embodiment of the present invention.

With reference now to FIG. 4, illustrated is an embodiment of a business unit server 18 which includes a proxy agent 110 in accordance with the present invention. The proxy agent 110 may perform numerous functions including decoding and encoding encrypted messages sent and received over networks 16. The proxy agent 110 manages traffic to and from the trader workstations 20, and may provide other features such as document caching and network access control. The proxy agent 110 may improve performance by storing and supplying frequently requested data to the trader workstations 20, or by filtering and/or discarding information from the networks 16. Preferably, proxy agent 110 resides on a business unit server 18 which is part of the respective client sites 14 internal data networks. However, the system 10 of the present invention may be implemented without business unit servers 18, whereby the functionality of the proxy agent 110 may be incorporated into the trader module 70 of the respective trader workstation 20; such functionality including decoding and encoding encrypted messages, and network management.

The business unit server 18 includes a processor 112 that communicates with the other elements within the business unit server 18 via a system interface 114. An input device 116, for example, a keyboard or pointing device, is used to input data from a user, and a screen display device 118, for example, a monitor, is used to output data to the user. A memory 120 within the business unit server 18 includes the proxy agent 110 and a conventional operating systems 122 which communicates with the proxy agent 110 and enables execution of the proxy agent 110 by processor 112. An external communication link 124 is provided to interface the business unit server 18 with other computer systems or computer/based machines such as networks 16 and trader workstations 20. Lastly, a hard disk 126 may be provided as a persistence memory device, as is well known in the industry. Particularly, the hard disk 126 may include trader data profiles 128 for each of the different trader workstations 20 associated with the business unit server 18. Alternatively, the trader data may be stored at the central processing center 12 so that the trader does not need to re-build his/her screens each time he/she longs onto the system 10.

Thus, each trader workstations 20 at a client site 14 is able to access the system 10 through the Internet browser program 72 operating on the user's desktop computer. In order to access the system 10, the user may run Java-based applets on the desktop computer in the Internet browser program 72 which may be up-loaded to the desktop computer system by one of three means: 1) accessing them from the hard disk of the desktop computer 2) downloading them across the network from a server on the internal data network of the client site, or 3) by downloading them directly from the central processing center. Once the applets are loaded and running in the desktop computer of the user, the user is then able to access the system 10 and interact with other trader workstations 20 and engage in trading activities. In addition to traders at the client sites, a preferred embodiment of the present invention also enables non-trader users at the client sites 14, such as credit officers and other interested/relevant staff, to have access to the invention in the same manner as the users in order to monitor the trading activities, perform credit control or any other functions.

III. System Features

The following are features of the present invention which provide particular functionalities and utilities. These features include interfaces such as a command center interface, a market entry interface, a market details interface, an outstanding order interface, an historical order interface, and functions such as symbology, credit preference checking, term negotiation, automatic notification, interest rate reset risk switches, and order auction.

When beginning a session on the system 10, a user at a trader workstation 20 launches the Internet browser program 72 and goes to a particular address that connects the trader workstation 20 to the central processing center 12. This is preferably achieved by typing a known URL (Universal Resource Locator) in an address field of the Internet browser program 72. At the URL entered, the user will be presented with a log-on screen which preferably requires the user to input a user name and password for identification, verification and security reasons. After the user logs on, the user will download (preferably from proxy agent 110) the Java applets which will run locally on the desktop computer comprising the trader workstation 20. Alternatively, the user may launch a local or network application that runs locally or on an attached server. The application will enable a connection to system 10 over network 16, much the same as numerous dial-up services such as AOL. In addition, other information such as user defined preferences which are based on the trader's profile will be downloaded to the trader workstation 20. This may include information on what the user is allowed to trade, what markets the user is interested in monitoring, and other user specific information that was previously defined by the user or another individual such a credit officer or the like.

After the user has successfully logged on and the requisite Java applets have been downloaded and are running on the JVM 73, the user is presented with a command center interface 130, as illustrated in FIG. 5, via the screen display device 88 (FIG. 3). The command center interface 130 is the front end of the user interface which provides access to all other features of the present invention, as described below. In an embodiment of the command center interface 130, the command center interface 130 is a pop-up window rendered on the screen display device 88. Note, however, when the command center interface is running, the user may be able to iconize (i.e., minimize) the Internet browser program 72 window, as may be desirable when the user no longer needs to view the Internet browser program 72.

From the command center interface 130, a user can access the features of the system 10 which enable the user to monitor and control their trading in the system 10. Specifically, from the command center interface 130 the user can access the following areas of functionality as menu options on the tool bar 132: a market entry interface (described below with reference to FIG. 12), a credit settings interface (described below with reference to FIG. 10), a switch engine interface (described below with reference to FIG. 22), auction interface (See FIG. 13), tools, a user preference interface (described below with reference to FIGS. 6A and 6B), an historical order blotter interface (described below with reference to FIG. 17), an outstanding order blotter interface (described below with reference to FIG. 16), links to external applications such as MarketSheet™ (a trademark of TIBCO, Inc.) (referred to herein as the quote screen and graph screen for illustrative purposes), a logout interface (provides secure exit from the system 10), and a help interface where detailed on-line help is provided. The menu options that appear in the tool bar 132 are preferably customizable to a user, and those described are merely illustrative.

In addition, the command center interface 130 provides a message display window 134 for displaying real-time messages. These messages include system information, market information, requests-for-prices (RFPs), requests-for-switch (RFS) or online chat sessions with the users of the system 10. Below the message display window 134, the command center interface 130 displays the user's name 136, the user's default currency 138, the user's business unit 140, and other relevant information. The background color of the message display window preferably changes if the connection to the central processing center 12 is lost for any reason.

Figure 6B:
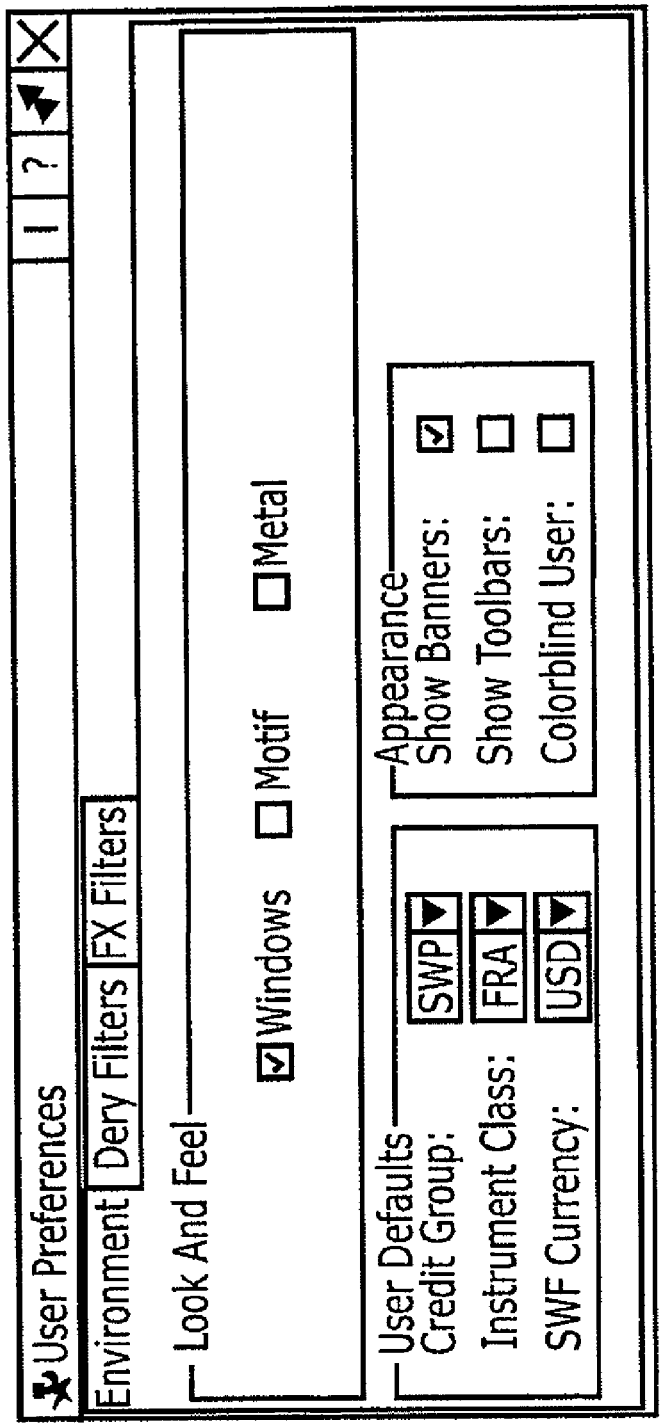

A user preferences interface 148, which is accessible from the command center interface 130 via the tool bar 132, provides a user with user preference features, such as those illustrated in FIGS. 6A and 6B. In FIG. 6A, a Derv Filters tab enables a user to set request-for-price (RFP) filters for viewing different derivative instruments based on the type (i.e., class) of derivative instruments and the currency. The user may also select the manner of presentation (i.e., highlighted or not). From the Derv Filters tab, the user is able to add and remove the derivative instruments from the user's viewing list, that is, the list of instrument that will appear on the message display window 134 of the command center interface 130. In FIG. 6B, an Environment tab enables a user to select viewing options to change the appearance of the display. In regard to the color coding display option, it is noted that the user can select not to have order information color coded by selecting color blind user. In such a case, other means of notation are utilized such as markings or symbols, as may be desirable if the user is color blind or using a monochrome screen display device 88. User defaults for Credit Group, Instrument Class and SWF Currency may also be selected via the environment tab.

At this point, it is worth noting several functionalities that are integral to the operation of the present invention. In particular, it was recognized that in order to achieve an electronic trading system for a wide range of financial contracts, a solution had to be developed to solve two very critical problems: (1) how to identify financial contracts, and (2) how to allow institutions to describe their credit preferences or relationships for these instruments. As solutions to these problems, the present invention provides the symbology and credit preference features described below.

The symbology of the present invention was developed because, unlike foreign currency trading, where the financial instruments are simple, verbally explaining all the terms and conditions of a derivative transactions can be a laboriously complex process which can take a relatively long period of time to explain. Furthermore, most derivative transactions are specifically customized to fit a particular need. With derivatives, as compared to stocks, bonds or other financial instruments, there are typically many more parameters, such as the maturity, fixed interest rate, floating interest rate, currency, floating rate index, and calculation rates, which are important and are preferably defined. This complexity has allegedly been one of major inhibitors to the development and implementation of an efficient inter-dealer electronic trading system for over-the-counter (OTC) derivatives.

The symbology will, among other things, ensure that the symbols are intuitive to the trading community, allow new symbols to be system generated when new instruments are introduced, and enable detailed confirmations to be prepared. These goals are generally accomplished by systematically dividing the parameters, terms, and conditions defining these derivatives instruments into a four-part subject code. This four-part subject code enables the users to reference these instruments via a form known as subject-based addressing. The four-part subject code is divided as follows:

SOURCE.CLASS.SYMBOL.CURRENCY. Each field of the four-part subject code is defined below.

The source field of the symbology identifies the source of the information. In most cases, this will be the code DNI (i.e., Derivatives Net, Inc.), the assignee of the present invention. If the symbol is used within the system 10, then the source field of the symbology will be assumed to be DNI, and will be omitted. If the symbol is used in a larger context, then the source will be identified. If, for example trade data were to be distributed and accessed via a third-party data distribution system such as the type operated by Reuters, Inc., then the source field of the subject code would be used.

The class field identifies the principal product class into which the financial instrument falls. The class parameter is designed to group financial contracts together which share similar attributes. For purposes of the present disclosure, eleven classes of instruments, each with distinct characteristics covering forward rate agreements, interest rate swaps, interest rate basis swaps, interest rate options, foreign exchange and switches, will be covered. It is noted that a switch is the simultaneous purchase and sale of two instruments within the same class. The following is a listing of the eleven classes and the associated abbreviation for each:

FRA—forward rate agreement
SWP—interest rate swap
CAP—interest rate option (cap or floor)
SOP—interest rate option (swaption)
IBS—interest rate basis swap (floating vs. floating swap)
SPT—foreign exchange spot
FWD—foreign exchange outright forward
FXS—foreign exchange swap
SWF—FRA switch
SWT—switch any other pair of instruments in the same class
CBS—currency basis swap The symbol field is the principal code used to define each instrument. The symbol field is the most explicit field of the subject code. This component of the naming convention enables the underlying structure of the derivative instrument to be defined. A simple description (e.g., 1 yrswap) could be used, but this does not allow new derivative instruments to be easily added. The legend below defines the parameters for defining each of the different instruments or classes. The symbol relies on the definitions of the underlying parameters, which will allow further break down or definition. For example, FLOPT is a code which describes the variable rate index to be used, and will include: the designated maturity, index name, source, non-business day convention and calculation description. The symbols of the present embodiment are as follows:

FRA: [START, END, OVER, FLOPT]
SWP: [START, END, OVER, FXDBASIS, FLOPT, SPECIAL RULE]
CAP: [START, END, OVER, FLOPT, TYPE, STRIKE]
SOP: [START, OVER, UNDERLYING SWAP, SOP-TYPE, STRIKE, OPTTYPE]
IBS: [START, END, OVER, INDEX1, INDEX2, ARREAR]
SPT: [CCY1 (terms), CCY2 (base)]
FWD: [CCY1 (terms), CCY2 (base), START, END, OVER]
FXS: [CCY1 (terms), CCY2 (base), START, END, OVER]
SWF: [FLOPT, DAY1, DAY2]
SWT: [ASSET1, ASSET2, CLASS]
CBS: [START, END, OVER, INDEX1/CCY1, INDEX2/CCY2]

The symbol fields set forth above include the following parameters:

START: The START parameter is the month the contract commences offset from value date, i.e., 1, 2, 3, . . . , 13, . . . , 360. The default setting for the START is (0) which represents that a contract starting with the current month. Also, see OVER below.

END: The END parameter is the final maturity from value date in months adjusted for the OVER, and represents the term, i.e., 1, 2, 3, . . . , 13, . . . , 360. If the value date is 28th of November, then a contract defined as [1,4 over the 12th] translates into a deal starting on the 12th of January and maturing on 12th of April.

OVER: The OVER parameter represents a specific date in the appropriate month. For example, if today is the 3rd December (value date is the 5th of December), then a 1*4 over the 12th would start the 12th of January, the first date over one month but less than two months beyond the spot date. This allows a contract to be defined with any start date between days 1-31. Note that this represents the actual date and not the number of days forward. The default setting for the OVER is (0), which represents spot starting. Two other parameters are allowable: (I) which represents IMM (International Monetary Exchange) rolls (the system 10 covers the different IMM conventions defined by the currency market, that is, the third Wednesday or second Thursday) and (E) which represents rolls over the month-end.

FXD BASIS: The FXD BASIS parameter is a two-part code covering the frequency and the basis of the fixed coupons. Examples are FREQ: M=Monthly, Q=Quarterly, S=Semi-annually, A=Annually, Z=Zero Coupon plus BASIS F=A/365 Fixed, B=30/360, M=A/360, I=A/365 ISDA, etc. For instance, SM is semi-annual A/360 or semi-money].

FLOPT: The FLOPT parameter is a two-part code covering the frequency and the index type of the floating coupons, and represents the floating rate option as defined by ISDA. The FLOPT parameter covers frequency, basis and source. Although each currency may have a default, most indices will be available. FLOPT examples are L=Libor (TELERATE 3740/50), P=Pibor (TELERATE 20071), T=Tibor, C=CDOR, B=AUS Bills (REUTERS BBSW), FF=Fed Funds (HI5), TB=T-bills (H15), PR=Prime (H15), CP=30 day Commercial Paper, BE=BELO, S=STIBOR, TA=TAM, A=AIBOR, D=CIBOR (REUTERS DKNK), RL=Libor from Reuters LIBO, and IL=Libor from Reuters ISDA.

CAPTYPE: The CAPTYPE parameter includes definitions for cap (C) and the floor (F). Thus, in a preferred embodiment, the following code is utilized: C=Cap, F=Floor.

SOPTYPE: The SOPTYPE parameter includes definitions for payers (P) and receivers (R). Thus, in a preferred embodiment, the following code is utilized: P=. Payers, R=Receivers, X=Call, Y=Put.

OPTYPE: The OPTYPE parameter is the option type: (E)uropean, (A)merican or (M)ultiple European.

STRIKE: The STRIKE parameter indicates the cap or swaption's exercise rate or price set on the option. Any strike defined in the symbol as ATM (at-the-money) will be shown as such in this parameter. In such a case, the percentage or strike will be agreed through the term negotiated process discussed below.

SPECIAL RULE: The SPECIAL RULE parameter is designed for currencies such as USD and CAD which are in particular markets that use few special conventions for trading. For example, semi-bond for spread trades and annual money for out-right swaps are widely used in these markets. The SPECIAL RULE parameter allows the system 10 to set more than one set of defaults for any currency. This will allow the system 10 to know when the exchange of bonds is required following a transaction. The follow are the rules for the present embodiment:

A—Default in all currencies

S—USD spread trades. The default in USD is annual money versus 3 month LIBOR. This rule defies semi-bond spread trades where bonds are exchanged in the terms negotiation function described below.

2—CAD spread trades. The default in CAD is annual money (A/365 fixed) versus 3 month CDOR paid semi-annually. This rule defines semi-annual A/365 fixed versus 3 month CDOR paid semi-annually where bonds are exchanged in the terms negotiation function described below.

3—AUD long trades. The default for AUD is a quarterly/quarterly structure. This applies for trades up to and including three years. In trades over three years, the convention switches to a semi/semi structure. This rule supports a semi/semi structure.

4—AUD spread trades. Its is conventional to trade swaps in the AUD market against the bond futures contracts with an agreement for an exchange for physical.

5—GBP spread trades. The default in GBP is annual money (A/365 fixed) versus 6 month LIBOR. This rule defines semi-annual A/365 fixed versus 6 month LIBOR where bonds are exchanged in the terms negotiation function described below.

ARREAR: The ARREAR parameter defines when the coupon(s) on a swap is both set and paid. Most interest rate swaps set their floating rate coupons at the beginning of the period and pay them at the end of a coupon period. In an ARREAR swap, however, the coupon is set and paid at the end of the period. This is commonly referred to as an arrears swap. The system 10 allows for this in the form of a basis swap.

DAY1/2: The DAY1/2 parameter is the number of calendar days offset from today to the start of each FRA in an FRA switch (class SWF). Thus, the DAY1/2 parameter represents the setting day or date.

CCY1/2: The CCY1/2 parameter is the currency code and is defined by the ISO codes for foreign exchange instruments.

UNDERLYING SWAP: The UNDERLYING SWAP parameter is the full symbol, alais or security ID of the interest rate swap that underlies an option.

INDEX1/2: Basis Swaps are when both sides are a floating rate, and the index represents the FLOPT plus the currency code of each index. The first listed index (INDEX1) is paid by the buyer. Examples include 1L-USD, 3L-GBP, PR-USD, etc. The second index (INDEX2) is received by the buyer. These are substantially identical to the codes used in the switch mechanism 35 (FIG. 2). For currency basis swaps, it is assumed that an exchange of principals takes place at the start and end on the contract.

ASSET1/2: The class SWT is provided to allow for the trading of switches in other classes other than FRAs. ASSET1 and ASSET2 represent the symbol, alias or security I.D. of each underlying contract. Note that both should be provided from the same class of contracts.

SETTLE: The SETTLE parameter is a flag indicating whether a swaption is cash or physical settlement. The default is cash (C).

An example of an order in accordance with the symbology of the present invention is DNI.FRA.1,4.0,3L.USD, where DNI is the source, FRA is the class, .1,4.0,3L is the symbol and USD is the currency. In particular, the symbol field defines a 1 by 4 (i.e., 3 month starting in 1 month) FRA on a 3 month LIBOR spot starting. Note that a comma (,) is used in the symbol fields as a delimiter. Another example of an order in accordance with the symbology of the present invention is DNI.SWP.0,60,0,AB,6LA.DEM, where DNI is the source, SWP is the class, 0,60,0,AB,6LA is the symbol and DEM is the currency. In particular, the symbol field defines a five year (60 month) annual bond (AB) versus a 6 month LIBOR swap.

Accordingly, the Symbology described above is designed to capture the parameters or commercial terms of a derivatives instrument which affect the instrument's valuation. The present invention provides a number of default values which are assumed at all times. For example, the following is an exemplary list of system default values.

ROUNDING: The rates observed on the source page or document will be used unless otherwise agreed. Rates should be rounded to 5 decimal places after any operation of averaging.

RESET DATES: This will be defined with reference to payment dates. The reset dates should be offset by the standard number of days for the currency, for example, two business days for USD.

BUSINESS CENTERS TO APPLY TO RESET DAYS: The business days used to define the current offset for reset dates is defined by the source and not the payments under the transaction. For example, London will always be used for LIBOR (the exception is for USD LIBOR which uses both London and New York City) and New York City for H.15 rates.

INTERPOLATION: Where interpolation is required, a straight-line method using the reference rates on either side of the desired date should be used.

CALCULATION PERIODS: First and not last convention. Therefore, the calculation period includes the first payment date but excludes the next payment date.

TERMINATION DATE: All termination dates will be subject to adjustment if they fall on a non-business day.

ADJUST CALCULATION PERIOD: The number of days is assumed to adjust if the payment days are adjusted for non-business days.

TRADE DAY: The trade day is defined relative to the instrument and currency by the system 10, and not by the location of either of the parties to the transaction.

NET PAYMENTS: Net payments will be assumed for all transactions completed through the system 10.

CANADIAN DOLLAR SWAPS: The convention is to set quarterly and pay semi-annually using weighted averaging and compounding at the first rate.

DATES: All dates are listed unadjusted for non-business days.

Users may also want to be able to negotiate other parameters which do not affect the valuation of the derivative instrument, but are still very important. These parameters are referred to hereinafter as non-commercial terms. The difference between commercial and non-commercial terms can be vary ambiguous, and therefore, some of the terms designated as commercial below may be designated as non-commercial and become default settings so as to be part of the symbology parameter. For purposes of illustrating the present invention, non-commercial terms have been given default values which the users can change by negotiating new values for these terms between themselves via the system 10. However, both counterparties (users) must agree on the new value to override the system defaults. Table 1 below provides a list of parameters that maybe negotiated, that is, the non-commercial terms:

TABLE 1

| PARA-METER | DESCRIPTION | SETTING |
|---|---|---|
| Legal | The format of the legal agreement used | ISDA, BBA, FX |
| Month-end | Whether coupon payment dates roll on month-end dates or not | YES, NO |
| Settle | For swaptions whether the contract is cash or physically settled | CASH, PHYSICAL |
| First Setting | For swaps the first variable rate is normally known for spot starting instruments. The current setting can quickly become off market on days where the market moves substantially. The system will display the default at all time. | SETTING displayed on market entry interface. |
| ATM | For options, symbols will be set up where the strike is defined as at-the-money (note: pre-defined strikes will also be available). The actual strike will be negotiated immediately following the transaction by the two parties. | The system forward rate will be available |
| Spot | For foreign exchange swaps (class FXS only) where the price is transacted in the form of points, the spot level to be used will be negotiated immediately following a transaction. | The system mid spot price will be available |
| Base | Switches will be transacted in the form of the relative price between the two instruments being switched. The base rate maybe negotiated immediately following a transaction. | The system mid price will be available |
| Bond Exchange | For USD, CAD and GBP interest rate swaps transacted as a spread, the price and number of bonds will be negotiated immediately following the transaction | The system will list the benchmark bonds to be used and will calculate a default price and number according to market convention. |

Because the above symbols that comprise the subject-based addressing may be complex, users may occasionally desire a simpler naming convention to reference the more commonly traded derivative instruments. To facilitate more rapid referencing of an instrument by a user, the symbology of the present invention provides aliases. An alias is merely an abbreviated version of the subject-based address for the more commonly used terms for an instrument. The database 66 (FIG. 2) maintains a unique security identifier (such as a numeric code, e.g., 111222) for each symbol which can be used in the system 10. Thus, the symbology of the present invention enable traders and other users of the system 10 to quickly reference a particular derivative instrument in the system 10 in three ways: the full symbol, the alias, and the identifier.

The currency field of the symbology contains the code that defines the currency of the instrument represented. In a preferred embodiment, the currency code is represented by the standard ISO currency codes, i.e., USD, DEM, JPY, GBP, FRF, NLG, BEF, AUD, CAD, ITL, ESP, DKK, SEK, EUR, etc. The default currency will be set by each user in each user's preferences interface 143 (see FIG. 6B). This will allow the currency code field of the symbology to be omitted much of the time. However, foreign exchange trades (FXS) preferably include the currency code. Further, the currency code represents the currency which will be indexed in equal amounts for both the spot and forward coupons.

The credit preference feature of the present invention provides for the bilateral credit status between two entities to be captured, structured and used anonymously for the trading of a wide range of financial contracts. In prior art systems, credit information was primarily used to deal with settlement risk in trading spot foreign currency. In such prior art systems, the credit line or limit is usually expressed in amounts of currency which equates with the quantity or volume of a particular trade. As trades are executed between counterparties, the amount of the limit is decreased in a corresponding amount to the trade executed until there is little or no remaining credit, and then further trading is prevented until the trades settle or the credit limit amount is re-set. In foreign currency trading, the settlement process is completed in only a few days, after which both counterparties have exchanged the currencies, and then there is no further credit risk between them (i.e., the trades have settled). This is vastly different from derivatives trading, where the amount at risk is normally not equal to the principal or quantity of the transaction and the obligations under the contract may continue into the future. Derivative trades can be anything from spot (the normal settlement of a foreign exchange contract) to thirty years into the future. Therefore, the resulting credit exposure (i.e., the value of a contract at a future time) is over the life of a contract of an unknown amount.

The credit preference feature of the present invention is configured to handle the significant long-term credit problems inherent in over-the-counter (OTC) derivatives transactions. These long-term credit problems are further compounded by the fact that there is no standard method for banks to internally monitor and manage their credit risks. Most banks have developed their own, often proprietary, methods of monitoring and measuring the credit risk embedded in large portfolios of derivatives. Furthermore, banks also have different methods for dealing with the many different financial instruments that exist in every market.

The credit preference feature of the present invention addresses these problems and provides a viable solution. The credit preference feature of the present invention achieves this, at least in part, by introducing a measurement unit of credit risk referred to as risk equivalent (RQ) which allows for different instruments to be compared on a like basis using a standardized measuring methodology, which together with the concepts of contract maturity, credit groups, classes, credit preferences, legal entities and business units allow the system 10 to offer a solution to the credit risks embedded in bilateral, term derivatives contracts. The present invention also provides for the designation of credit groups. A credit group is a grouping of classes of financial contracts that a business unit wishes to be treated in a like manner for credit purposes. In a preferred embodiment, three default credit groups will be available: (1) Derivatives—SWP, IBS, CAP, SOP, FRA; CBS (2) Switches—SWT, SWF; and (3) foreign exchange. Any other combination may be set up by the business unit, as desired.

Credit preferences are the methods or rules selected by a business unit within a credit group for the system 10 to use to screen prices (bids or offers) and trades against all other legal entities. In a preferred embodiment, the following three credit preferences are provided, though it will be appreciated by those of ordinary skill in the art that other credit preferences may be utilized in accordance with the present invention:

Method 1: Binary (simple yes/no)—This is used where mark-to-market (MTM) agreements exist between the counterparties. MTM are bilateral, collateral agreements which are common and reduce the credit risk between two parties to almost zero by the posting of collateral against the value of a portfolio of derivatives covered by a single ISDA (International Swap and Derivatives Association) master agreement.

Method 2: Line Binary—takes into account the maturity (quoted in months from trade date) of the financial contract.

Method 3: Complex—This is based on the RQ of each contract within maturity bands. The system calculates a RQ for each instrument in the form of a constant currency unit expressed as a percentage. Each business unit has the choice of using the system generated RQ unit or to provide their own.

In the binary method, a business unit makes a yes or no determination as to whether or not they will deal with a particular counterparty for a particular credit group. In this credit preference, the decision is binary; there is no maximum maturity limit (i.e., time limit) or quantity limit (i.e., amount) in the binary method. The binary method is the broadest of the three credit preference definitions provided for herein. Typically, the binary method will be used to refuse credit, where MTM agreements exist or where the credit exposure is small (for example, in switches).

In the line binary method, it is assumed that the business unit will deal with a particular counterparty for a particular credit group. However, the line binary method adds a further restriction of a maximum maturity of any contract tradable. The added restriction is preferably expressed by the number of months into the future. The line binary method is particularly well suited for used by institutions that are not yet using RQ units, but which desire a method to limit potential exposure to longer dated contracts (for example, a temporary step).

The complex method allows each business unit to exactly stipulate the amount of new risk that they are prepared to enter into with any other legal entity for each credit group by maturity band. The complex method enables a business unit to specify not only a particular maturity, but also a particular quantity or amount based on a measure of RQ. Further, the complex method enables the business unit to specify this for more than one period in time. For example, a business unit can specify that for Bank A, they will do up to $100 million out for 5 years, and then only $50 million from thereafter out to 10 years, and nothing thereafter.

Risk is generally defined herein as the degree of uncertainty of future net returns. Credit risk is further defined as an estimate of the potential loss due to the inability of a counterparty to meet its obligations. Thus, while the risk in a particular transaction depends not only on the changes in market rates and credit standing of the counterparty to the transaction, the credit risk or exposure is the nominal amount that can be lost when a counterparty defaults on its obligation. As previously mentioned, the credit risk in a derivatives transaction is relatively complex. For instance, though derivative contracts come in many forms, the majority have a fair credit value of zero at the time the transaction is initially entered into. That is, no funds are transferred between the parties at the time the contract is created. Rather, the contract places an obligation on both over the term of the contract. Further, both parties are entering into a contract which requires them to accept a certain amount of risk. The RQ is a unit of credit risk which allows all contracts to be compared on a like basis, at virtually any point in time. The RQ is the credit exposure in terms of a percentage of the principal.

The calculation of RQ is based on the potential exposure averaged over a series of time points, weighed by an appropriate discount factor. There are several methods of calculating the exposure of a transaction, though the RQ is calculated herein using an option pricing approach, as described below.

For a certain party, a transaction can be viewed as two opposite cash flows. Inflows are assets, denoted by A(t), and outflows are liabilities, denoted by L(t). Therefore, the current exposure may be expressed as follows:

$$E(t)=\max(A(t)-L(t),0)$$

This formula is similar to the intrinsic value of a call option. The key difference is that both A(t) and L(t) can be random. Thus, following the same structure by the Black-Scholes, then:

$$EE(t)=A\phi(d_1)-L(t)\phi(d_2),$$

where $$d_1 = \frac{\log(A(t)/L(t)) + \frac{\sigma^2(t)}{2}\tau(t)}{\sigma(t)\sqrt{\tau(t)}}$$

$$d_2=d_1-\sigma(t)\sqrt{\tau(t)}$$

where $\sigma(t)$ is the daily volatility (in percent) that takes into account that both A(t) and L(t) are random. The maximum exposure estimate is based on the following equation:

$$ME(t) = A(t) - L(t) + A(t)\left[e^{1.65\sigma(t)\sqrt{\tau(t)} - \frac{\sigma^2(t)}{2}\tau(t)} - 1\right]$$

Thus, the RQ can be expressed as:

$$RQ = \frac{AEE(t)}{\text{Pincipal}} * 100\% \text{ where}$$

$$AEE(t) = \sum_{t=0}^{N} \omega(t)E[E(t)] \text{ where}$$

$$\omega(t) = \frac{\delta(t)}{\sum_{0}^{N} \delta(t)}$$

where $\delta(t)$ is the discount factor at future time t.

For FRA's, the following equations apply:

$$A(t) = *discountFactor(t,s)*x + (1+floatingCoupon)*discountfactor(t,e)$$

where $$floatCoupon = 1*(e-s)/floatBasis*floatRate, \text{ and}$$

$$L(t) = 1*discountFactor(t,s)*x + (1+fixCoupon)*discountfactor(t,e)$$

where $$fixCoupon = 1*(e-s)/fixBasis*fixRate,$$

for t<s, x=1, and for t>s, x=0.

Then we can apply the above formula for RQ to get the expected exposure at time t. By choosing the time partition t0, t1, t2 ..., tn and calculate the expected exposure at each point and use the formulae of RQ, the RQ of this FRA can be calculated.

For SWAP's, the following equations apply for any time ($t_i < t <= t_{i+1}$):

$$A(t) = \sum_{j=i}^{n} floatingCoupon(t_j) * discountFactor(t, t_j) + 1 * discountFactor(t, t_n), \text{ and}$$

$$L(t) = \sum_{j=i}^{n} fixedCoupon(t_j) * discountFactor(t, t_j) + 1 * discountFactor(t, t_n),$$

where floatingCoupon($t_j$) is the floating coupon at time $t_j$, and fixedCoupon($t_j$) is the fixed coupon at time $t_j$. Then apply the formulae of option pricing approach, we can get the expected exposure at time t, by averaging the expected exposure with the discount factor, the RQ can be calculated.

At this point it may be worthwhile to distinguish the credit preference feature of the present invention from other known systems. The credit preference of the present invention does much more than merely monitor the amount transacted between two counterparties and then reduce the amount available accordingly. The prescreening performed by the credit preference of the present invention is used to prescreen possible trades based on each counterparty's credit preferences. The present invention does not control a user trading and does not directly limit the user's future trading based upon the user's past trading. In fact, it is quite possible that a new transaction may reduce the exposure between two legal entities. A user's business unit is responsible for monitoring the credit exposure of the business unit with respect to all legal entity counterparties, and for adjusting the credit preferences in the system 10 accordingly. This is a significant difference from prior art systems that automatically decrease the amount available to trade with respective counterparty as transactions are executed. The credit preference of the present invention represents an improvement over such systems because the balance of risk is based on the total portfolio between the two parties and not merely the new transactions, and the balance of risk will be affected by market movements, deals executed outside the system 10, and internal changes to the ratings.

Credit decisions for OTC derivatives are considered different from many other financial instruments. In general, a credit decision for an OTC derivative is a function of, among other things, the composition of the user's current derivatives portfolio, the current level or prices of the financial markets, new financial transactions, and the rating or level of credit worthiness of each legal entity. Therefore, more sophisticated means such as the credit preference prescreening of the present invention is needed to adequately measure and manage credit exposure in the OTC derivatives market, as well as with other financial markets.

Figure 7:
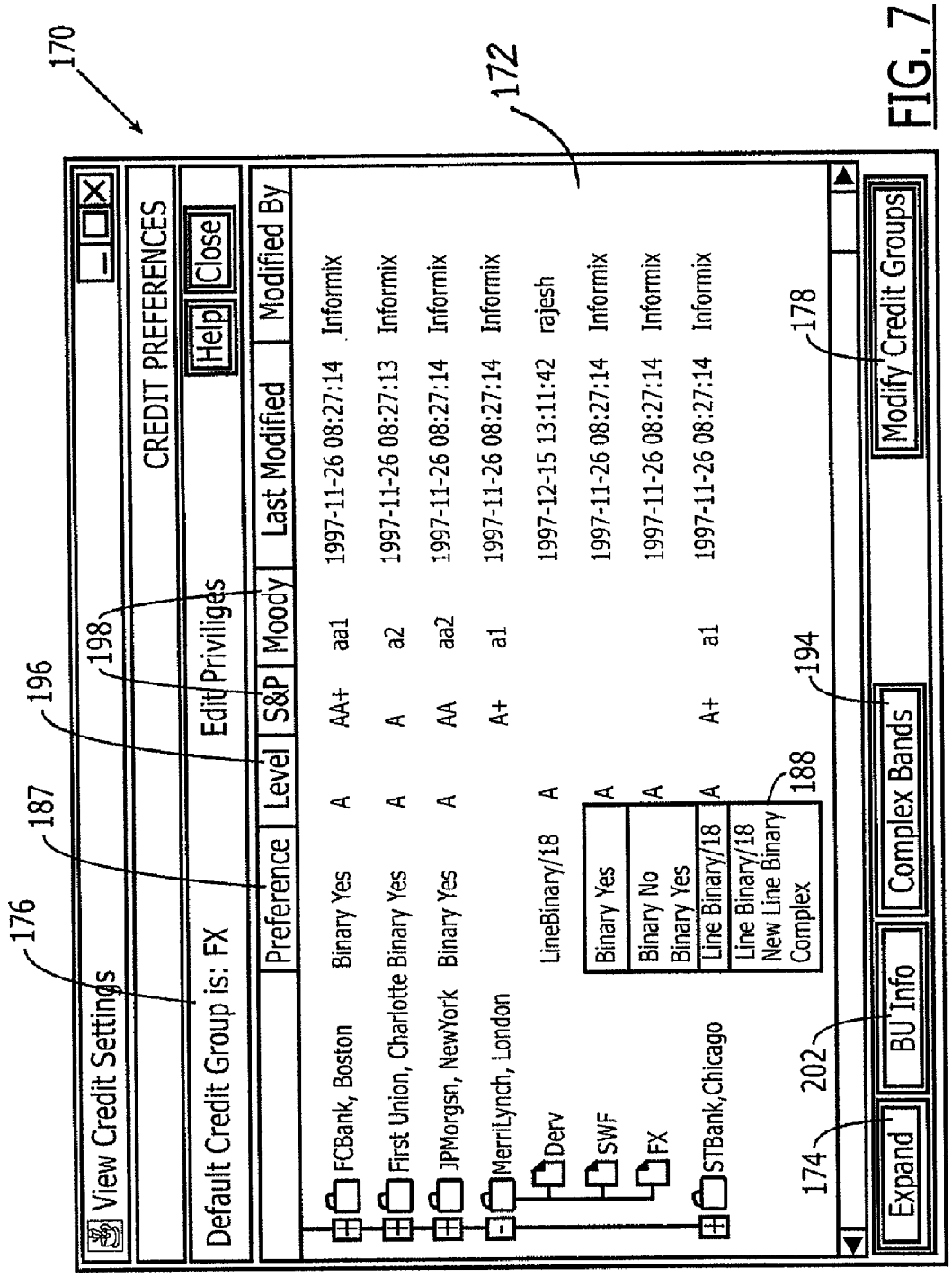
FIG. 7 is an example of a credit preference setting interface.

The present invention enables the user to set desired credit preferences for each legal entity via the credit preference interface 170, as illustrated in FIG. 7. A user can navigate to the credit preference interface 170 by selecting the credit settings button in the tool bar 132 of the command center interface 130 (FIG. 5). The credit preference interface 170 enables the users to view and/or update credit preference settings in a clear, simple, comprehensive and intuitive manner. The credit preference interface 170 may be used to view or input/amend the business unit's credit preferences. The credit preference settings are preferably only viewable by users within a business unit, and amendable by users with the correct permissions, both of which may be designated by the financial institution or the business unit. A business unit may also select to inherit credit preferences from another business unit within its family hierarchy.

Figure 8A:
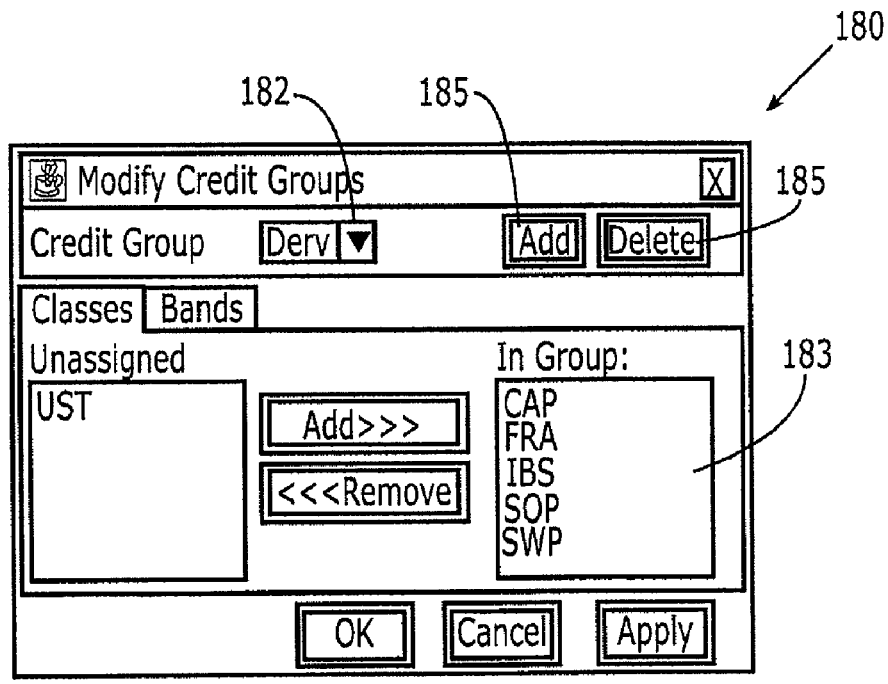
FIGS. 8A and 8B are examples of different tabbed partitions of a modify credit groups interface.
Figure 8B:
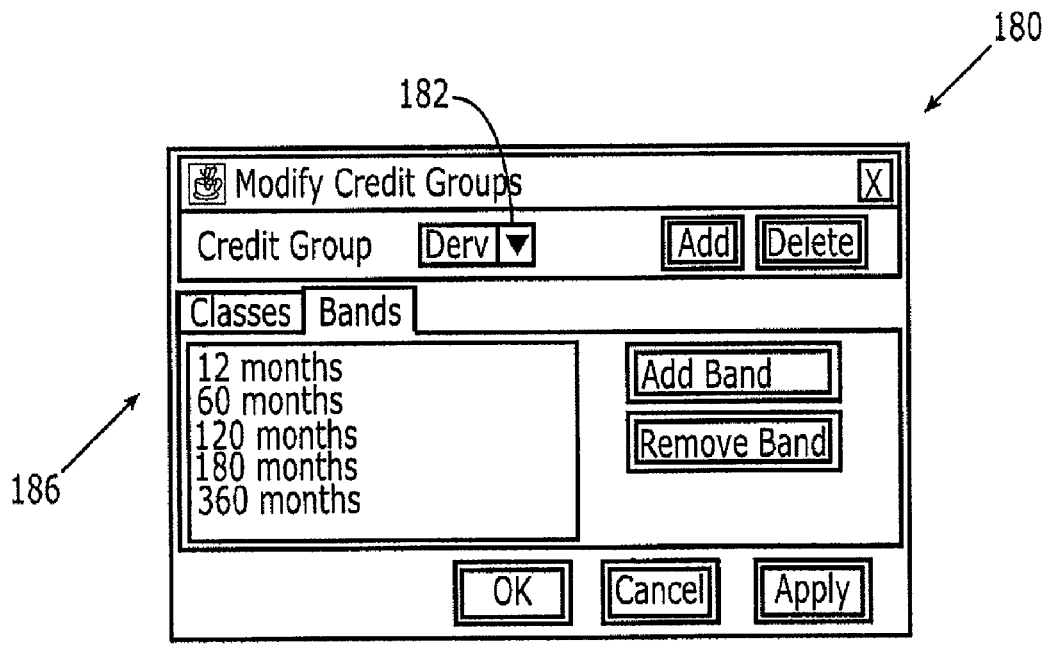

In a preferred embodiment, the credit preference interface 170 includes a display window 172 that displays various information including an alphabetical listing of all other legal entities (i.e., financial institutions) that have access to the system 10. Each legal entity can be expanded via an expand button 174 to list the settings for all the credit groups that the user has selected to trade within that legal entity, as shown for the Merrill Lynch entry. For those legal entities that are not expanded in window 172, the settings displayed are for a designated default credit group 176. The user can modify the displayed credit groups by selecting the Modify Credit Groups button 178 which launches the modify credit group interface 180, as illustrated in FIGS. 8A and 8B. The modify credit group interface 180 enables the user to customize his/her class groups by providing functionality to perform such operations as adding and removing instruments from a class group, as illustrated in FIG. 8A. For instance, for a selected credit group 182, a list 183 of instruments in that credit group is provided. Unassigned instruments can be added and member instruments can be removed. Further, credit groups 182 can be added and deleted via buttons 182, 185, respectively. In FIG. 8B, each credit group 182 may have bands of maturity 186 defined (i.e., added or deleted). Each class group preferably includes instruments that are closely related because the instruments in each class group are given the same credit preference setting, and therefore, the credit preference setting process may be simplified.

Figure 9A:
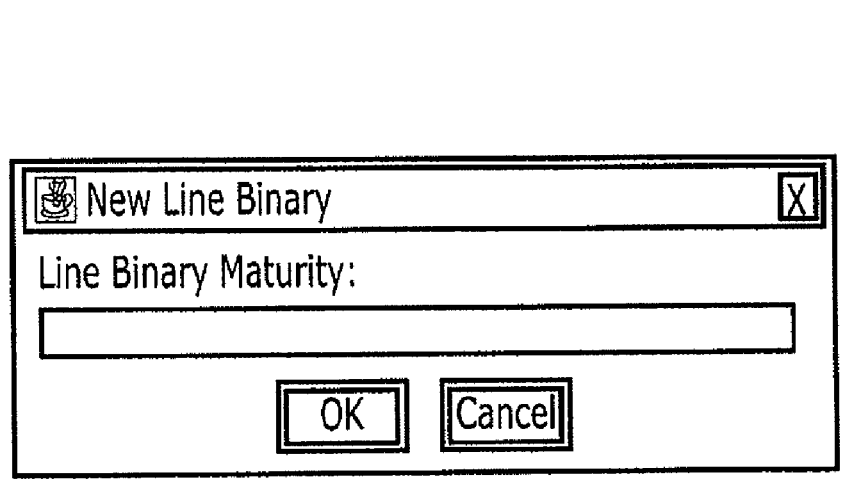
FIGS. 9A and 9B are examples of the new binary interface and complex preference interface respectively, which are accessible from the credit preference setting interface.
Figure 9B:
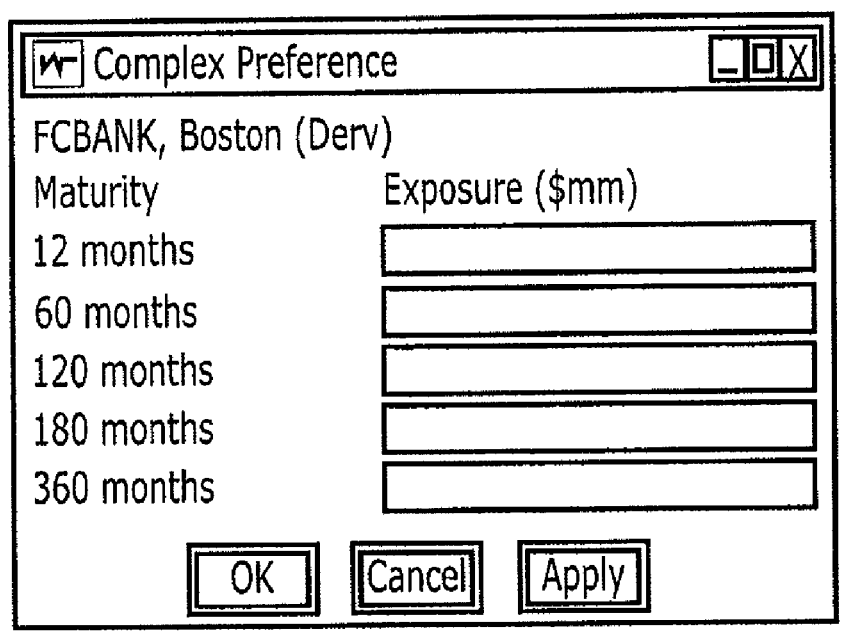

Referring back to the credit preference interface 170 of FIG. 7, a preference setting column 187 provides the credit preference setting designated for the corresponding legal entity 183. The credit preference settings for any legal entity can be modified or selected via a drop-down dialog box 188. From the drop-down dialog box 188, the user can select from a list of predefined credit preference option. For a new line binary, the user is prompted with a new line binary interface 189 in which the user can enter a maturity. For complex, the user is prompted with a complex preference interface 190 (FIG. 9B) in which the user can enter the exposure for each maturity band.

With reference back to FIG. 7, the complex credit preference settings and the RQ may be provided for each instruments designated as such by selecting an appropriate legal entity and then selecting the Complex Bands button 194.

If the user does not set a particular preference for a particular counterparty, then the credit preference will be assumed to be a simple binary (no). If after initially setting these preferences a new counterparty is added to the system, the preference for the new counterparty will be binary (no) for all users until they have specifically set a credit preference for the new counterparty.

The level column 196 displays the business unit's designation for each legal entity as to the levels A, B or C. The level set for each legal entity may be provided by the system 10 via various interfaces such as a market detail interface (described below with reference to FIG. 15) to provide the trader with information with regard to the creditworthiness of the counterparty. Thus, a business unit may assign one of the levels A, B or C against each legal entity. This is essentially a quick reference of credit worthiness for the user.

The columns 198 labeled S&P and Moody are industry credit ratings that are integrated into the credit preference interface 170. The industry credit ratings may be downloaded on a subscription basis via external communication interface link interface 62 (FIG. 2). Lastly, the last modified column and the modified by column identify the time and person that last modified that credit setting. As mentioned before, access to modify any of the credit preferences should be limited to a finance officer or credit officer of the legal entity.

It should be noted that the credit preference settings may be transferred via electronic file transfer or inputted manually on-line at anytime, and as often as the user desires. Further, updates may be made for all credit groups and legal entities, or alternatively, updates can be just for individual settings.

Figure 10:
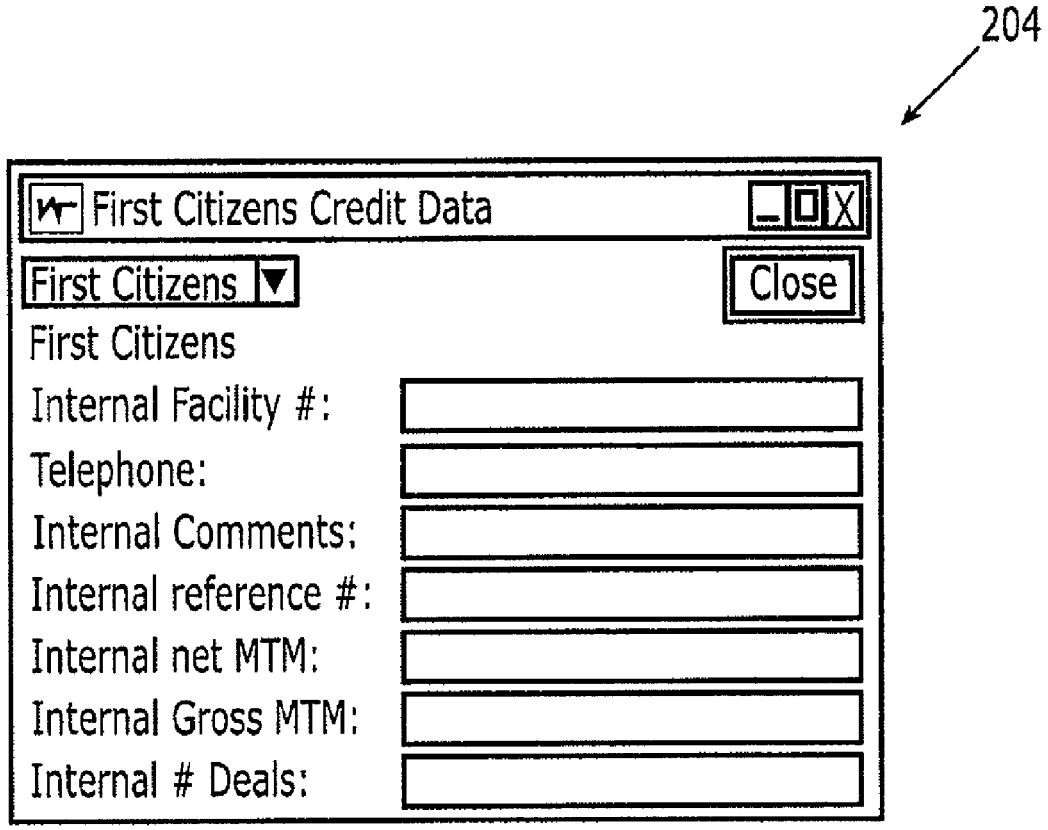
FIG. 10 is an example of a business unit information interface.

In addition, the credit preferences interface 172 includes a BU Info button 202 which, if selected, brings up a business unit data interface 204, as illustrated in FIG. 10. The business unit data interface 204 enables the users to view helpful internal information about other legal entities. The respective business units define what information is included in the business unit data interface. For example, the business unit data interface 204 of FIG. 10 provides the internal facility number, telephone number, internal reference number, internal net MTM, internal gross MTM, and internal number deals of a business unit. Alternatively, a business unit may include a contact name or other business unit specific data.

Figure 11:
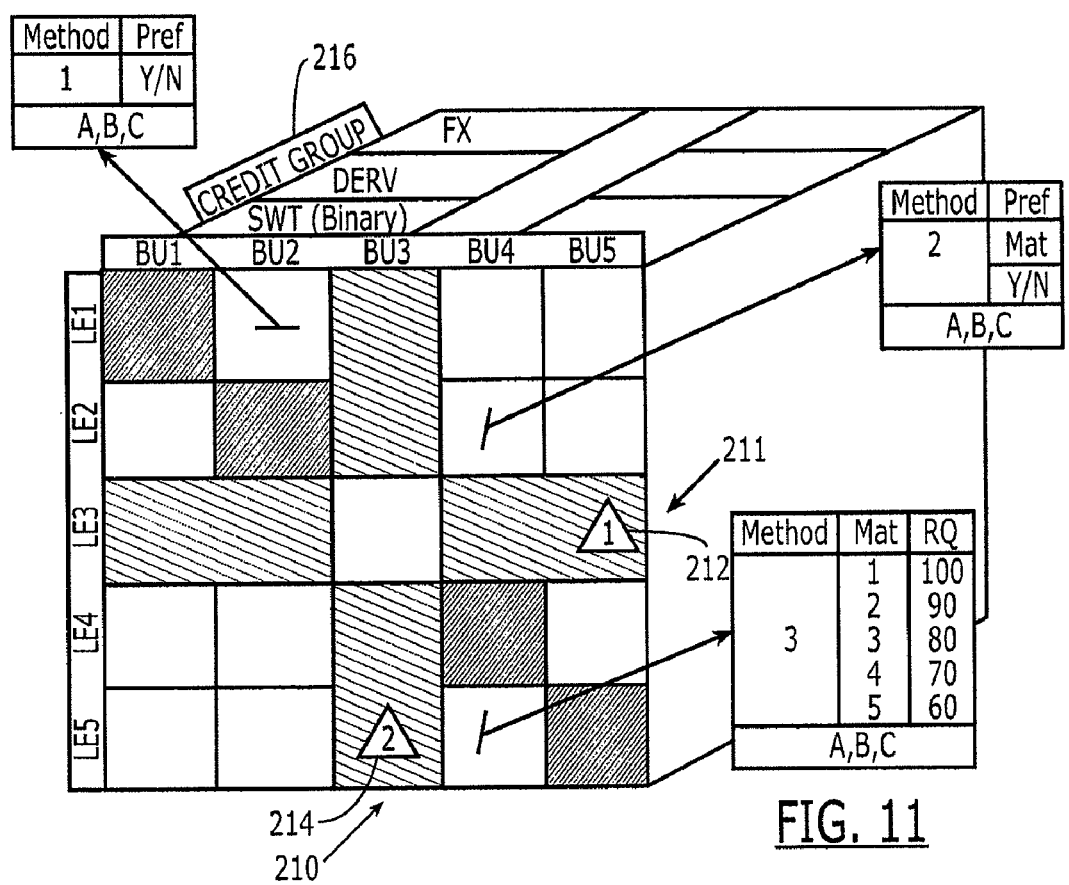
FIG. 11 is an illustration of the credit preference logic of an embodiment of the present invention.

Accordingly, the credit preference logic of the present invention can be illustrated graphically as shown in FIG. 11. For purposes of FIG. 11, it is assumed that business unit (i) belongs to legal entity (i) where i=1, 2, and 3, and business unit (j) belongs to LE (j) where j=1, 2, and 3. Accordingly, FIG. 11 illustrates a portion of the credit data which is stored by the system 10 in order to implement the credit preference feature of the present invention. Each column represents the credit preference (i.e., binary, line binary, or complex) which is stored anonymously for each business unit against each legal entity across all credit groups. The vertical and horizontal bars 210 represent the information which business unit (3) requires to determine the credit preference status of an order. The information in columns 210 provides the credit preferences which business unit (3) has set against all other legal entity, and row 211 provides the credit preferences which all other business unit s have set against business unit (3)'s legal entity, that is, legal entity (3). The depth 216 of the graph is divided into the different credit groups such as switch, derivative, and foreign exchange.

The triangles 212, 214 mark the cells that include the information which is used by business unit (3) to encode a specific order from business unit (5) of legal entity (5) with credit status information for presentation to the user via one or more of the interfaces described herein. In a preferred embodiment, the credit preference feature of the present invention color codes the credit preference status of each order from the perspective of the viewing business unit. Alternatively, another method of encoding the credit preference status of an order may include adding a character notation such as an asterisk or star to an order, as may be desired if the user is color blind.

Each order is color coded according to the credit preferences marked by the triangle 212, which corresponds to what the order placer's business unit has set against business unit (3)'s legal entity, and the triangle 214, which corresponds to what business unit (3) has set against the order placer's legal entity. The order is evaluated according to the credit preference defined in the cells marked by the triangles 212, 214, and the results can be displayed to the user via the color coding scheme set forth below where true means that the order passes the credit preference of the setting party and false means that the order does not pass the credit preference of the setting party:

| Triangle 212 | Triangle 214 | Color |
|---|---|---|
| False | False | RED |
| False | True | YELLOW |
| True | False | RED |
| True | True | GREEN |

Thus, each order is color coded to communicate to the user the tradability of the bids and offers in the market based on the preferences of both users. The color coding methodology described herein is used in both the market entry interface (described below with reference to FIG. 12) and the market detail interface (described below with reference to FIG. 15). For the present embodiment of the invention, the following meanings are associated with the cited colors:

GREEN: The price passes the credit preferences of both parties, and the counterparties are free to trade. Any trade that is shown in green can be freely traded by the trader, and credit approval is assumed to be in place.

YELLOW: The price posted is free to trade by the viewer, but the poster of the price has excluded the viewer from his/her credit preferences. If the price is colored yellow, a deal may be allowed provided that the party who placed the passive order allows mutual puts, and the credit over-ride process which is described below is completed. The viewer can attempt to trade by sending a message (thereby initiating the credit over-ride process) to the poster of the price which discloses the name and/or identity of the viewer, along with a mutual put maturity entered by the viewer. The poster then has the opportunity to accept, accept subject to credit (in either case, the poster may also reduce the maturity of the mutual put), or decline. The poster's name will not be released to the viewer until a trade is executed. The posted price will remain available to all other traders on the system 10 until a trade is completed. If the order trades to another viewer, then the credit over-ride process will be terminated.

RED: The price posted is excluded by the viewer's own preferences even though the poster is (may be) clear to trade. In this situation, the viewer is not free to trade since it is the viewer's own credit preference that the viewer set which is preventing the trade.

BLUE: The price is the viewer's own order.

WHITE: Only used in the market entry interface 250 (FIG. 12) to display prices where there are multiple orders at the best price with differing codes.

Thus, the viewer is notified to view the market details interface for more information.

In the over-ride process mentioned above, if the viewer sees a price coded yellow that he/she wishes to trade, then the viewer may activate the over-ride process. The over-ride process begins by prompting the posting party with a request for an order quantity. The message sent to the poster essentially states that the viewer, which is identified by name in the message, wishes to trade a stated quantity and that the receiving party has a stated period of time to respond, for instance, 15 seconds. The viewer will then see a copy of his/her message and a clock which displays the countdown of the stated time to the poster. The poster receives the message and can decline or accept. If the poster declines, then the viewer is informed accordingly. If the poster accepts, then the poster has the option to add a mutual put maturity, which will be stated in a specified number of months. The viewer cannot back out of the trade while the clock is running. Further, at no time is the poster in a trade until all steps are complete.

The process by which passive orders are color coded is described at this point. Regardless of the credit preference type, the trader workstation 20 generates a maximum maturity value that determines how an order will be color coded. The maximum maturity value is in the form of an integer n digits in length, with the right-most two digits representing days, and the left (n−2) digits representing months. Therefore 12000 represents 10 years, 3600 represents 36 months, and 114 represents 1 month, 14 days. The method by which credit preferences are converted to a maximum maturity value is represented by Table 2 below.

TABLE 2

| Preference Type | Maximum Maturity |
|---|---|
| Binary No | $-2^{31}$, the smallest possible integer value |
| Binary Yes | $2^{32}-1$, the largest possible integer value |
| Line Binary | The maximum maturity associated with the preference (e.g., Line Binary/12 has a max maturity of 1200) |
| Complex | The maturity of the highest band with an exposure amount greater than zero. (e.g., The following complex preference would have a max maturity of 6000) |
| | Mat Band    Exposure |
| | 100      10,000,000 |
| | 600      5,000,000 |
| | 1200     3,000,000 |
| | 3600     1,000,000 |
| | 6000     500,000 |
| | 12000    0 |

Every instrument in the system 10 possesses a maximum maturity value. To determine whether a particular order can be traded, the maximum maturity for the order's instrument is compared to the maximum maturity of the credit preference. If the instrument's maximum maturity is greater than that of the credit preference, then the order may be traded, otherwise it cannot be traded.

Note that the maximum maturity assigned to a Binary-No preference will be lower than that of any instrument, effectively making all instruments untradeable. Likewise, the maximum maturity of a Binary-Yes preference will exceed that of any instrument.

In order to determine the appropriate color code, the trader workstation 20 maintains two lists for each instrument class. One list includes the credit preferences that the viewer has set against all other legal entities for that instrument class. This list may be referred to as MY_PREFS. The other list includes the credit preferences that all other business units have set against the viewing legal entity for that instrument class. This list may be referred to as OTHER_PREFS. Each of these lists contains the following data:

Business Unit ID (Only used for OTHER_PREFS)
Legal Entity ID (Only used for MY_PREFS)
Maximum Maturity
Credit Level (Only used for MY_PREFS)

Consider, for instance, an order for an arbitrary FRA instrument placed by business unit (1) of legal entity (1). When the order is broadcast out to a plurality of traders 20 (i.e., viewers), the order will include the following information:

| | |
|---|---|
| Business unit of trader placing order: | business unit (1) |
| Legal entity of trader placing order: | legal entity (1) |
| Maximum Maturity of order: | 3600 (for example) |

In order to color code the order, the viewing party must extract and utilize his/her credit preference against legal entity (1) from the FRA MY_PREFS list, and business unit (1)'s preference against him/her from the FRA OTHER_PREFS list. From the credit preferences extracted, the color of the order as it will appear to the trader is as defined in Table 3 below.

TABLE 3

| MY_PREFS PREFERENCE Max maturity >= 3600 | OTHER_PREFS PREFERENCE max maturity >= 3600 | Color of Order |
|---|---|---|
| False | false | red |
| False | true | red |
| True | false | yellow |
| True | true | green |

Also, note that the MY_PREFS list may contain a credit level (e.g., which may be associated with the order and presented to the viewer.

Accordingly, when the user logs into the system 10, the user populates the MY_PREFS and OTHER_PREFS lists for the instrument classes for use by the credit preference module 76 (FIG. 3). This is achieved by the central processing center 12 sending to A trader workstations 20 that is logging-on one or more messages including the MY_PREFS and OTHER_PREFS lists from the database 66 on the hard disk 64 (FIG. 2).

When a user changes a credit preference assigned to a legal entity for a particular credit group in a way which causes the maximum maturity of the credit preference to change, the user will receive updates to MY_PREFS from the central processing center 12. Also, any user within the affected legal entity who is logged on to system 10 will receive an update to OTHER_PREFS. Changes to complex preferences do not require such an update unless the zero band is changed (thus modifying the maximum maturity). If the user changes the credit level associated with a legal entity, the user will receive an update to MY_PREFS.

However, these two updates should not be performed at the time the changes are made, as doing so could allow a user to determine the legal entity that placed an order by methodically changing his/her credit preferences against each legal entity from a green state to a red state until the order changed color. Instead, the required updates will be collected and sent out on an periodic basis. Also, to discourage discovery of a counterparty's identity by assigning a unique credit level to a single legal entity, each credit level should be assigned to either no legal entity, or to more than one legal entity.

Figure 12:
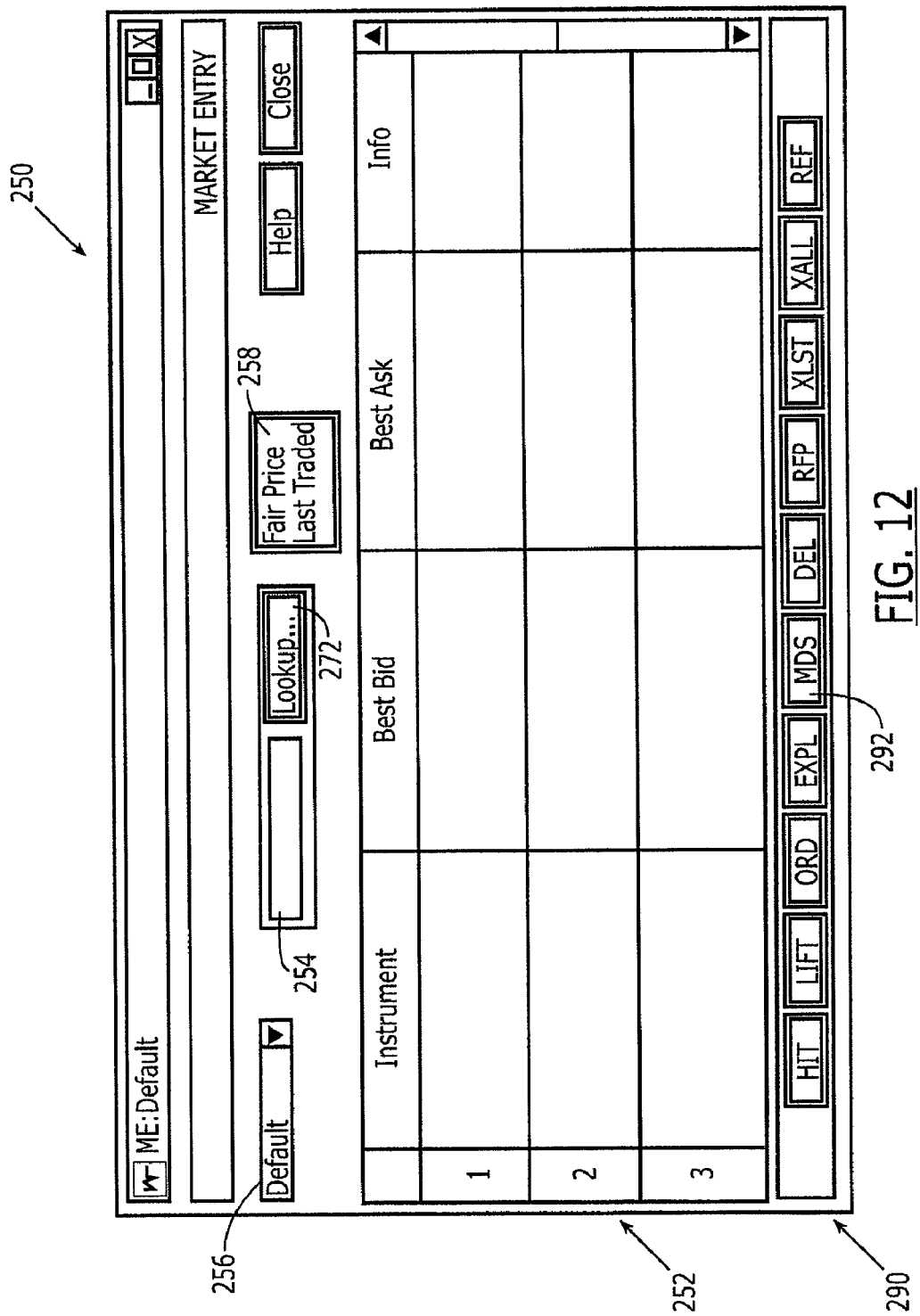
FIG. 12 is an example of a market entry interface.

From the command center interface 130, a user may enter the market entry interface 250, as illustrated in FIG. 12. At the market entry interface 250, the user can simultaneously monitor numerous markets and place orders, including bids and offers. The market entry interface 250 also allows the trader to select any instrument(s) to be displayed, and multiple market entry interfaces 250 with various trading functions (e.g., common FRA on one interface, SWAP on another interface, and Switches on yet another interface) may be opened on the trader's desktop simultaneously. The market entry interface 250 is designed to present the sum of the best bid and ask, and the act of trading by any two parties by a flashing volume indicator in the top right-hand corner. Thus, the market entry interface 250 enables a trader to easily monitor many different markets with relative ease and utility. It should be noted that the system 10 does not perform auto-matching of orders, but allows the user to maintain control of the trading process at all times. The system 10 does this by introducing the concepts of active and passive orders. A passive order is an order placed in the system 10 for a particular instrument, for a particular quantity, at a specific price, for a particular time period (see order types below). An active order is when a user decides to trade a passive order displayed in the system 10, and is usually only required to provide the quantity. Thus, there can be active or passive bids and offers.

The user may customize the market entry interface 250 by adding and removing instruments (i.e., markets) displayed in the instrument display window 252. The user may add new markets by entering an instrument symbol (according to the symbology of the present invention) into instrument identifier field 254. The user may also want to define groups of instruments which can be saved as profiles and viewed together. Profiles allows the user to organize multiple markets by like attributes. The profile being viewed is displayed in the profile display field 256. The profile display field 256 is a pull down menu that lists the other profiles defined by the user. Until the user defines a first profile, the profile display field 256 is set to default.

Individual markets displayed in the instrument display window 252 are divided into four columns: instrument, best bid, best ask, and info. The instrument column displays the instrument name (i.e., the symbol, alias or a security identifier). The best bid column displays the best bid information, defined herein as the orders that are at the best price. The best bid information includes a relatively large central number that displays the least two significant digits of the price, a bottom left number that displays all but the least two significant digits of the price, a bottom right number that displays any volume or quantity currently trading, and a top right number that displays the quantity of currency units in millions. Depending on the precision desired, a greater or lesser number of digits can be displayed as the larger central number. The precision of the displayed central numbers is defined for each instrument, and may, for example, include 2, 3, 4, or more digits. The best ask column is substantially identical in format to the best bid column, but displays the best asking price rather than the best bid price. The info column provides space for data items that the user may select to view, as defined in an info window 258. In the present embodiment, three items are defined in the info window 258, and thus, the corresponding information for the instrument will be listed in the info column.

Figure 13:
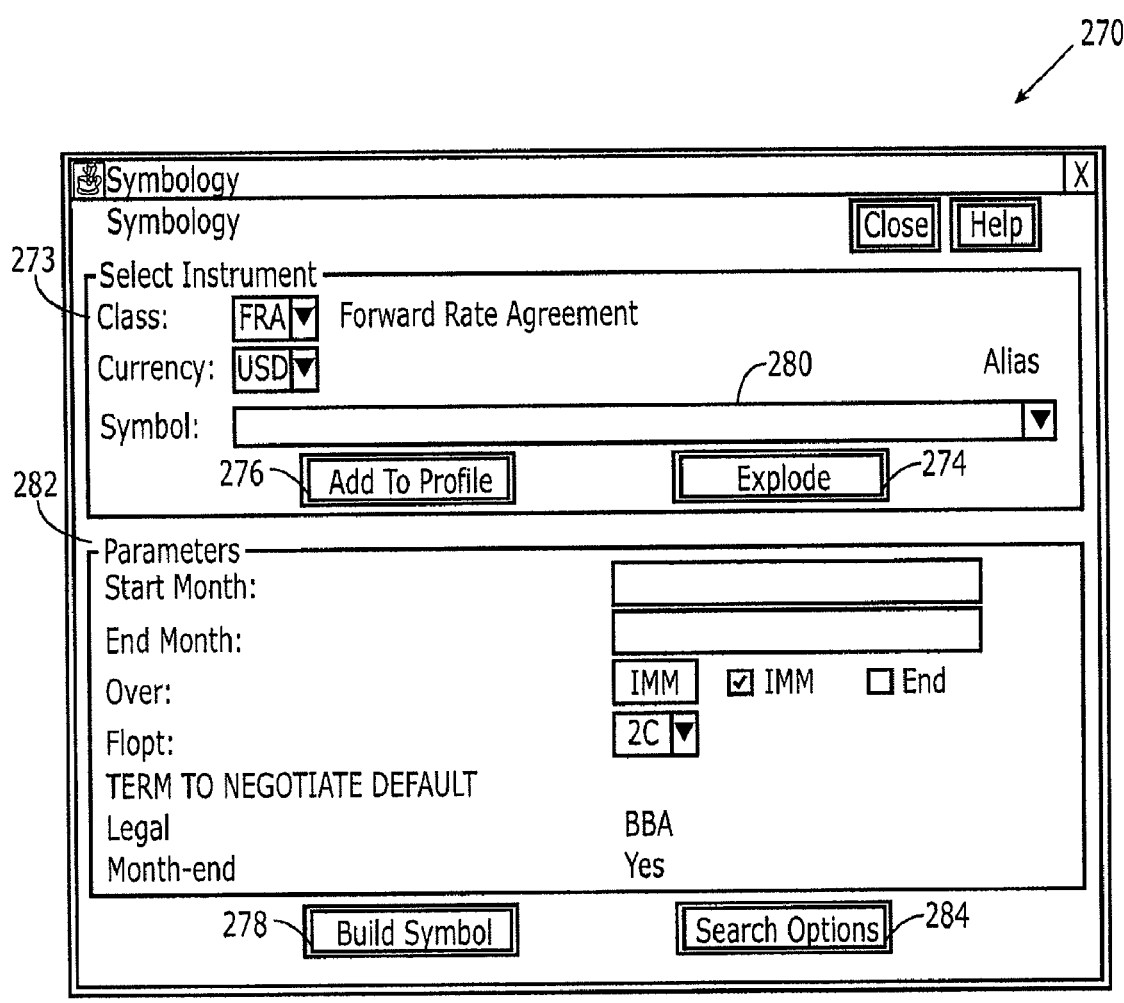
FIG. 13 is an example of a symbol definition interface.

The system 10 provides users with a symbol construction interface 270, as illustrated in FIG. 13, that can be accessed via a Lookup button 272 from the market entry screen 250. The symbol construction interface 270 functions to aid the user in selecting instruments for display in the instrument display window 252. From the symbol construction interface 270, the user can view available aliases in window 273, explode a symbol (i.e., view a list of underlying parameters associated with the symbol, for example, payment date) via the Explode Symbol button 274, select symbols to be added to a profile via the Add to Profile button 276, and construct new symbols or aliases via the Build Symbol button 278. The symbol construction interface 270 also provides error checking such that only valid symbols can be selected. An instrument should exist in the database to be valid, and not all combinations will exist. For additional verification, the symbol explode function of the Explode Symbol button 274 enables essentially all aspects of the instrument to be displayed in detail. Thus, the explode symbol feature provides a complete detailed description of the instrument in Symbol window 280.

The symbol construction interface 270 screen also enables the user to search for groups of symbols by at least partially filling out the input parameters 282 located above a Search Options button 284, and then selecting the Search Options button 284. The input parameters 282 include various non-commercial terms of an instrument that can be negotiated following a transaction. For instance, as shown in FIG. 13, the input parameters 282 include class of instrument, currency, start month, end month, over, FLOPT, and special rules. By at least partially filling in these parameters, the user can search for similar instruments which are displayed in window 280.

Referring back to market entry interface of FIG. 12, it is noted that the prices displayed in the best bid and best ask columns are encoded with credit information using the color scheme described above. As previously mentioned, color-blind users can have the color coding scheme replaced by a symbol scheme in which different symbols are positioned next to the respective prices to indicate the credit status of the order. The symbol scheme may be chosen by the user under the Environment tab of the preference interface 148 (see FIG. 6B).

It should also be noted that the inventors of the present invention are not presently aware of any electronic trading system that offers color-based credit preference pre-screening such as that disclosed herein. The present invention provides color-based credit preference pre-screening because, unlike the prior art systems which only show the best dealable price or the best minimum quantity, the present invention shows all prices (bids and offers), irrespective of their credit preferences. Thus, the user can be provided with as wide of a view of the markets as the user desires. Advantageously, the color coding enables the user to visually determine virtually instantaneously what bids and offers are tradable based on the credit preferences of the trader and the counterparty.

Once the user has entered the desired financial instruments in the market entry interface 250 via the symbology, the best bid and offers for each of the desired instruments will be displayed in the instrument display window 252. The best bid and best offer prices display in window 252 are different from many prior art systems because they are the absolute best bid and best offer at the stated quantity. Because of the unique color coding scheme, the user is able to quickly tell whether or not the bid or offer is tradable by him/her. If the user so desires, the user can select a financial instrument with the pointing device 86 (FIG. 3), such as a mouse, so as to highlight the row in the instrument display window 252 for that instrument. Once the financial instrument is highlighted, the user may perform one of several functions provided for by the function bar 290, each of which is described below:

EXPL Function: This explodes the instrument symbol into a full description of the contract, and mirrors the confirmation HIT, LIFT, ORD Functions: These three buttons allow a user to select an instrument and then place a new order, or execute an active order, by hitting or lifting the desired respective bid or offer. The HIT, LIFT, ORD functions can also be carried out by double clicking the mouse in the screen itself.

RFP Function: request-for-price messages are an important tool to allow the market to communicate. If a trader wishes to see a market, a broker will be contacted via the telephone, and the broker will in turn phone other traders to drum up interest. Using the system 10 of the present invention, the same result can be achieved instantaneously by sending an RFP to all registered users. This message may be displayed in the command center interface 130 of other users, informing them of a RFP in the named instrument. In addition, because derivatives traders are often trading more than one financial instrument, and sometimes in more than one currency, derivatives traders will often have multiple passive orders. The present invention provides at least three order management functions to facilitate the canceling or temporarily suspending the order. This may be an important functionality when the market is moving quickly, or if the position of a trader suddenly changes.

XLST Function: This function cancels the last passive order placed by the trader. Therefore, if a user submits an order and immediately changes his or her mind, the order can be canceled without the need to select the order individually.

XALL Function: This function allows the user to cancel all his or her outstanding passive orders in one key stroke.

REF Function: This function allows the user to suspend or place all orders under reference. This is an alternative to canceling orders one by one. For instance, if a user is expecting news that may affect only a few outstanding orders, it may be safer to place all orders under reference, and individually re-release the orders the trader expects not to be affected back into the market.

DEL Function: This function allows the user to delete a market from the profile.

Figure 14A:
FIG. 14A is an example of an passive order interface.

In specific regard to the ORD button in the function bar 290, a user can submit a passive order by selecting the ORD button. If the ORD button is selected, a passive order interface 294 is provided to the user, as illustrated in FIG. 14A. From the passive order interface 294, the user can place a passive order such as a bid (i.e., buy) or an ask (i.e., sell). The user enters a price, quantity, and selects how long the order will be good. The price will default to current market level so the user may only need to enter the last two digits of the price. For quantity, the system 10 recognizes m, mm and b for thousands, millions and billions, respectively. The system 10 allows the following order types to be entered under the good until option:

good until logout (default)—Requires the user to be logged on and to monitor the orders status.

good until time—The user will be prompted to enter a time (in his or her own time zone). This order does not require the user to be logged on and will be canceled automatically by the system 10 at the appropriate time.

good until canceled—This order again does not require the user to be logged on, but must be canceled by the user.

The system checks any new orders for reasonableness (or "framing") as they are placed. For example, a bid cannot be higher than the existing offer without the user double checking. The tab key, enter key, or the mouse can be used to navigate through the passive order interface 294. Upon selecting the OK button, the order is submitted into the system 10 and the user is returned to the market entry interface 250.

Figure 14B:
FIG. 14B is an example of an hit order interface.

In specific regard to the HIT and LIFT buttons in the function bar 290, a user can initiate active orders by hitting a bid (i.e., sell) or lifting an ask (i.e., buy). By selecting either the HIT or LIFT button, a hit order window or a lift order window is presented to the user. For example, a hit order window 296 is illustrated in FIG. 14B. The hit order window 296 is substantially identical to the lift order window. As shown, the hit order window 296 identifies the instrument and order price. Further, the user is presented with a transaction quantity which is initially set for the full amount being offered by the counterparty. The user is allowed to reduce the quantity figure. The user is not allowed at this point to increase the quantity figure because the counterparty has already indicated the quantity they are desiring to sell. Upon selecting the OK button, the order is executed by the system in the manner described below, and the user is returned to the market entry interface 250.

Figure 15:
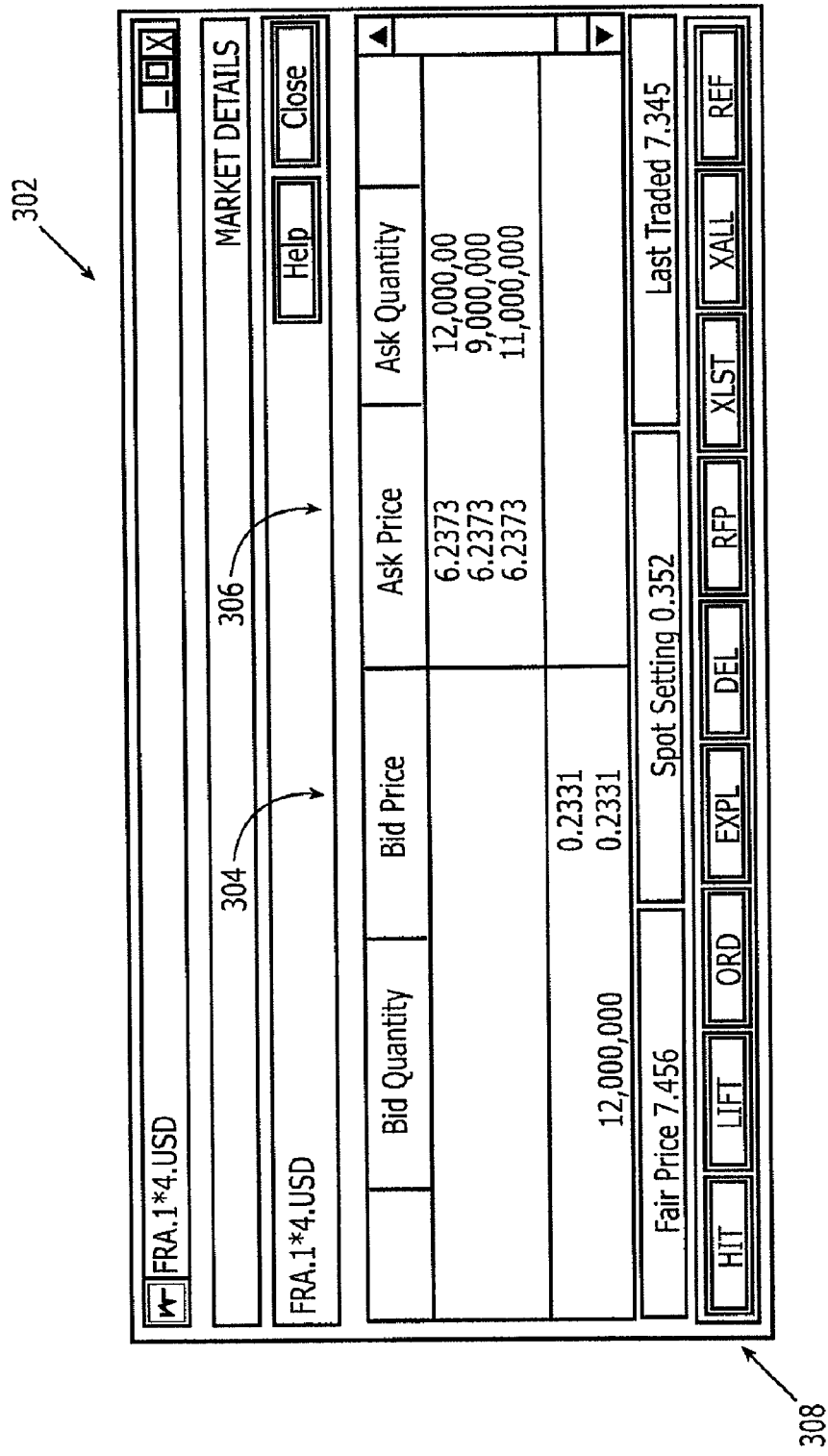
FIG. 15 is an example of a market detail interface.

In addition to the above functions provided by the function bar 290, if the user wants to see the full depth and breath of a particular market in a particular financial instrument, the user can select (e.g., highlight) an instrument in the instrument display window 252 and then click on the MDS button 292. This will launch the market detail interface 302, as illustrated in FIG. 15 for the highlighted instrument.

The market detail interface 302 enables a trader to view essentially all the orders in the market for a particular instrument, both bids and offers. The bid orders are listed in a bid window 304 where the credit levels (e.g., A, B or C), bid quantities and bid prices are provided. The offer orders (i.e., ask orders) are listed in ask window 306 where the ask prices, ask quantities and credit levels are provided. As with the market entry interface 250, the orders are color-coded with the appropriate credit preferences. This is a significant departure from many prior art systems which only show the best dealable price or blended prices.

In the market detail interface 302, orders are individually listed in the bid window 304 or the ask window 306 in order of price, and then according to the time the orders were entered into the market. The user has the ability to select any order on the screen and hit or lift the order, assuming of course that the respective credit preferences will permit a trade. The user is provided with a function bar 308, which is substantially the same as function bar 290. Particularly, the buttons of the function bar 308 are substantially identically to those on the function bar 290 except that they only apply to a particular instrument while the buttons of the function bar 290 apply against multiple instruments. Further, a fair price indicator, spot/setting indicator (i.e., the LIBOR for that day), and last traded price indicator are provided along the bottom of the bid window 304 and ask window 306. The last trade pricing may be replaced by volume, duration, RQ, last close price, etc.

An advantage of the market detail interface 302 is that the user is not restricted to trading only the best price or first order. At no point in the process will any orders be automatically matched against each other by the system 10. The user is in complete control of the order flow process.

Thus, the user can execute both passive and active orders from either the market detail interface 302 or the market entry interface 250. At either interface 250, 302, if the user wants to execute a trade, then the user only need to highlight the desired bid or offer and select the corresponding function button from the respective function bar 290, 308 to initiate the transaction. Although the semantics of placing, changing, and canceling orders can be relatively complex, the user is shielded from this wherever possible by the system 10.

Each order entered into the system 10 is placed into a queue based on price and time received. A change to the order may or may not affect the order's place in the queue. Any change of price will move the order up or down in the queue depending on the price level. Any decrease in the volume of the order will not affect the order's place in the queue. Any increase in volume will result in the previous amount holding its place and a new order placed for the balance.

Effective electronic trading should be intuitive, fast and reliable. In order to facilitate this, the present invention is designed to maximize a user's efficiency. The system 10 enables the user to place passive orders from either the market entry interface 250 or market details interface 302 using the input device 86. For instance, the user may double click on the instrument name or may select the ORD button of the function bar 290, 308 in order to launch the passive order interface 294.

Once an order has been submitted, it will immediately be updated to the market entry interfaces 250 and market details interfaces 302 of other users, providing the user has a current subscription (i.e., field setting) to the instrument.

For monitoring the status of a user's outstanding (or open) passive orders, and for making quick adjustments to those orders, the present invention has a facility known as an outstanding order blotter 320, as illustrated in FIG. 16. The outstanding order blotter 320 summarizes all outstanding passive orders and provides the user with the ability to confirm the terms of the trade, the symbol, and the type of order. In addition, the outstanding order blotter 320 enables the user to quickly change the price, quantity, or good until status via drop-down menus that appear when an order is selected. From the outstanding order blotter 320, the user may also place new orders and/or cancel a particular order in the market. Thus, the outstanding order blotter 320 gives the user the ability to manage his/her current passive orders in the market from a single interface. As with the market entry interface 250 and market detail interface 302, the user is provided with cancel all, cancel last, and refer-all functions via the outstanding order blotter 320. This is a significant advancement over many prior art systems in that not only does the system 10 offer a facility to track all current passive orders, but the system 10 also enables the user to modify, add or delete passive orders from the outstanding order blotter 320 without returning to the market entry interface 250 or market detail interface 302.

For executed or canceled orders, the user is provided a client monitor 330, as illustrated in FIG. 17. From the client monitor 330, the user has access to completed or canceled trades. Thus, the client monitor 330 enables the user to quickly see what orders have been executed or canceled, and to look back over time to see pervious days trades. Preferably, historical transactions will be available for one month via the client monitor 330.

The outstanding order blotter 320 and client monitor 330 enable a user to manage his/her diverse trading activities. From either blotter, the user can monitor the status of orders and executed or canceled trades. Both of the outstanding order blotter 320 and client monitor 330 can be accessed from the command center interface 130. Further, the blotter 320 and monitor 330 are updated automatically if the user submits an order via one of the other interfaces.

The system 10 permits active orders (i.e., those where a trader hits or lifts a passive order) to be placed from either the market entry interface 250 or market detail interface 302 via the HIT and LIFT buttons on the function bars 290, 308. The system 10 differs from many prior art systems in that two passive orders will not be executed against each other automatically. An active order from an active user is required for execution. Furthermore, there will be one active and one passive user for each trade. This means choice (where bid equals order) or even backwardation (where bid is higher than order) markets are possible. Accordingly, for a transaction to be completed in the system 10, an action must be performed against a passive order.

Figure 18:
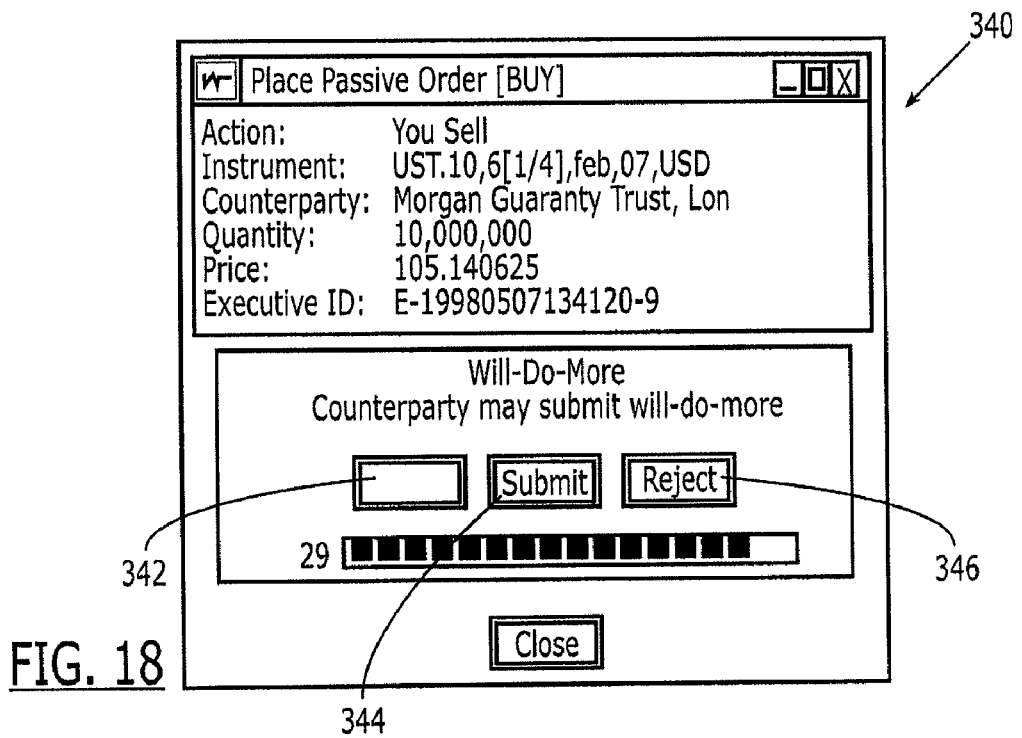
FIG. 18 is an example of a execution notification and quantity negotiation interface.

Once an active order has been placed in the system 10, the execution process is completed. An execution notification message 340, as illustrated in FIG. 18, is sent to both counterparties, describing the transaction and disclosing the names of the counterparties. Note, this is the first point in the transaction that the counterparties are identified to one another. The system 10 ensures that both users receive the message before the trade is finally completed. This does not require any form of action from either user, the market interface module 74 (FIG. 3) of each trader responds for the respective user. This validation ensures that, in the unlikely event that a connection is lost during this process, a user does not have a position of which he or she is unaware.

The system 10 is designed to ensure that a user cannot execute a passive order which has been canceled or is no longer available. This is done by checking to verify that the connection between all trading counterparties is live at all times. In the event that the connection is lost or broken, all orders from a user which loses connection to the system 10 are automatically suspended. Following the execution, the client monitor 330 is updated with the transaction.

The execution notification message 340 (FIG. 18) provides the users the opportunity to increase the quantity of a trade once an initial trade has been executed. One of the users can insert a quantity in the will-do-more field 342 which represents an additional quantity to the original amount. This feature is designed to enable a user who has a large quantity to trade to place a passive order for just a smaller portion initially. Users often want the ability to increase the quantity of an order when they have a large quantity to transact. This is because large orders in the market often tend to adversely move the price of the market as market participants back off such large size. The ability for the passive trader to conduct an anonymous dialogue via the system 10 for increasing the size of a transaction after an initial transaction for a smaller size has been executed is an additional difference between the system 10 and many prior art systems. In operation, once an amount has been entered into the will-do-more field 342 and the Submit button 344 selected, the counterparty is provided with the request for more. The counterparty is given a discrete period of time to respond to the request to do more, after which the request lapses. If the counterparty wants to trade more, then the counterparty can accept the amount requested, reject the amount by selecting the Reject button 346, or the counterparty can request a different amount that is then present back to the user who then has a discrete period of time to respond. The counterparties can exchange offers to increase the quantity as many times as they desire until an addition amount is agreed upon or a decision is made not to do more.

This function should preferably be made available only if the active order clears the full market size at the current best price. In that case, either party may ask to do more. The will-do-more feature enables the counterparties to increase the size (amount of the trade), but not the price. The price is preferably not affected. This process can go back and forth for some time and can continue as long as the will-do-quantity is fully accepted (i.e. can occur more than once). Once completed by both parties, the system will combine all will-do-more quantities and generate only one transaction ticket for the total increased amount at the initial price.

Figure 19:
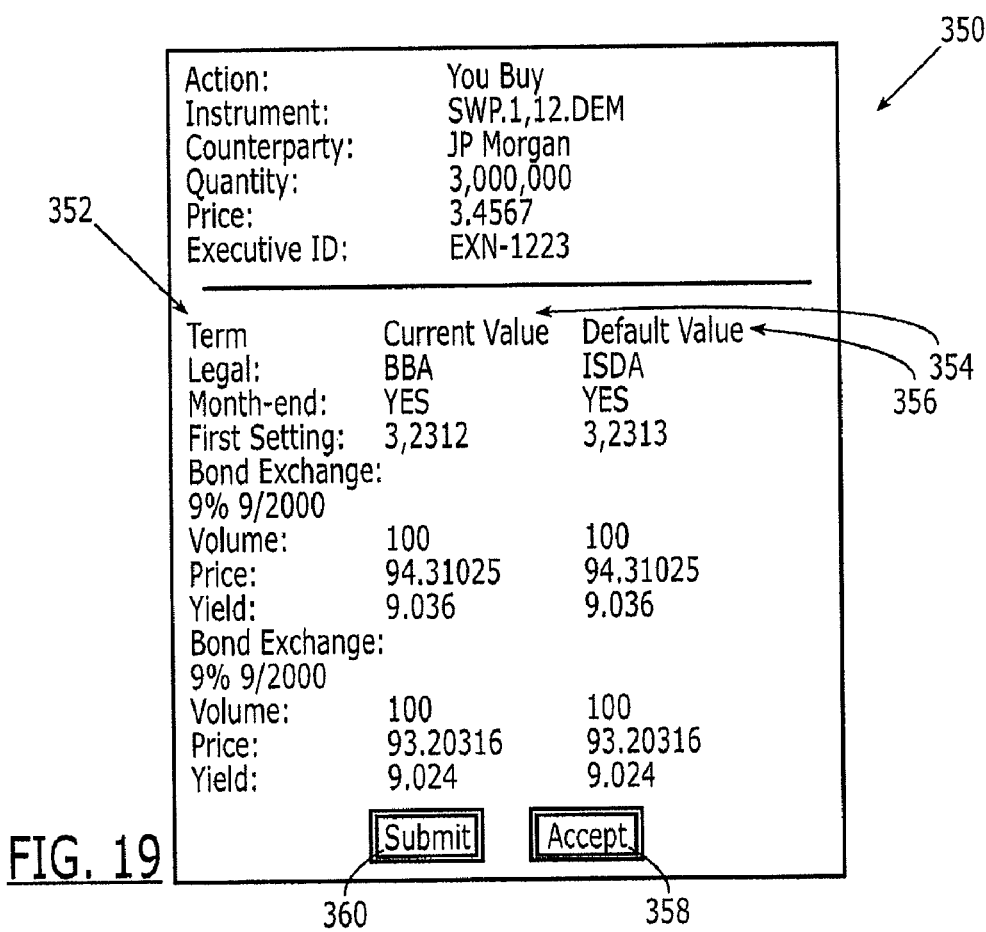
FIG. 19 is an example of a term negotiation interface.

Following the execution of a trade, the system 10 enables the parties to negotiate the non-commercial terms of the transaction. This process is referred to as term negotiation, and is effectuated through the negotiation window 350, as illustrated in FIG. 19. The term negotiation process is a process where by both parties to a trade have the ability to negotiate non-commercial terms of a transaction. In addition to the commercial terms, such as price, quantity, etc., derivative transactions also have non-commercial terms which do not affect the price of the trade. While there are defaults, the parties may want to negotiate these terms. Once a trade has been executed, the system 10 will present the parties with the option to negotiate via interface 350. The system does not force a party to complete this process immediately, however, as the party may have other more important tasks to complete elsewhere. The negotiation should, however, be completed within a reasonable time. The active party (i.e., the trader that hit or lifted the order) will be presented with the terms 352 to be negotiated, current values 354 which are editable (such as by a text field), and default values 356 which are predefined in the system. The trader may accept the system defaults by selecting button 358, or enter his/her own desired values and select the submit button 360. These values are sent to the passive trader (i.e., the trader that placed the order in the system originally) who may also accept or enter his/her desired values. If an agreement cannot be reached, then the defaults will be used. The status of these negotiations will be displayed in the client monitor 330 of FIG. 17.

Once a trade has been executed and the non-commercial terms have been negotiated, a trade confirmation is sent automatically to the settlement contact of both business units preferably via fax. The system 10 can also send the confirmation via file transfers, e-mail, or any other suitable means of communication. Preferably, the trade confirmation includes the quantity or volume traded, identification of the financial instrument that was traded, price, date and time the execution is recorded, and a settlement ID that uniquely identifies the transaction. However, it is recognized that various other parameters and transactional data can be included as appropriate for the nature, type and subject matter of the transaction.

In addition to the interactive trading functionality described herein, the system 10 also offers traders a trading methodology for dealing with risk management problems unique to interest rate swap dealers. In particular, over the last few years, a new market has emerged as a result of interest rate swap dealers' need to better manage their risks associated with changes in interest rates on their growing interest rate swap portfolios. With these markets becoming more competitive, bid-offer spreads are narrowing considerably. This factor, combined with the wide spreads of exchange traded Eurodollar futures, has contributed to the use of exchange traded contracts for hedging short-term risks being expensive and sub-optimal. As a result, the switch was created. A switch is simply the simultaneous purchase and sale of a pair of similar forward rate agreements. This instrument, and the mutually offsetting need of a pair of derivative portfolio risk managers, provide an improved risk management tool for a large portfolio of interest rate swaps. Despite the obvious advantages and demand from risk managers, as a result of the complexity and time-consuming nature of completing a transaction, the switch market has grown relatively slow. This may be because risk managers are very wary of disclosing the exact nature and size of their own portfolios. Therefore, finding the counterparty that has the opposite need is often difficult.

Typically, a dealer prepares a fax listing the days that the dealer needs to buy or sell, but not the amount or importance of any given date. The dealer sends the listing to other risk managers at other firms, or to voice brokers. From this bit of incomplete information, transactions are eventually negotiated. While finding switches may be important, it is usually not urgent as compared to other more immediate tasks, such as new executions or the hedging of large outright market risks. As a result, the time is never quite right to focus on a position that may be heavily weighted on one side and matches another's position, but not perfectly. Voice brokers have tried to solve this by matching multiple faxes, but this does not appear to be the solution.

The present invention goes several steps beyond these efforts, and offers switches matching offsetting risk positions with the credit preferences of the traders taken into account. The system 10 also demonstrates fairness in any matching process. When the portfolios are so large that each risk manager has a position on each day out over the life of his or her portfolio, the resulting combinations can be huge. The rules, constraints and priorities are preferably structured in a way to demonstrate fairness of execution between users to the market participants.

Figure 20:
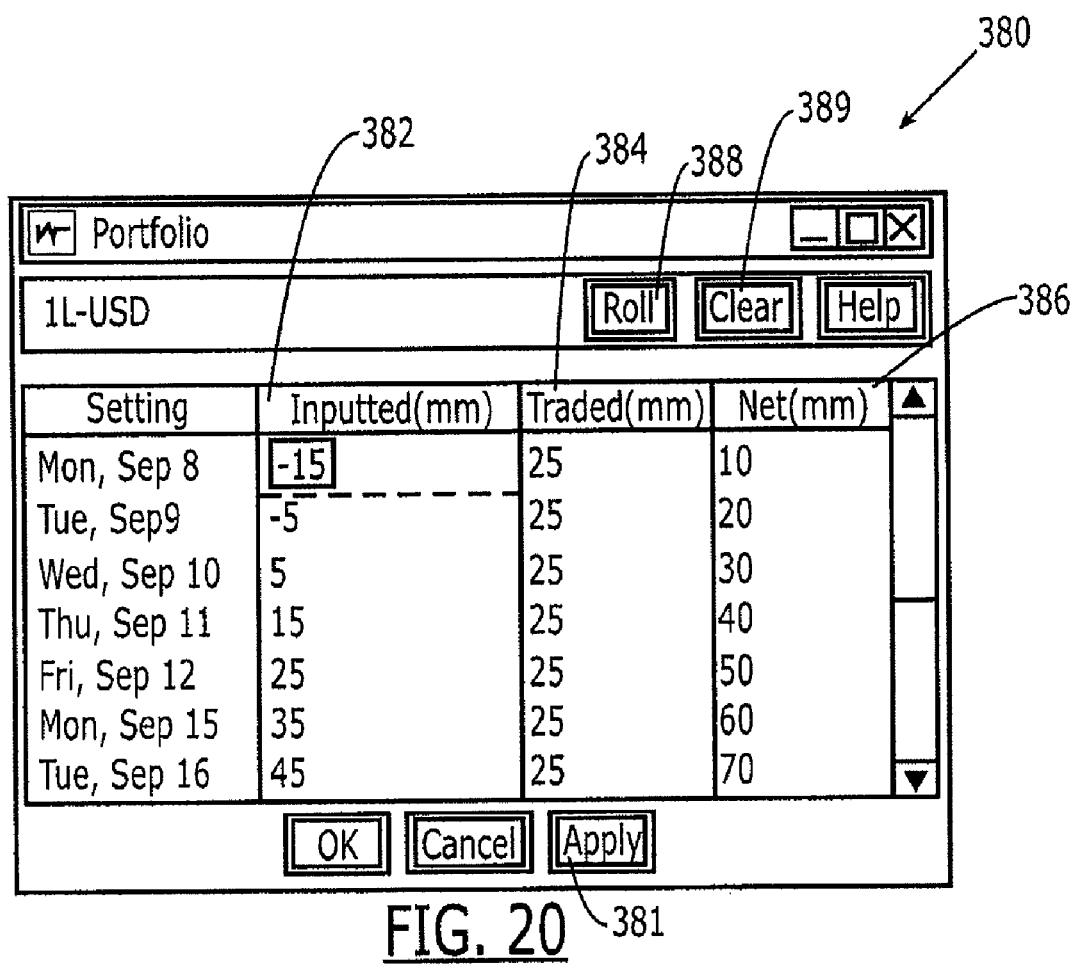
FIG. 20 is an example of a user position portfolio interface.

In a significant departure from known attempts by others, the present invention offers traders a solution to the complexities of switch trading by creating an anonymous position discovery system called the switch engine. The objective of the switch engine is to put a tool in the hands of risk managers that allows them to perform anonymous switch transactions fast and efficiently without losing control of the process. The switch engine achieves this by having the trader manually input his/her position (i.e., interest rate risk portfolio) into the switch module 80 (FIG. 3) via a portfolio interface 380 using variable rate index and currency for up to 180 days or more into the future, as illustrated by FIG. 20. Once a portfolio is inputted, the user must confirm its accuracy by selecting the Apply button 381 before the positions can be used in the switch mechanism 35 of the central processing center 12 (FIG. 2).

In addition, the system 10 can be configured to receive the position data via electronic transfer or some other suitable form of data transfer. This may include a transfer directly from the user's own risk management systems. Although some trader workstation 20 may need some customization to receive portfolios in this matter, the system 10 should support this capability. The nature of switch positions, particularly in the near term (defined as out to the maturity of each index), is relatively stable, and therefore, the on-line entry of portfolios by the user should be adequate for most traders. The inputted portfolio data is then sent from the trader 20 workstation to the switch mechanism 35 of the central processing center 12.

With reference to the portfolio interface 380 of FIG. 20, an inputted column 382 represents the portfolio entered by the user, the traded column 384 is the cumulative amount traded by the user since the portfolio was entered in the inputted column 382. The net column 386 is the real-time position of the user given the portfolio inputted and the traded quantities in column 384. The user may restart at any time by rolling the net positions in net column 386 into the input column 382 by selecting the Roll button 388, or by clearing all the positions by selecting the Clear button 389.

Figure 21:
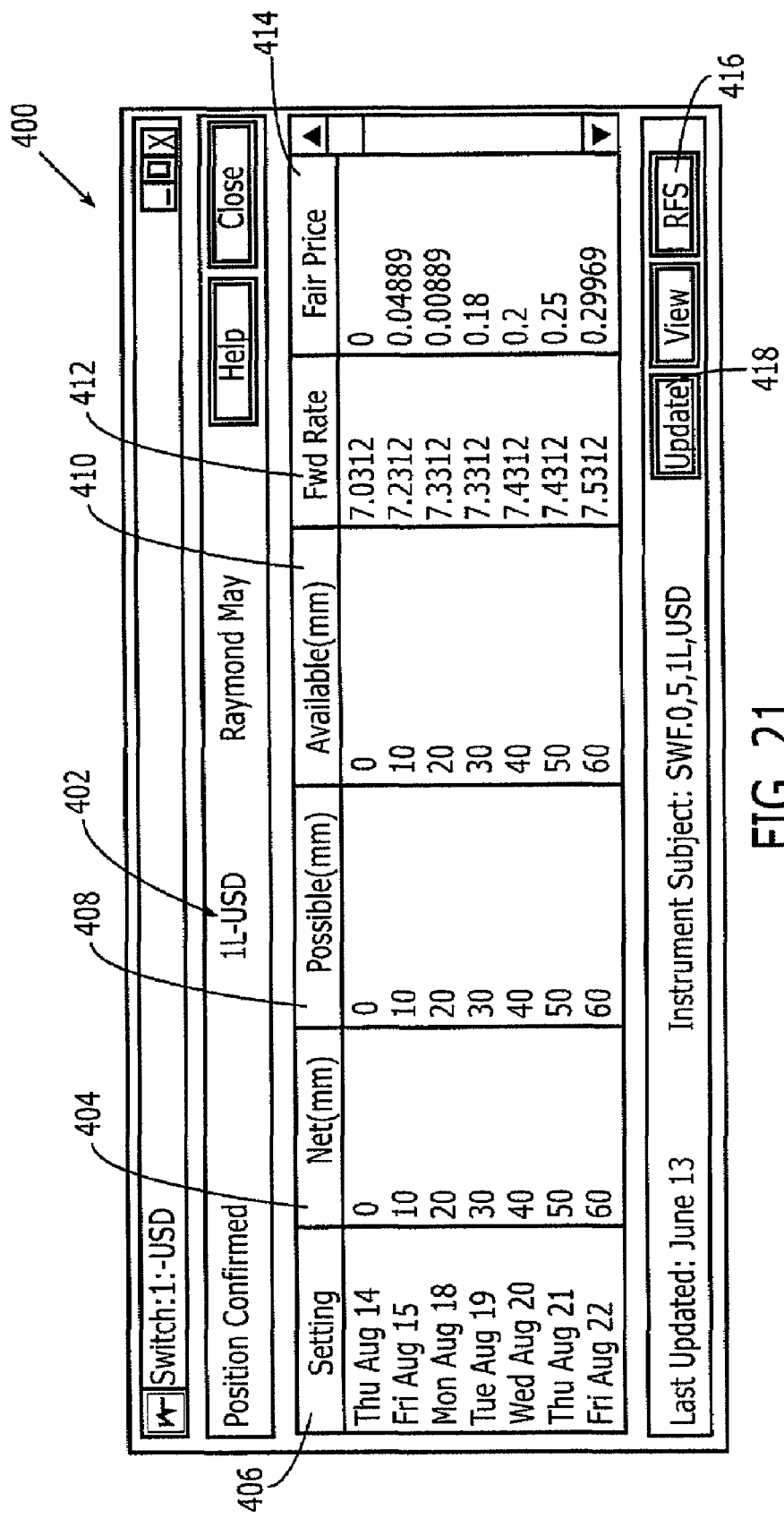
FIG. 21 is an example of a switch interface.

Once the position is inputted in the system 10, a switch interface 400, as illustrated in FIG. 21, is generated by the switch module 80 using his/her own position data from other traders entered on the respective trader workstations 20 and uploaded to the switch mechanism 35. The switch interface 400 enables the user to search through the market, and view possible trading combinations of his/her portfolio and combinations of his/her portfolio against positions from other counterparties which have been input into the system. This is referred to as position discovery. The switch interface 400 can be reached by selecting the switch engine button in the tool bar 132 of the command center interface 130 (FIG. 5). For a given floating rate index (for example, a one month LIBOR) 402, the switch engine interface 400 lists the net positions 404 for each day 406 out 180 days. In addition, the possible switches 408, available switches 410, formulated forward rate 412, and a fair price 414 are also listed for each day 406. By selecting a day 406, the switch interface 400 displays all possible switches against that day. Thus, the user can pick the days for which he/she is carrying the most risk. An advantageous feature of the switch interface is that the user is provided with only combinations where he/she has a position and someone else has the opposite position, and both parties satisfy each other's credit preferences as described above.

The net position 404 is the position entered or modified by the user. Possible switches 408 are those switches for any given day with respect to the trader's own position. Note, a switch typically makes sense only if the trader's position is long one day and short on another day.

The available switches 410 are positions in other counterparty portfolios that exactly offset the position of the user. Note that the switch interface is configured to displays available switches up to the size of the user's own position, and preferably does not disclose the name(s) of any counterparties until after a trade has been completed. This ensures the anonymity of the user, and does not disclose any material position data to other traders.

The forward rate 412 is the current market forward rate calculated by the system from other available market rates for the given date for the maturity of the underlying index maturity. The fair price 414 represents the relative price between the two underlying FRAs, which is the basis upon which forward rate agreements are traded. The fair price 414 is calculated from live market data taken from other financial instruments. While not designed to execute trades at the displayed fair price 414, the fair prices are an aid to users in gauging the fair value of the market.

Once a user has found a switch that matches the needs of the user, that is shown as an available switch 410, then the user may send a request for switch message by selecting the request for switch (RFS) button 416. In response thereto, an RFS message is sent anonymously to only the other counterparties of the selected offsetting positions. Anyone of the receiving counterparties may then add the symbol automatically into a market entry profile by selecting (i.e., clicking on) the message and completing the transaction utilizing the market entry interface 250, as described herein. Upon completion of a switch by the switch mechanism 35, the portfolio's of the counterparties are automatically updated to reflect the switch. In accordance with a feature of the switch engine, switch transactions can be accomplished in real-time.

As an example of a switch, a trader viewing the switch interface 400 may select (i.e., highlight) the "Thurs., Aug. 21" position, and then select the RFS button 416. The passive order interface 294 (FIG. 14A) then prompts the trader with a quantity and price which the trader may modify. The trader may then submit the request for the switch. All anonymous counterparties that have an offsetting position then receive a message in command center interface 130 (FIG. 5) notifying the counterparty of the anonymous request for a switch. Any one of the counterparties may then select the request message which causes the request to be displayed in the market entry interface 250 (FIG. 12). From the market entry interface 250, the counterparty can hit the request for switch or submit their own passive order.

The trader can update or modify his/her portfolio by selecting the Update button 418, which launches portfolio interface 380, as described above. The trader can then select an inputted amount 382 or a traded amount 384 to enter or edit the displayed values as desired.

It should be noted that the present invention has application in financial markets other than derivatives. For instance, in the inter-dealer market, a switch or swap may be a desirable means by which a risk or inventory short fall is off-set. In particular, a security may be borrowed or an open derivative position hedged with another position. For instance, in the U.S. Treasury bond market, it is conventional for traders to buy and sell securities, and to hedge with the newest or benchmark issues. The U.S. Treasury may issue new two year securities each month. For the first month, the new issue is the benchmark (or on-the-run) issue, and the other issues with a final maturity between one and two years are referred to as old issues. If a trader is asked to buy an old issue, then the trader will sell the on-the-run as a hedge since the on-the-run has the liquidity. Over time, the trader will most likely need to sell the old issue and buy back his/her hedge. A switch with another dealer that has an opposite position provides cost and risk effective method of effectuating such a trade.

However, the unwillingness of traders to disclose their position has made bond switches difficult. Thus, the switch engine of the present invention is a solution. The principals of the switch engine can be successfully applied to bond switches, as well as other financial instrument switches. The switch engine interface 400 may need to be slightly modified wherein the instrument designation 402 is changed to reflect the new market, for instance, to Two Year U.S. Treasuries or 30 FHLMC TBA. Further, the setting column 406 may be changed to reflect the individual securities which may be switched, and the remaining columns should not need to be changed. However, a new column representing the duration of each security displayed should be added so that the securities can be duration weighed to ensure fairness.

In addition to the switch engine, the system 10 provides trading methodologies referred to as the auction and switch auction. Although auctions are held in a variety of markets, some of which are electronic, the auction and switch auction have no known counterpart in the derivatives markets. The auction and switch auction trading methodologies were developed in order to provide an auto matching process for switches. However, the system 10 can use these auction methodologies for auto matching for a wide variety of other financial products, not just switches.

Unlike traditional auctions, where once a trade is completed the counterparties are free from future financial commitments, with derivatives trading, the counterparties may end up with multi-year financial commitments to one another once a trade is executed. In order to deal with this relatively unique problem, the auction and switch auction take the credit preferences of the users into account. The auction methodologies herein are referred to as a two way Dutch auction with credit. In conducting such an auction, users submit orders into the auction module 81 of the trader workstation 20 (FIG. 3) which communicates the information to the auction mechanism 34 of the central processing center 12 (FIG. 2). The orders are submitted via an auction interface 430, as illustrated in FIG. 22A, by price, quantity, and action.

Figure 22A:
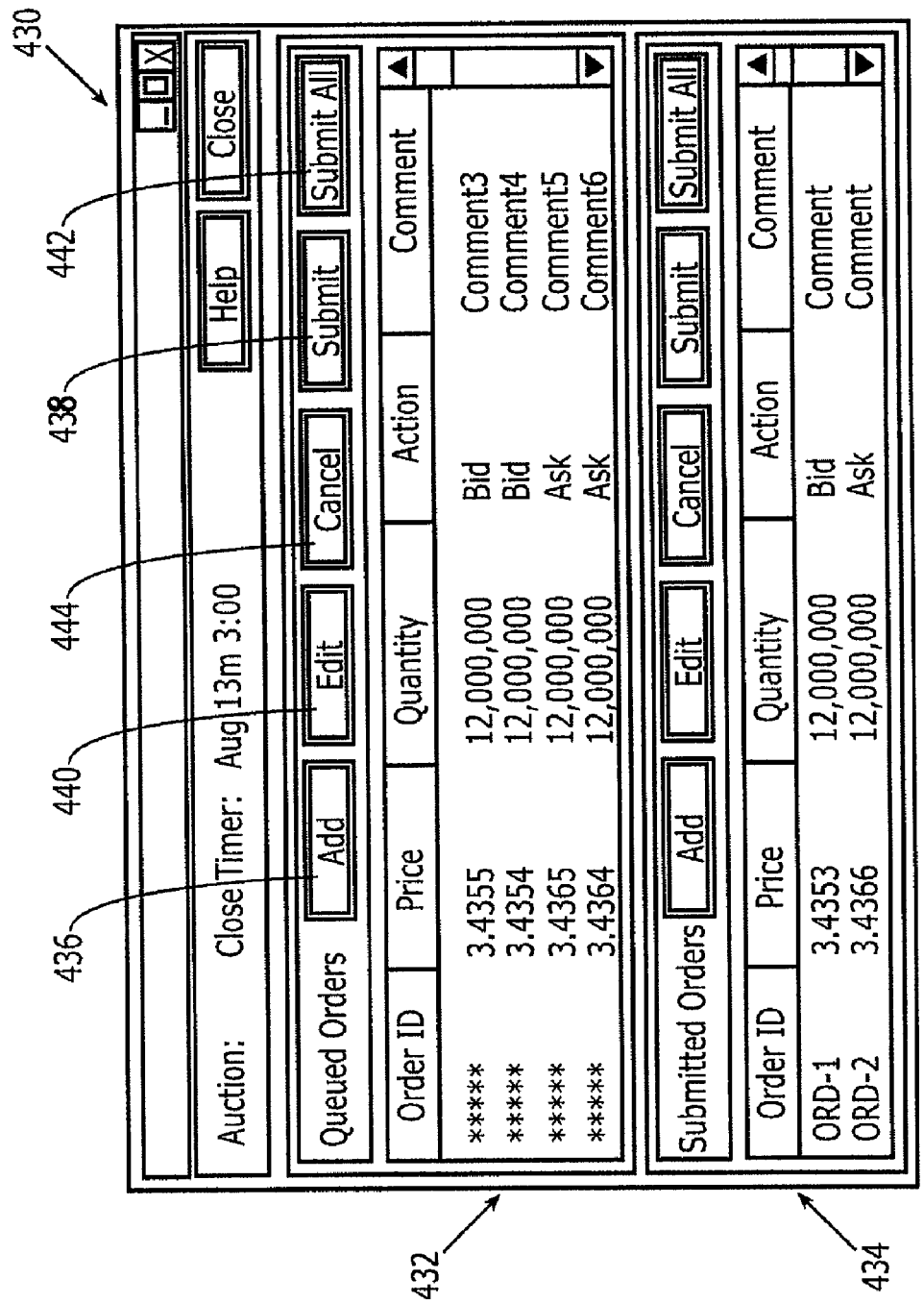

With reference to FIG. 22A, the auction interface 430 includes a queued orders window 432 into which the user enters an order, and a submitted orders window 434 which shows the orders submitted to the auction mechanism 34 via the auction module 81. Orders can be added via the Add button 436. Orders are moved from the queued orders window 432 to the submitted orders window 434 by highlighting the order and then selecting the Submit button 438. All entered orders in the queued orders window 342 can be submitted at once by highlighting all the orders and then selecting the Submit All button 442. Prior to submitting an order, the orders in the queued orders window 432 can be edited via the Edit button 440 or canceled via the Cancel button 444

In accordance with the auction, the orders are filled at their entered price or better, and between counterparties that satisfy the credit preferences of one another. The auction mechanism 34 then conducts the auction, preferably utilizing the following constraints and priorities to ensure fairness.

The auction price is calculated by finding the price at which the most volume is traded. This condition is sufficient to generate a fair price, and all transactions should be completed at this price. It is noted that this price is generated without taking credit into account. The matching of orders is completed to ensure that credit preferences (including complex rules) are safe guarded and to ensure that the minimum number of tickets are generated. The better submitted prices will have priority, and all orders at the auction-price are filled in proportion to each other. Under these constraints, the auction mechanism 34 executes the auction, matching users and generating a settlement list. The settlement list comprises the trades resulting from the auction.

The confirmation process is substantially the same as that for interactive trades. The system 10 notifies the users of their fills. Finally, results will be made available to the user via a message to the command center interface 130 of each user.

In addition to the general auction facility described herein, the present invention also offers a dedicated limited automatching process for switches referred to as the switch auction. The switch auction does not have to be a full auction, in that the price may be set by the system 10. The price will, however, be available before the commencement of the matching. This will allow all users to understand the levels that will be used before entering into the switch auction. This also allows the users to maintain control of their positions.

As with the general auction, the positions of each trader are loaded into the system 10 utilizing a switch auction interface 460, as illustrated in FIG. 22B. The switch auction interface 460 has two parts, an auction list 462 and an auction status 464. In the auction list 462, various auctions and their respective statuses are listed by FLOPT and currency. In the auction status 464, the auction selected in the auction list 462 is displayed and identified (including the open and close day/time). The positions 466 for respective dates 468 are entered by a user, and do not need to add to zero, but should include positions of both signs (i.e., long and short). The rate 470 is the price at which the auction is conducted. The rate 470 is displayed a predetermined amount of time before the auction is conducted so that the participants have the opportunity to step out of the switch auction if they so desire. The rate is preferably based on available market factors, and may be calculated by a calcserver (as described below). The results column 472 is the total trade amounts resulting from the auction. The amount displayed in the results column 472 for a given date may be the cumulative amount from multiple transactions with multiple parties. Additional control buttons 474 enable the user to submit an order, cancel an order, cancel all orders, or change an order. The switch auction will automatch the position, taking credit preferences of the users into account so that (1) a maximum volume is executed and (2) a minimum number of tickets is generated.

The switch auction utilizes the above two rules to ensure fairness. No user will be given priority over any other user except as required to satisfy the respective credit preferences. Preferably, only two-way switches will be offered. Switches are a risk management tool, and switches generated between three counterparties introduces substantially more credit risk than a straight two-way switch.

At this point, the calcserver which calculates the auction rate and price information, and other relevant data for operation of the system 10 is described. The calcserver provides the switch mechanism 35 with the forward rate for any given index for each day, the system price quoted in the market entry interface 250, and OTC derivative prices derived from the yield curve. The calcserver comprises a preprocessor, a zero curve server, a FRA server and a Swap server. The preprocessor gathers real-time data from outside data vendors (such as Reuter or Telerate) and from internal system sources (such as data normally entered into system 10), and prepares the data for processing by the other components of the calcserver. The zero curve server reads in the market rates (including price and yield for a variety of class instruments such as money market rates, swap rates, future prices, swap spread, bond yields and FRA's) as provided by the preprocessor, and generates therefrom the zeros and discount factors for each currency and level of credit. In particular, a zero coupon yield curve (i.e., zero curve) comprises a set of points representing the calculated interest rate or discount fact from observable market rates across the term structure (e.g., 0 to 30 years) such that any cash flow can be discounted to today in one step without the consideration with decompounding. Thus, there is a different zero curve for each index/currency pair. The FRA and Swap servers are instrument specific servers that calculate forwards, RQ (as defined above), durations and fair prices.

By way of example, the zero curve calculation starts from the instruments with the shortest term structure in the money market rates (MMs). The analytics for finding points on the zero curve from MMs are as follow. The processed price of the MMs, end date of the MMs and the basis of the MMs (number of days in a year that the MMs is based on) are needed. All of these are stored in a database 64 (FIG. 2). The processed price is the only input that typically changes. The calculation represented by the equation below will generate a new zero rate with the date of the end date of the MMs. The result will be a new zero point which will be added to the rest of the generated zero points. The following equation for Z(t) is the zero rate at the end date of the MMs:

$$z(t) = \left(1 + R_{mms} * \frac{t}{mmsBasis}\right)^{365/t} - 1$$

where Rmms is the processed price of MMs, and t is the time in days between the end date of the MMs and the current date.

After the MMs, the next instruments used according to term structure are either the futures or FRA's. Since the futures and FRA's have similar term structures, a choice will be made on which ones to use. Initially the futures will be used because they have high liquidity. However, it is believed that when FRA's traded on the system 10 reach a high level of liquidity, they should be used instead.

When calculating zero points from the futures, the processed price, the future basis (number of days in a year that the future is based on), the start date of the future, the end date of the future and the zero point of the start date are needed. This data about the future will come from the preprocessor which is used to represent the future. The zero point at the start date is found from previous zero points through interpolation. The following equation for z(e) is the zero rate at the end date of the future.

$$z(e) = \left[\left(1 + futRate * \frac{e-s}{futBasis}\right)(1 + z(s))^{s/365}\right]^{365/e} - 1$$

where futBasis is the number of days in a year that the future is based off, futRate is the processed price of the future, e is the end date minus current date, and s is the start date minus the current date.

The calculation of the FRA zero points is the same as for the futures except that the processed price for the FRA and the FRAbasis are used instead of the processed price for the future and the futurebasis. The information about the FRA will come from the preprocessor. The following equation for $z(e)_{fra}$ is the zero rate at the end date of the FRA:

$$z(e)_{fra} = \left[\left(1 + fraRate * \frac{e-s}{fraBasis}\right)(1 + z(s))^{s/365}\right]^{365/e} - 1$$

The rest of the zero curve will be derived from swap information. For the first swap, the zero curve and the discount factor at each coupon date are used to calculate the zero rate and the end date in the swap using the equation below for $Z(t_n)$. When calculating other swap zero points, gaps may exist in the zero curve. Synthetic swap rates are calculated where gaps exist to improve accuracy. The calculation of a normal swap rate and a synthetic swap rate are the same. The following equation for $Z(t.sub.i)$ is the zero rate at the particular coupon date:

$$Z(t_n) = \left[\frac{1 + swapRate * Y(t_{n-1}, t_n)}{1 - swapRate * \sum_{i=1}^{n-1} \frac{Y(t_{i-1}, t_i)}{(1 + Z(t_i))} t_i / 365}\right]^{365/t_n} - 1$$

where swapRate is tradePriceAdjust, t.sub.i represents a coupon date, and Y(t.sub.n−1,t.sub.n) is the period in years between the two coupon dates.

Once the trades have been executed and the term negotiation process completed, the system will initiate an automatic confirmation process which, in an embodiment of the present invention, will follow existing market practices. Accordingly, the system 10 will automatically send a fax confirmation message to each counterparty detailing the transaction. The faxes should be sent immediately after a transaction is completed. The confirmations should follow a unique format, allowing the automatic transfer of these confirmations electronically.

This confirmation has been specially developed to allow for a standard format covering all classes of financial contracts. The standard confirmation follows the following format:

Section 1: Summary of the transaction.
Section 2: Counterparty details and commission.
Section 3: Transaction details.
Section 4: Term negotiation This provides the users with adequate information to identify and/or record the transaction. The conformation, however, may be sent to the traders any number of ways such as via e-mail, voice-mail, United States Postal Service, or commercial carrier (e.g., FedEx, UPS, etc.). Further, it is noted that the information provided can take many other formats within the scope of the present invention.

Figure 23:
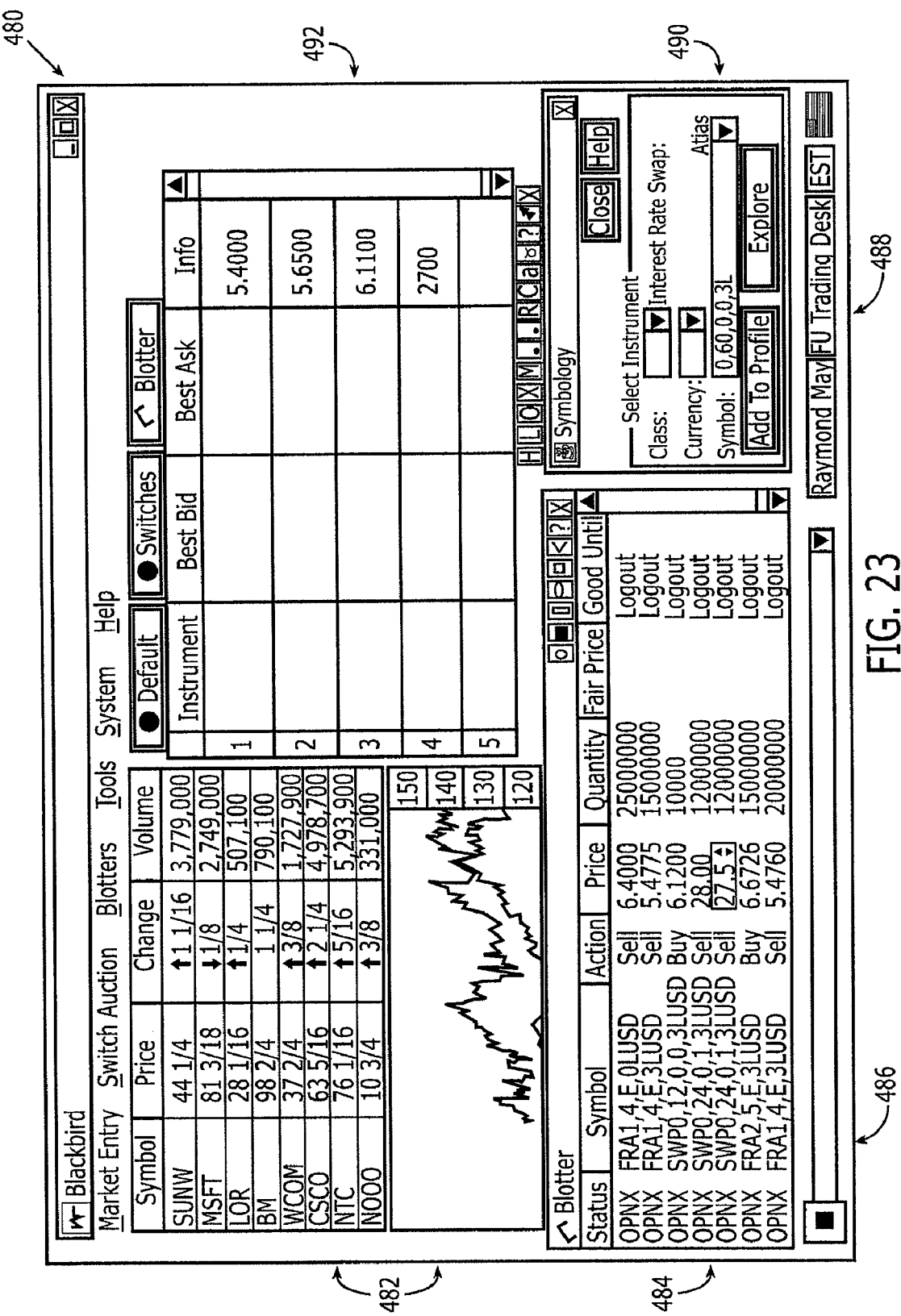
FIG. 23 is an example of a main screen interface in accordance with an embodiment of the present invention.

While the various interfaces to system 10 have been described herein as individual windows, it is noted that multiple windows can be integrated to form a main screen 480 with multiple frames, as illustrated in FIG. 23. For instance, a tools area 482 provides the trader with a set of customized tools including graphs, market quotes, bond prices to yield converters, pricing tools, and MarketSheet™ applets. A service area 484 provides various interfaces as described above on a temporary basis. A message center 486 displays the most recent RFP, RFS, Chat and administrative messages, and is preferably configured as a drop-down window to display multiple current messages. A status bar 488 displays user status information. A workspace area 490 provides for the entering of data into dialog boxes in a non-intrusive manner, plus the execution of the data function. A warehouse area 492 stores the most commonly used interfaces in a tabbed format, allowing the trader to retain their preferred set-up between sessions. Accordingly, the main screen 480 provides enhanced functionality by integrating multiple interfaces in a single window.

IV. Operation

As described above, the system 10 comprises the central processing center 12 that may includes multiple servers connected via an Internet-protocol network to the individual counterparties trader workstation 20 which may be desktop computer workstations. Because of the open system architecture of the system 10, the present invention may run within the context of the internet browser 72 on the user's existing desktop computer 20. The desktop computer 20 preferably includes an operating system platform for which a Java-enabled Internet browser is available.

In order to provide the counterparties with anonymous credit preference based trading capability for a wide range of financial contracts where each side enters into a long-term contract with the others, the present invention is designed to be flexible enough to reflect several different measures of credit risk, as generally described below with reference to FIG. 24.

Figure 24:
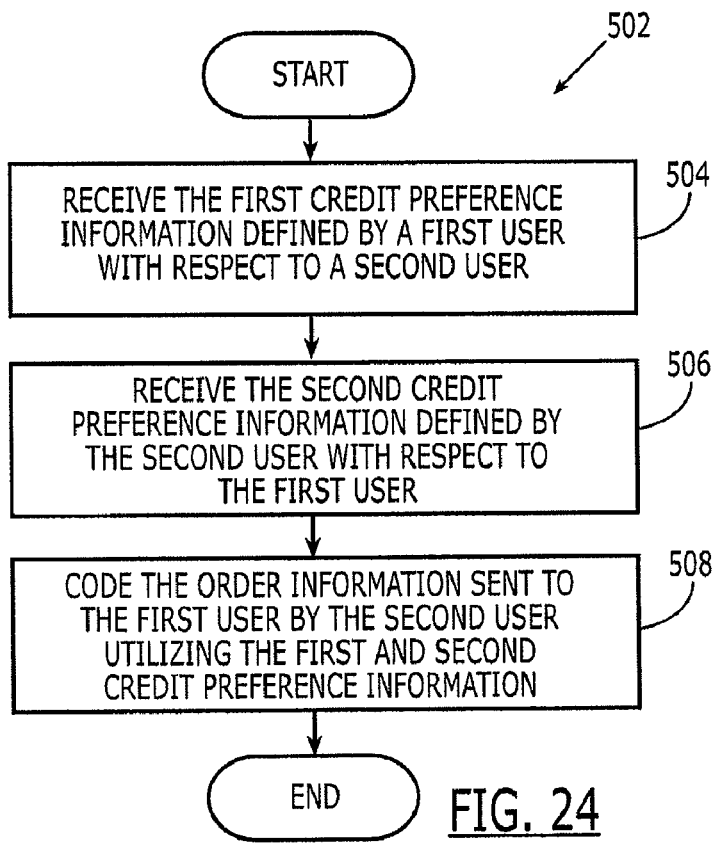
FIG. 24 is a flowchart of the credit preference feature in accordance with an embodiment of the present invention.

With reference to flowchart 502 of FIG. 24, each business unit (counterparty) provides the group server 32 (FIG. 2) with detailed credit preferences for each potential counterparty business unit's legal entity. The group server 32 then distributes the credit preference information in an anonymous format to the trader workstation 20 which uses the credit preferences of each active business unit (counterparty) in the system 10 to prescreen the user's market orders (bids and offers) against the other counterparties' market orders. Thus, the credit preference module 76 (FIG. 3) of each trader receives the credit preference information defined by a first user with respect to a second user, as indicated by block 504. The credit preference module 76 then receives the credit preference information from the second user with respect to the first user, as indicated in block 506. The credit preference module 76 then determines which orders, on which financial instruments, and with which counterparties, the user can deal. This information is coding on the posted prices utilizing color or another notational method such as symbols, as indicated in block 508.

In accordance with an aspect of the present invention, the prescreening is a complex check to determine whether two particular counterparties will accept each other for a particular class of financial instrument, for a-particular amount and for a particular maturity. This is a risk equivalent measurement, and is more than a simple yes/no preauthorization matrix. More specifically, because each financial instrument has different credit qualities, it is possible for a particular counterparty to be willing to accept another particular counterparty for one type of financial instrument but not another. Furthermore, it is also possible that a particular counterparty may accept the other for a particular financial instrument, but only for a certain length of time (i.e., maturity). The system 10 may also allow the user to accept counterparties for different amounts at different maturities.

It is further noted that the system 10 divides counterparties into legal entities. These legal entities may be further divided into individual business units. So, for example, Bank A may be a legal entity (counterparty) and Bank A might have a different business unit in three different cities (e.g., Tokyo, London, and New York). In this example, the counterparty credit information is available at the legal entity level. So, for instance, if Bank A wishes to allow each of its business units to set their own credit preferences for other counterparties, then these credit preferences will be listed against the legal entity level of all the other business units. In other words, business unit A at Bank A can not say it will trade with desk A of Bank B but not desk B of Bank B. The system 10 allows business units within a particular legal entity to inherit the credit preferences from other business units in the same legal entity family, if so desired.

Once each business unit has inputted their individual credit preferences, this credit preference information is maintained locally at the inputting trader workstation 20, and transmitted to the group server 32 of the central processing center 12. The central processing center then transmits a vector of encoded credit preference data to each user logged on, wherein the data represents that preferences of the user to the other legal entities and the preferences of other business units to that user's legal entity for the affected instrument classes. The encoded vector of credit preference data is accessible to any of the trader workstations 20 in the system 10; however, the sensitive credit information of other counterparties is not available.

Once the user has inputted his/her business unit's credit preferences, the user is then able to select or filter messages on which financial instruments and in which currencies the user wishes to receive updates, messages and prompts. The filters can be selected via the user preference interface 148 to customize the order information presented by the command center interface 130. This screening capability is provided to the user in order to prevent him from being overwhelmed by, and to sort through, the possibly thousands of different financial instruments in up to or more than 14 different currencies that the system 10 has the ability to handle. Once these filters have been inputted into the system 10, the user is able to view trading information on the currencies and financial instruments that have been selected for the user. This means, for example, that if the user has selected US dollars only, then the user will preferably not see information on the Japanese Yen financial instruments which are in the system 10 for trading.

Once the trading preferences of the user have been entered into the system 10, the user can proceed with trading. The user then activates the fully customizable, re-sizable market entry interface 250. The market entry interface 250 enables the user to input many different financial instruments which the user is interested in trading on one screen, and have any number of profiles wherein each profile is a collection of markets or a collection of financial contracts in the system 10.

A preferred embodiment accomplishes the inputting and referencing of the various financial instruments through the use of a unique set of symbols referred to as symbology. The symbology of the present invention is based on a concept of subject based addressing whereby the user creates a symbol to uniquely define any one of many complex financial instruments. The symbol denotes the financial instrument's parameters and attributes. The standardized symbology of the present invention is designed such that the users of the system 10 will recognize the meaning of the symbol when the users view the symbols. To further help the users understand which financial instrument they are trading, a symbol may be identified by the full subject name, an alias (in the case of the most commonly traded instruments), or a unique identifier (e.g., such as a numeric code). In order to help the users use the symbology to properly express the financial instruments they want to trade, the system 10 allows the users to construct symbols utilizing the symbol construction interface 270 (FIG. 13).

Figure 25:
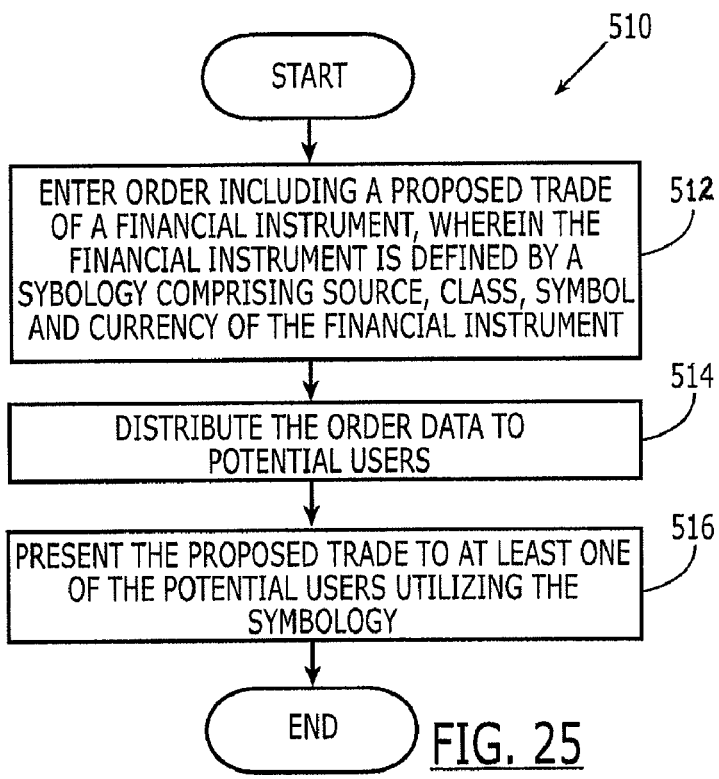
FIG. 25 is a flowchart of the subject based addressing feature in accordance with an embodiment of the present invention.

The symbology of the present invention, as described below and as illustrated flowchart 510 of FIG. 25, enables a user to input data including a proposed trade of a financial instrument, wherein the financial instrument is advantageously defined by symbology comprising a source field, a class field, a symbol field and a currency field, as indicated by block 512. This abbreviated format for identifying a financial instrument can then be easily transmitted to other users within the system 10, as indicated by block 514. At the receiving users trader workstation 20, the proposed trade can be viewed by the traders utilizing the symbology, as indicated by block 516. By defining the financial instrument using the symbology of the present invention, the users can exchange a small amount of data that is translatable into a detail description of a financial instrument that is relatively complex. This reduces communication and processing overhead of the system 10 and simplifies the user's efforts.

Once the orders have been inputted via the symbology, the market entry interface 250 displays the best bid and best offer for each instrument, as well as the sum quantity available to trade at the best price and other relevant information. The order information (i.e., the bids and offers for each instruments is coded with the relevant credit preferences, unless several prices are currently posted at the same price but have different credit status, in which case the market detail interface 302 should be used. This is significantly different from some prior art systems which only show the best dealable price. The system 10 presents the best price, irrespective of credit preferences or credit limits. From market entry interface 250, it is possible for the user to execute a trade directly if the credit preferences of both parties permit. The user may also place a passive order from the market entry interface 250.

The user also has the option of activating a market detail interface 302 which enables a user to see the complete picture (i.e., depth) of all the orders (e.g., bids and offers) available on a particular financial instrument, coded with credit preference information. The market entry interface 250 and the market detail interface 302 not only display the best bid and offer, but each individual order in the system 10 individually. Through the market entry interface 250 and the market detail interface 302, the user is provided the ability to select not just the best bid or offer, but any bid and offer in the system 10. This is important because for credit reasons, the viewing counterparty may not wish, or may not be allowed to, trade a particular bid or offer. This means that the best bid or offer in the system 10 is not necessarily the best bid or offer available to that counterparty.

The credit preference information entered in the system 10 by each user, as described above, is used by both the central processing center 12 and the transmitting business unit servers 18 to prescreen the bids and offers, and to market orders in the system 10 before they are viewed at the trader workstations 20 of the respective client sites 14. The sensitive credit preference that indicates which counterparties are acceptable, and under what terms, is preferably maintained at the transmitting trader workstation 20 and the central processing center 12. The other viewing users do not receive or have access to the credit information of the other users. At the receiving business unit's server 18, a check is performed to determine whether the receiving client site 14 will accept the particular bid or offer from the transmitting legal entity. The summary and relevant data is transferred in an encrypted form to trader workstations 20. The credit check may be re-performed at the time of a transaction by the central site 14 and/or the central processing center 12.

The credit preference screening of the present invention enables the display of all passive orders in the system 10 and their relevant credit status with regard to the viewer on both the market entry interface 250 and the market detail interface 302 as follows: 1) green—this means that the viewer accepts the posting counterparty, and the posting counterparty accepts the viewing counterparty; 2) yellow—this means that the viewing counterparty will accept the posting counterparty but that the posting counterparty will not accept the viewer; 3) red—that the viewer will not accept the poster; 4) blue—that the bid or offer being looked at is the viewer's own; 5) white—used on the market entry interface 250 to denote when two or more orders are placed at the same price but with different credit preferences. The use of color coding enables the system 10 to preserve the anonymity of the users while still enabling the viewing business units to receive credit information about the bids and offers they are viewing. In the event the user is color blind, the system 10 also includes the option to display small symbols next to each price to indicate the relevant credit status to the viewer.

If the viewer wants to trade a green bid or offer, then the system will permit this to be executed right away. Further, if the active counterparty to the transaction, that is, the viewer who hit the bid or lifted the offer, chooses to execute the full size of the amount on offer or bid and there are no more orders at the same price, the viewer will be prompted with the ability to ask the other counterparty to do more. This will-do-more feature is preferably restricted to a predetermined time-limit in which the receiver of the request must respond. The receiver of the request may agree to accept the increased quantity (or part of the increased quantity) at the previously agreed to price or the request will lapse. The will-do-more feature may be repeated as many times as the users desire. The will-do-more feature does not necessarily check credit preferences once this process has begun because both users know the identities of each other at this point. This forces the users to take responsibility for further credit approval beyond the point of the initial trade amount.

If the order being viewed by the user is yellow, then the viewer will accept the poster but the poster will not accept the viewer. In this case, the system 10 enables the viewer to send a credit override message to the poster of the bid or offer whereby the sender of the credit override reveals his/her identity to the poster and asks the poster to reconsider whether or not the poster will do the requested trade with the viewer. In this case, the user which sent the credit override will be identified to the poster, but at no time will the sender of the credit override find out who they revealed themselves to. If the poster chooses to accept the credit override, then the poster may also choose to impose additional credit requirements on the viewer in order to accept the transaction. These additional credit requirements would be in the form of a standard mutual put clause in the confirmation of the trade. The viewer will have the opportunity to either accept or decline the additional credit requirements. The credit override function does not in anyway change the credit preferences which each user previously input into the system 10. The credit override is preferably on a per-transaction basis.

If the bid or offer viewed by the viewing trader is in red, then the viewer will not accept the poster. Despite the fact that the viewer knows he/she will not accept the poster, the viewer does not know which among the counterparties he/she will not accept is the poster. The viewer is thus not able to identify the poster, preserving the anonymity of the system 10. If the poster does not activate the credit override, then no trade will be able to take place.

If the bid or offer displayed is in blue, then the order is the poster's own order. The system 10 does not prevent different users within the same client site 14 from trading with each other.

From both the market entry interface 250 and the market detail interface 302, it is also possible for the user to send a request-for-price message to the other counterparties that are interested in the requested financial instrument. The request-for-price enables a user to anonymously broadcast to other interested market participants.

Figure 26:
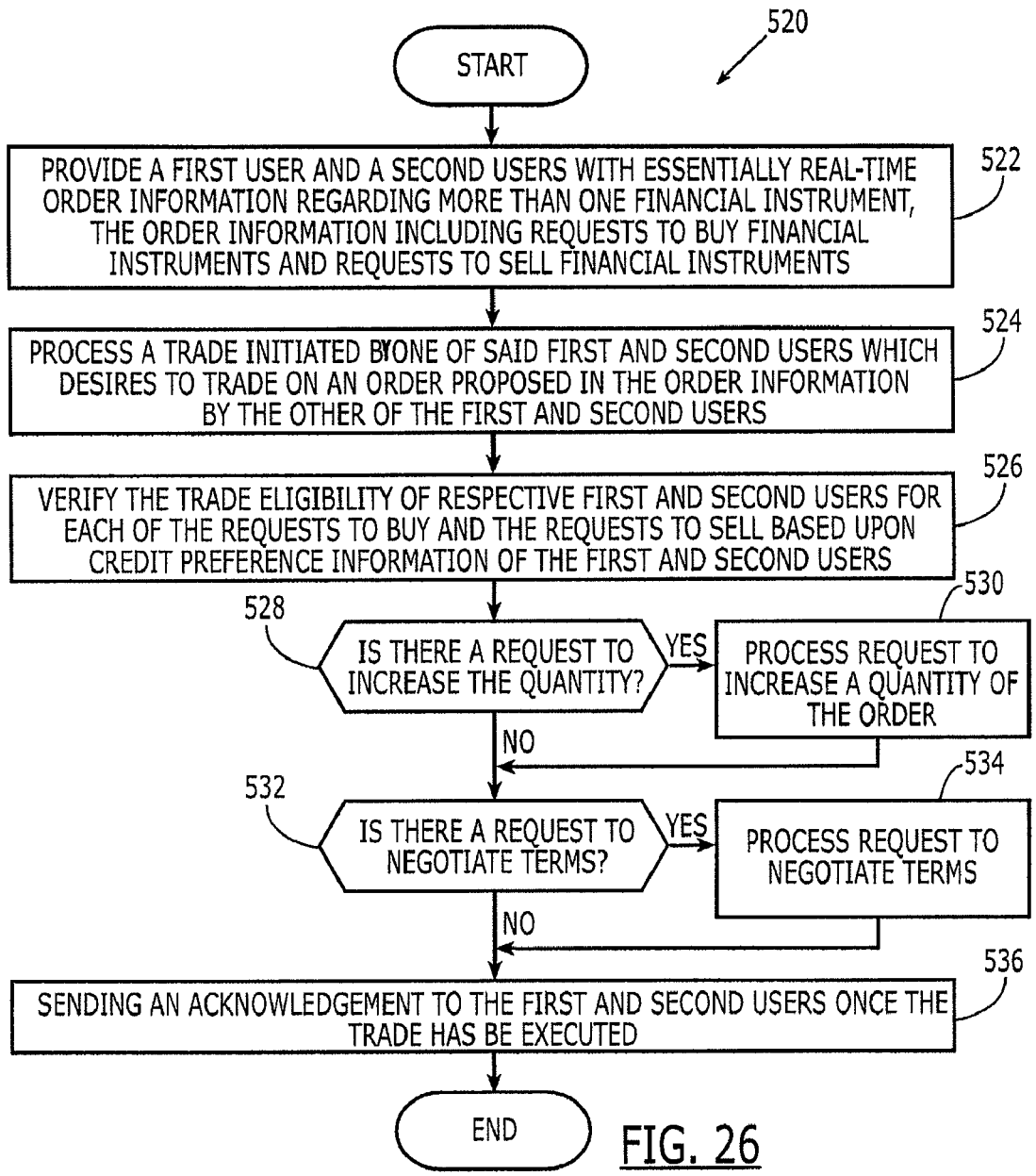
FIG. 26 is a flowchart of the execution of a trade in accordance with the embodiment of the present invention.

With reference to FIG. 26, a flowchart 520 generally describes the steps of a trade. Initially, the first user and the second user are provided with essentially real-time order information regarding more than one financial instrument typically via the market entry interface 250, as indicated by block 522. The order information preferably includes a request to buy or sell a financial instrument such as an OTC derivative. At block 524, one of the first or second users initiates the trading process on an order selected from the order information provided by the other of the first or second users. The credit preference information of each user is then used to verify the trade eligibility of the first and second users with regard to one another based on the selected order, as indicated by block 526. One or both of the first and second users are then able to request an increase in the quantity of the order, as indicated by block 528. If an increase is requested, the request is process at block 530. Alternatively, if there is no request to increase the quantity at block 528, it is then determined that block 532 if there is a request to negotiate terms of the order, and more particularly, the noncommercial terms of the financial instrument underlying the order. If there is a request to negotiate terms by one of the users, then the request is processed at block 534. If there is not a request to negotiate terms, then an acknowledgment is sent to both users signifying the execution of the trade, as indicated by block 536.

Figure 27A:
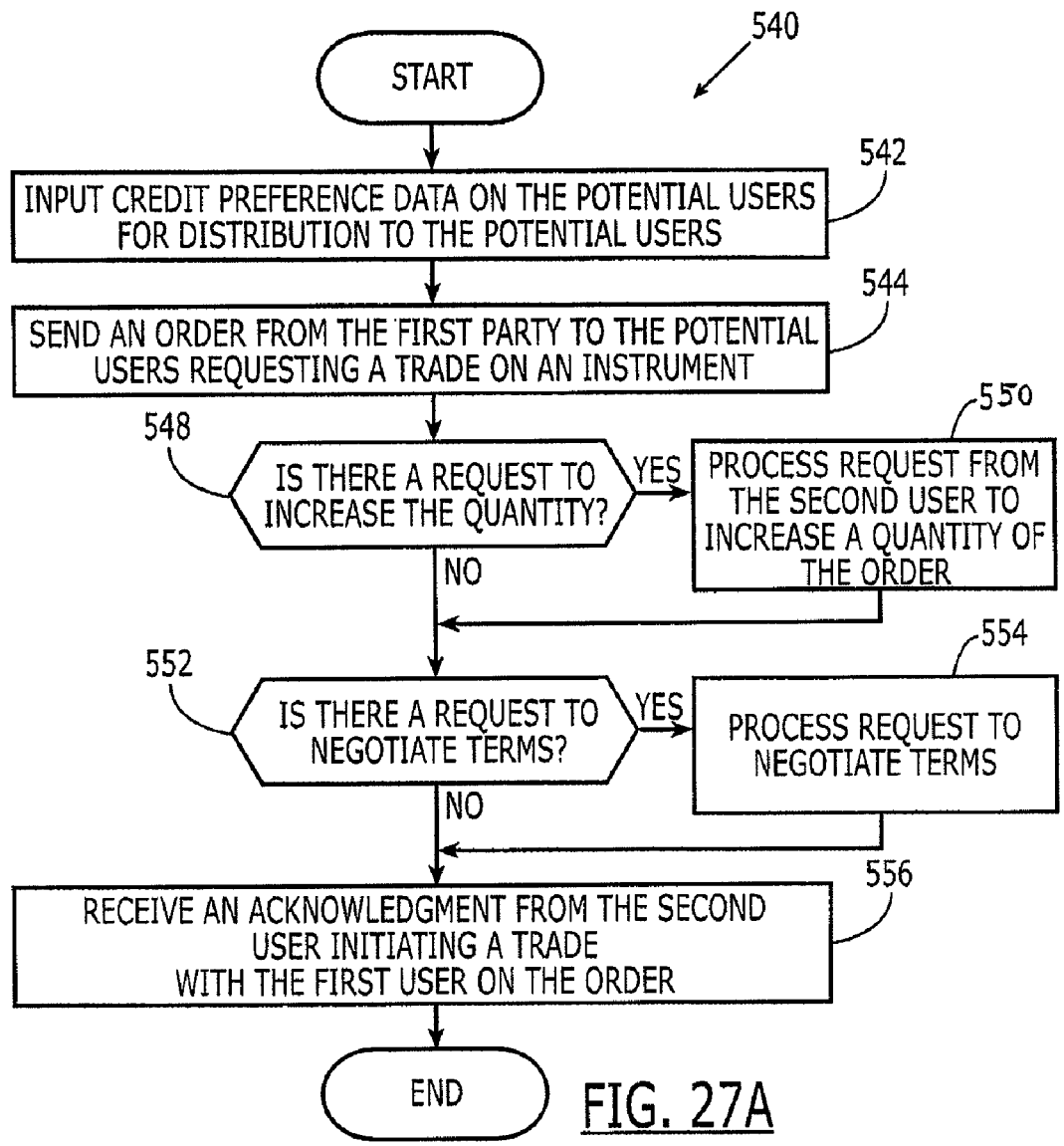
FIGS. 27A and 27B are flowcharts of a trade execution from the perspective of the user posting the order and the user acting on the order, respectively, and in accordance with an embodiment of the present invention.

The trade process as described above with reference to FIG. 26 can also be described from the perspective of the first and second users. For instance, with reference to FIG. 27A, a flowchart 540 generally depicts the steps of a trade from the perspective of a passive user. Initially, at block 542, the credit preferences of the user are inputted and distributed to the other users for effectuating the credit preference screening. At block 544, the user sends an order to system 10 for distribution to the other users requesting a trade on a financial instrument. The user that placed the order must then wait for another trader to hit or lift the passive order, thereby executing the trade. Both parties to the trade will receive an execution notification which will allow one or both users to request an increase in quantity, as determined by block 548. If this request is received from the party hitting or lifting the passive order, the first user accepts, denies, or amends the requested increase, as indicated by block 550. If there is no request to increase a quantity, then it is determined at block 552 whether there is a request to negotiate terms of the financial instrument. This feature allows the users to change the default values for the non-commercial terms of the financial contract, as indicated by block 554. Next, the first user will receive an acknowledgment of the execution of the trade with the second trader, as indicated by block 556.

Figure 27B:
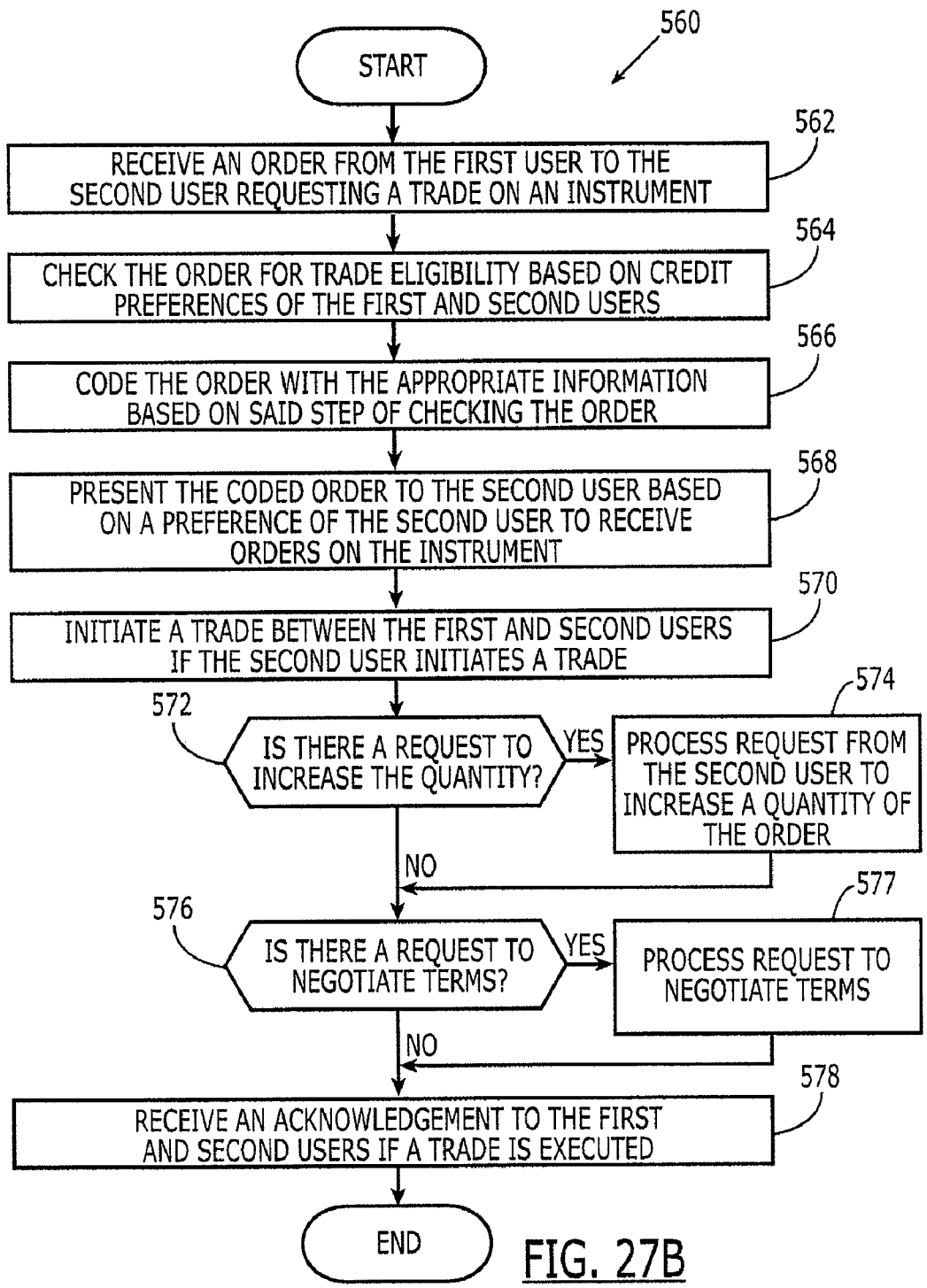

With reference to FIG. 27B, a flowchart 560 generally illustrates the steps of a trade from the perspective of the active user that lifted or hit the passive order. At block 562, the second user receives an order from the first user requesting a trade on a financial instrument. The order is then checked for trade eligibility based upon the credit preferences of the first and second users, as indicated by block 564. The order is coded with appropriate credit information based upon the credit check, as indicated by block 566. The coded order is then presented to the second user based upon a preference or filter set by the second user to view orders of the present instrument, as indicated by block 568. The second user then initiates a trade by lifting or hitting the order, as indicated by block 570. In block 572, it is determined if there is a request to increase quantity. If there is not a request to increase quantity, then the request is processed at block 574. If there is not a request to increase the quantity, then it is determined at block 576 whether there is a request to negotiate terms of the financial instrument. This feature allows the users to change the default values for the non-commercial terms of the financial contract, as indicated by block 577. Next, an acknowledgment is received by the first and second users indicating that the trade has been executed, as indicated by block 578.

Figure 28:
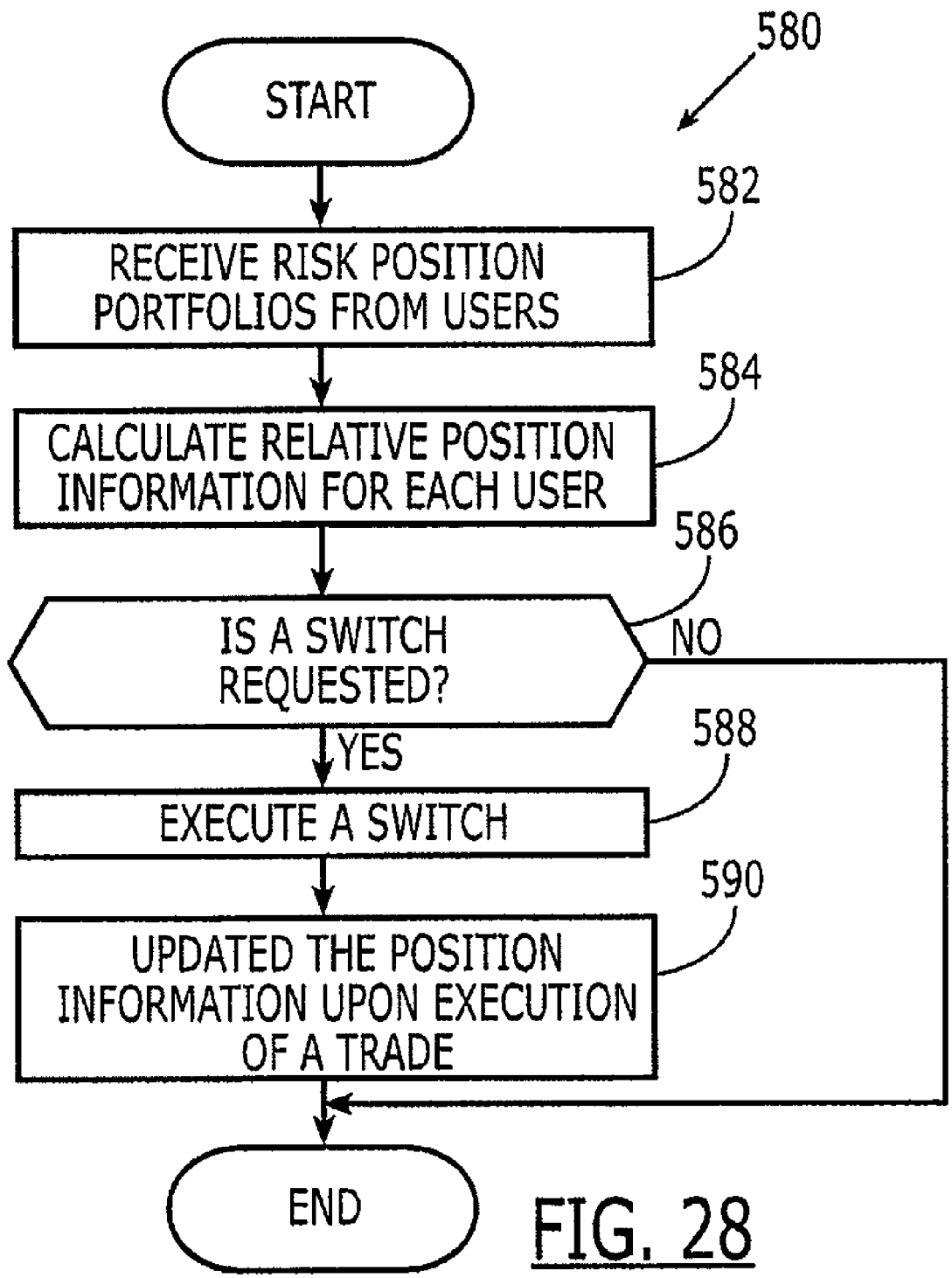
FIG. 28 is a flowchart of the position discovery feature in accordance with an embodiment of the present invention.

Another feature of the present invention is the position discovery as illustrated by a flowchart 580 of FIG. 28. At block 582, risk position portfolios are received from the users of system 10. At block 584, relative position information is calculated for each user so that each user may be presented with possible trading combinations for their portfolios, and combinations of their portfolios against positions from the other users. The possible trading combinations are coded with credit preference information in accordance with the present invention. It is then determined at block 586 if a switch is requested. If a switch is not requested, then the process ends. However, if a switch is requested at block 586, then a switch is executed at block 588. The execution of the switch is performed in substantially the same manner as any other trade, as described above. Upon execution of the switch, the position information of each party to the switch is automatically updated to reflect the switch, as indicated by block 590.

A blotter is provided to enable the user to keep track of all the orders he/she has inputted into the market. The blotter is preferably a screen whereby once it is activated, it displays all the outstanding orders a user has in the system. The blotter enables the user to monitor all his/her outstanding orders in many different instruments conveniently in one place. Preferably, there are two types of blotters. The first is the outstanding order blotter 320 which offers several functions to the user for managing his/her orders, such as the ability to change the price, or size of an order. This is accomplished through the use of dials on the windows which enable the user to quickly dial up or down the price without needing to cancel and then re-submit the order. This edit process shields the user from the complexity of order management regarding changed orders. This also prevents the user from accidentally having duplicate or no orders in the system 10. The outstanding order blotter 320 also enables the user to quickly suspend (or refer) all of his/her active orders in the system 10, and then re-input them one by one or delete them as necessary. Yet further, the outstanding order blotter enables the trader to cancel one or all of his orders. The second type of blotter is the historical order blotter 330. From the historical order blotter, it is possible for the user to view all of his/her previously executed trades and the respective status, as well as those that have been canceled.

In order to address the needs of interest rate swap traders and portfolio managers, the system 10 may include a function known as the switch engine. The switch engine is implemented by a switch interface 400 and enables the user to input an entire portfolio of interest rate reset risks into the system 10, and then view out into the future for an unlimited time horizon on a daily basis. In a preferred embodiment, the user inputs the size (in millions) and the direction (receiving or paying) of the reset risks portfolio into the system 10 on a wide range of the most common interest indices (i.e., 1 month US dollar libor, 3 month US dollar libor, 1 month DEM libor, etc.). The portfolio can be input either directly through the portfolio interface 380 (FIG. 21), or by uploading a file with the required information. Once the information has been input into the system 10, the user is then asked to confirm the input. Once this information has been confirmed, the user then has the ability to anonymously look at his/her interest rate reset risk position relative to all other counterparties who have inputted such information to determine based upon credit preferences, which trades are available to him/her in the system 10 to off-set his/her interest rate reset risks. Once the user has located these trades, the user can then anonymously send a request-for-switch to the other counterparties in an attempt to initiate a trade.

Figure 29:
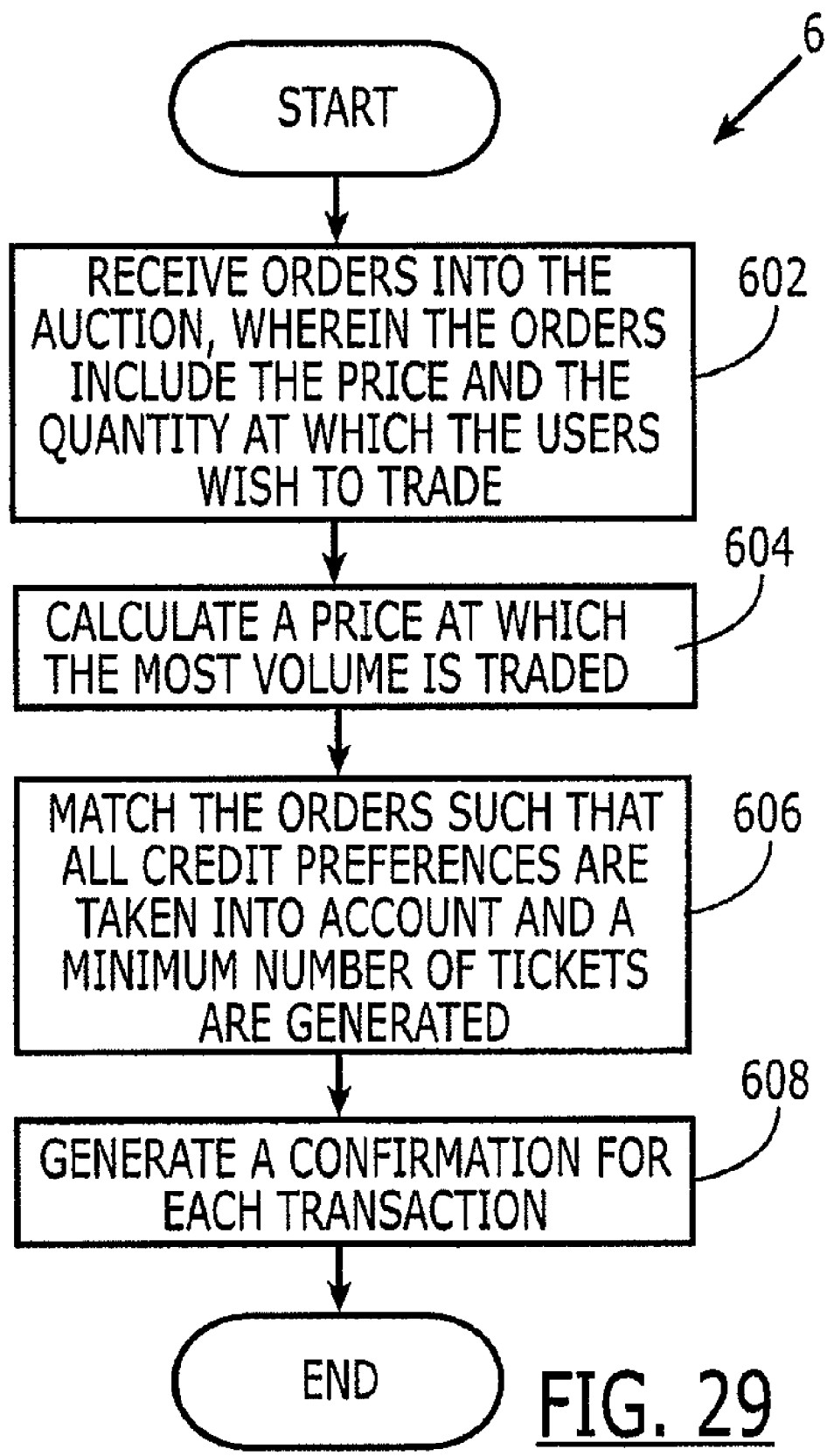
FIG. 29 is a flowchart of the auction feature in accordance with an embodiment of the present invention.

The system 10 further provides the functionality to permit the trading of various financial instruments via an auction function, as generally illustrated in a flowchart 600 of FIG. 29. The system performs what is referred to herein as a two way Dutch auction with credit preferences. In this auction methodology, users submit orders into the auction giving both the price and the quantity at which they wish to trade, as indicated by block 602. The auction process then begins by calculating the price at which the most volume is traded, as indicated by block 604. This is called the auction-price. The auction-price is a fair price at which all transactions will be completed. In this calculation, the credit preferences of the various counterparties are not yet taken into account. At block 606, the system matches up orders such that all credit preferences are taken into account such that the minimum number of tickets are generated. The better submitted prices have priority, and all orders at the auction-price are preferably filled in proportion to each other. In a preferred embodiment of the auction feature, the auction process could be conducted a few times a day in order to maximize liquidity. The system also offers the functionality to enable the user to trade forward rate agreement switches and other switch products in an auction environment similar to that described previously.

The system then automatically generates a confirmation for each transaction and sends it electronically via email, fax, or another means to the counterparties of each executed transaction, as indicated by block 608. This unique confirmation process has been designed to use a standard and consistent format for all financial instruments.

Figure 30:
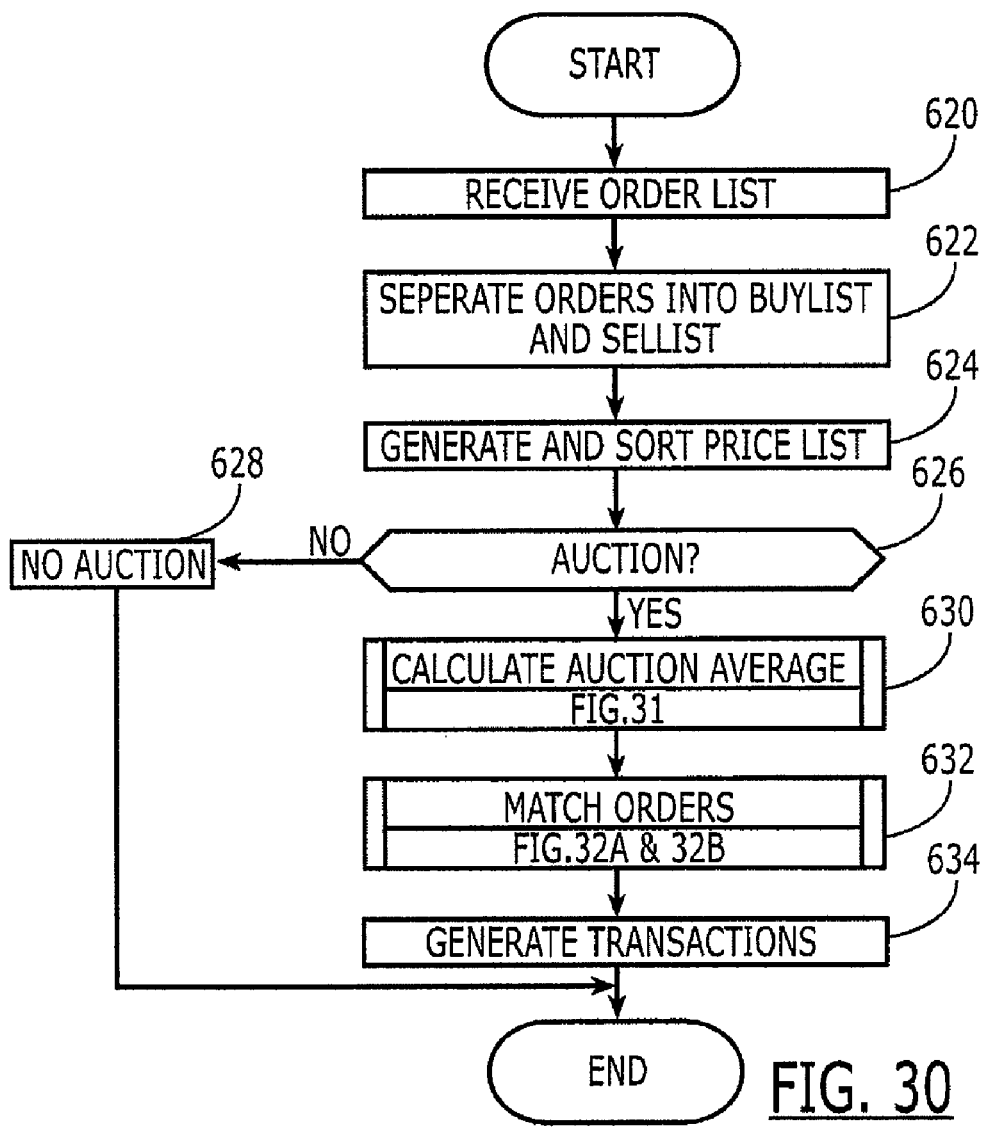
FIG. 30 is a detailed flowchart of the auction feature in accordance with an embodiment of the present invention.

At this point, a more detailed description of the operation and functionality of the auction mechanism 34 is provided. With reference to FIG. 30, the auction mechanism 34 initially receives an order list from those traders wishing to participate in an auction, as indicated by block 620. The orders within the order list are separated into a BuyList and SellList, as indicated by block 622. At block 624, a price list is generated and sorted from highest price to lowest price. It is then determined at block 626 whether an auction will take place by determining if the price list is empty. If the price list is empty, then no auction takes place, as indicated by block 628. If the price list is not empty, then the average auction price is calculated, as indicated by block 630, and as described in greater detail with reference to FIG. 31. Next, the orders are matched such that the minimum number of tickets are generated, taking into account the credit preferences of all parties, as indicated by block 632, and as described in greater detail with reference to FIGS. 32A and 32B. Once the orders have been matched, a settlement list is generated, representing the execution of transactions via the option, as indicated by block 634.

Figure 31:
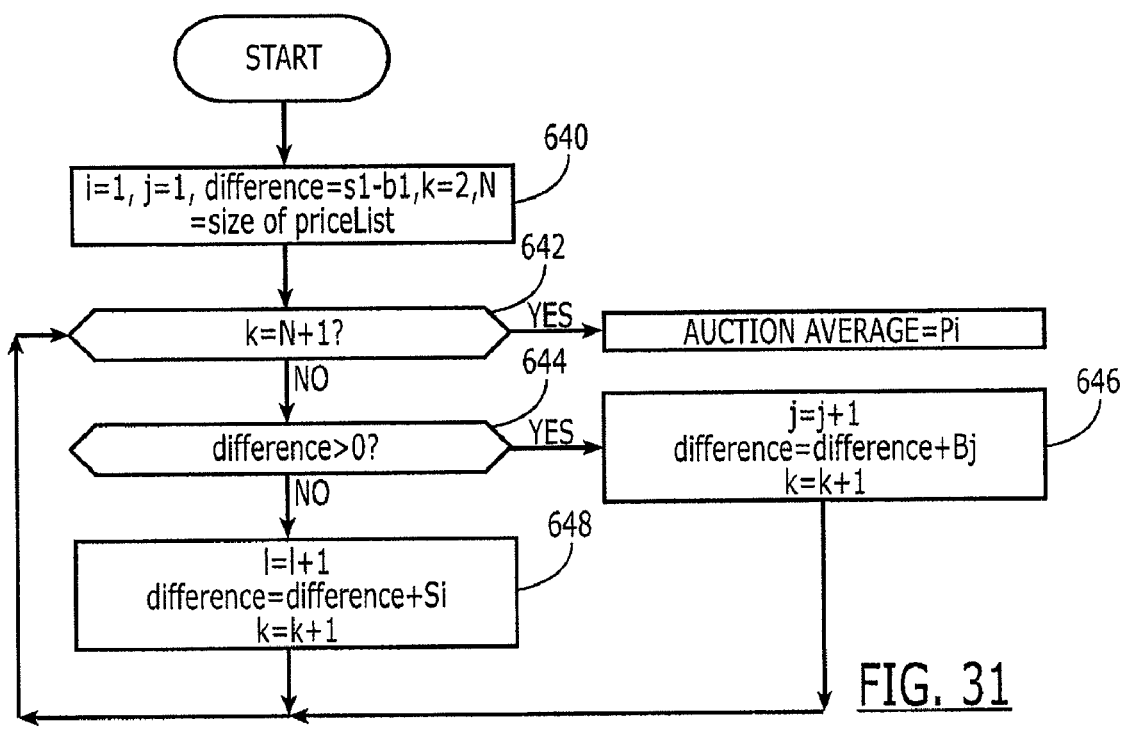
FIG. 31 is a flowchart of the calculation of the average auction price in accordance with an embodiment of the present invention.

With reference to FIG. 31, the average auction price is calculated. In particular, beginning at block 640, the initial parameters are established, such as i=1, j=1, difference equal s1−b1, k=2, and N=size of price list. In addition, the total amount in the BuyList is $B_i$, and the total amount in the SellList is $S_{N−i+1}$. Next, it is determined at block 642 whether k=N+1. If so, then the average auction price is $P_j$. If it does not, then it is determined at block 644 whether difference is greater than 0. If it is, then parameter j is set to j=j+1, the parameter difference is set to difference=difference+$B_j$, and the parameter k is set to k=k+1, as indicated by block 646. If not, then the parameter i is set to equal i=i+1, the parameter difference is set to difference=difference+$S_i$, the parameter k is set to k=k+1, as indicated by block 646. The steps of block 642-648 are repeated until determination is made at block 642 that k=n+1.

Figure 32:
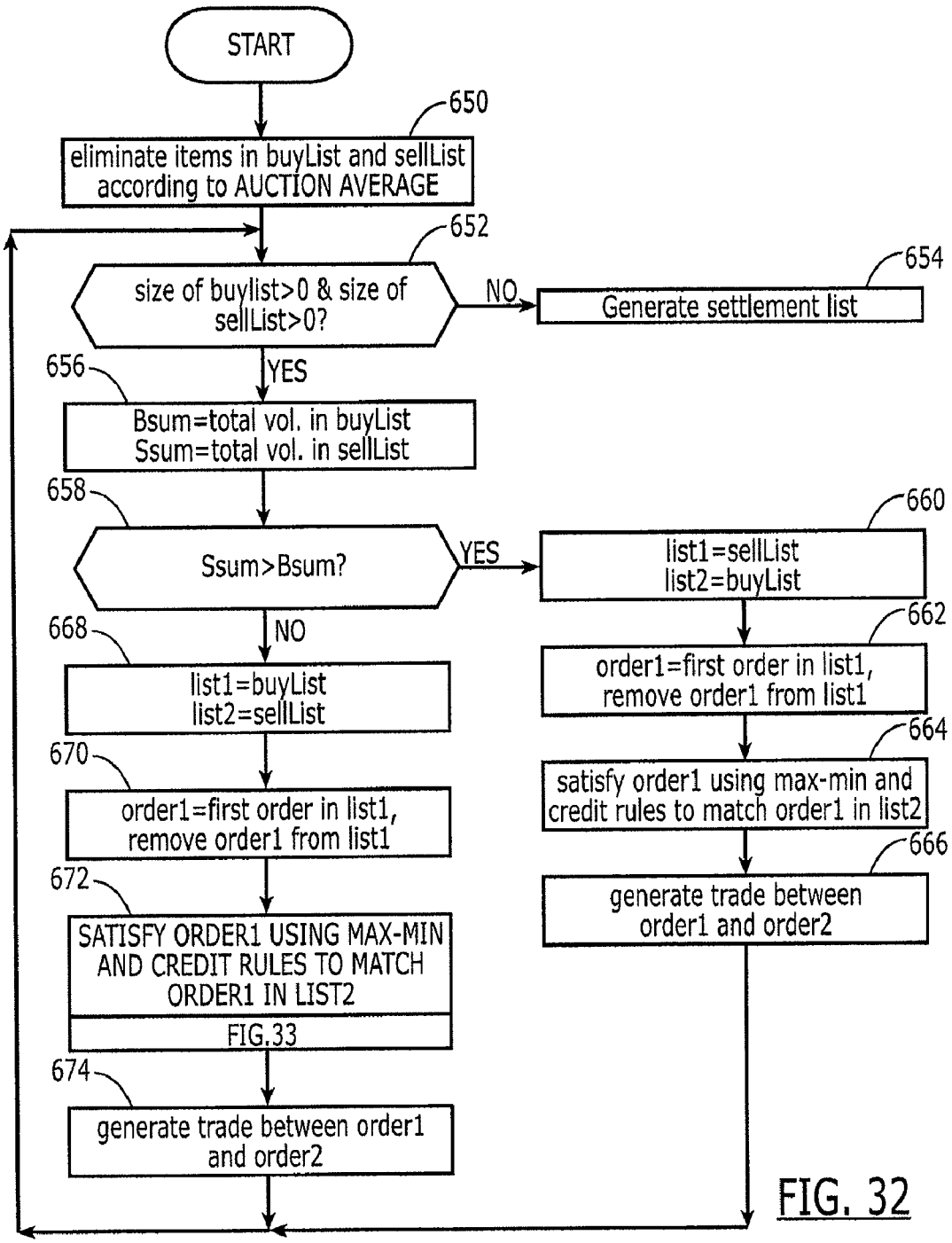
FIG. 32 is a flowchart of the matching performed in an auction in accordance with an embodiment of the present invention.

With reference to FIG. 32, the step of matching orders in an auction is described in greater detail. In particular, items in the BuyList and SellList are eliminated according to the average auction price, as indicated by block 650. It is then determined at block 652 whether the size of BuyList is greater than zero and the size of SellList is greater than zero. If one or the other is not greater than zero, then the settlement list is generated, as indicated by block 654. If both the BuyList and SellList are greater than zero, then the parameter Bsum is set to equal the total volume in BuyList and Ssum is set to equal the total volume in SellList, as indicated by block 656. It is then determined at block 658 if Ssum is greater than the Bsum. If it is, then the parameter list1 is set to equal SellList and the parameter list2 is set to equal BuyList, as indicated by block 660. Next, the order1 parameter is set to equal to the first order in listi and order1 is removed from list1, as indicated by block 662. The maximum/minimum and credit rules are then applied to search the BuyList for matching order2, as indicated by block 664. A matching order2 is located and a trade is generated between order1 and order2, as indicated by block 666. If at block 668 it is determined that Ssum is not greater than Bsum, then parameter list1 is set to equal BuyList and list2 is set to equal SellList, as indicated by block 668. Next, order1 is set to equal the first order in list1 and order1 is removed from List1, as indicated by block 670. Next, list2 is searched in order to find a match to order1 using the maximum-minimum rule and the credit preferences associated with the orders, as indicated by block 672 and described in greater detail with reference to FIG. 33. A trade is then generated between order1 and order2, as indicated by block 674.

Figure 33:
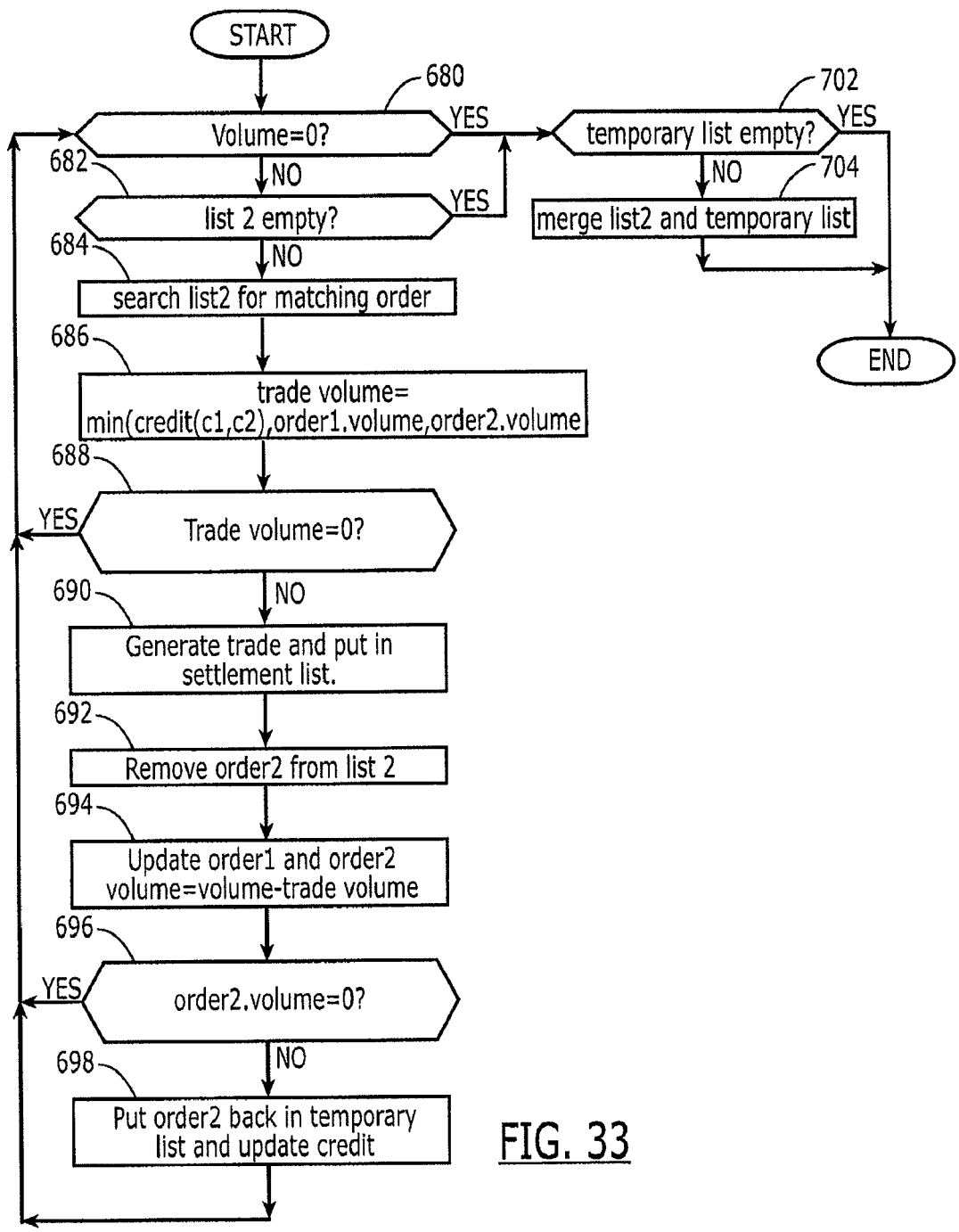
FIG. 33 is a flowchart of the validation of a resulting order in an auction in accordance with an embodiment of the present invention.

With reference to FIG. 33, the application of the maximum-minimum rule and credit rules satisfying an order are described in greater detail. Initially, it is noted that the parameter volume is equal to the volume of an order, and more particularly, of order1. At block 680, it is initially determined whether the parameter volume equals 0 for order1. If it does not equal zero, then it is determined at block 682 whether list2 is empty. If list2 is not empty, then list2 is searched for the first matching order, as indicated by block 684. Once a matching order is located, then the volume traded will equal to the minimum as defined by the credit preferences of either party, the volume of order1, or the volume of order2, as indicated by block 686. It is then determined if the trade volume is 0, as indicated by block 688. If the trade volume is 0, then the process begins again at block 680. If the trade volume is not equal to 0, then a trade is generated and placed in the settlement list, as indicated by block 690. In addition, at block 692, order2 is removed from list2. Next, the volume of order1 and order2 are updated by setting the respective volumes to the previous volumes minus the trade volume, as indicated by block 694. It is then determined at block 696 if the volume of order2 is equal to zero. If it is not, then order2 is placed back in a temporary list and a credit of the parties placing order1 and order2 are updated, as indicated by block 698. Once the volume of order1 is determined to be zero, then it is determined at block 702 whether the temporary list is empty. If it is not, then the temporary list is merged with the BuyList, as indicated by block 704. Subsequently, the process ends.

Figure 34:
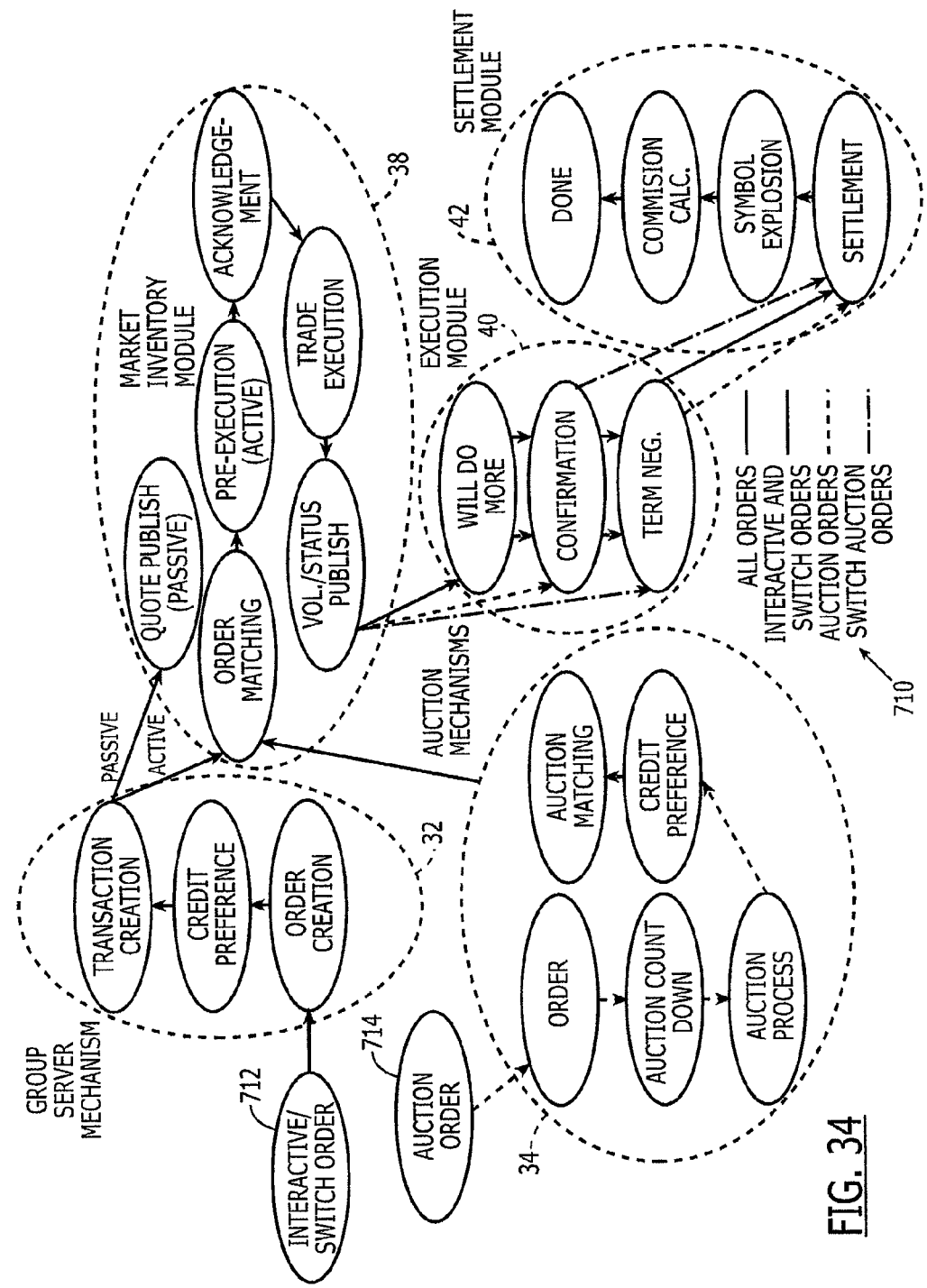
FIG. 34 is a process flow diagram illustrating operations and functionality of the central processing center in accordance with an embodiment of the present invention.

The operation of the central processing center 12 is now generally described with reference to FIG. 34 which functionally depicts the group server mechanism 32, the auction mechanism 34 and switch mechanism 35, the market inventory module 38, the execution module 40, and the settlement module 42. A legend 710 is provided to the denote the flow of the different orders, interactive and switch orders, auction orders, and switch auction orders, between the group server mechanism 32, the auction mechanisms 34, the market inventory module 38, the execution module 40, and the settlement module 42. Beginning with the interactive/switch order generated by the user at one of the trader workstations 20, the central processing center 12 initially receives the interactive/ switch order 712 at the group server mechanism 32. At the group server mechanism 32, an order record is created, the credit preferences of the users are checked to assure the trade conforms to the current credit preferences of the users, and a transaction order is created. If the order is passive, then it flows through to the market inventory module 38 where is it distributed to the trader workstations 20 for viewing via respective market detail interfaces 302 of the users logged on the system 10. If the order is active, then it flows through to the market inventory module 38 where order matching occurs if the order is a part of an auction, and pre-execution of the order also occurs. Pre-execution may include, for instance, a backend credit check to ensure up to date credit preferences and to accommodate complex checks. Further, in a manner that is transparent to the users, the market inventory module 38 requires the trader workstations 20 of the respective users that are a party to the trade to respond with an acknowledgement to assure that there has been no loss of communication or that one of the users has not logged off. Upon receiving the acknowledgement, the market inventory module 38 executes the trade and then publishes the updated volume and status to the users logged on to the system 10 for viewing via respective command center interface 130 of the users.

Next, the execution module 40 will, upon request of one of the users that were a party to the trade, enables the quantity of the trade to be increased via the will-do-more feature. This will typically be the case unless the full quantity of the instrument is transacted. Otherwise, the execution module will initiate the confirmation process which includes an opportunity for either of the users that were a party to the trade to enter into term negotiations.

The order then flows through to the settlement module 42 which initiates the settlement process. The settlement module allows for symbol explosion by the users to view the exact terms of the contract. Further, a settlement module calculates the commission based upon the order which ends the process, thereby noting the end of the order execution process.

In the case of an auction, an auction order 714 received by the auction mechanism 34. The auction module 34 enables auction and switch auction functionality of the present invention. The auction module initially receives the auction orders 714 a from a plurality of users during a countdown to the actual auction time. Once the auction time has arrived and the auction orders have been submitted, the auction mechanism 34 performs the auction matching with credit preferences of the users taken into account. The auction matching performed by the auction mechanism 34 is in accordance with the present invention, that is, the auction is based on a fair price and executed for a maximum volume traded with a minimum number of tickets generated. From the auction mechanism 34, once the counterparties have been matched the market inventory server essentially treats the resulting auction orders as though it would an interactive/switch order 712. In particular, the market inventory module 38 perform order matching, pre-execution, acknowledgement, trade execution and volume/data publishing.

The auction order 712 is then delivered to the execution module 40. At the execution module 40, an auction order and a switch auction order are traded slightly different. For instance, an auction order may be increased in quantity by one of the users that is a party to the auction order via the will-do-more. On the other hand, switch auction orders do not make use of this feature, but will go directly to the confirmation process. Further, where auction orders may also have their non-commercial terms negotiated using the term negotiation feature, switch auction orders will flow to the settlement module 42 directly after confirmation. Both auction orders and switch auction order are then received by the settlement module 42 which performs essentially the same operations to the auction order as it does to an interactive/switch order 712. Specifically, the settlement order 42 provides similar explosion and commissioned calculations which complete the order process.

In the drawings and specification, there have been disclosed typical preferred embodiments of the invention and, although specific terms are employed, they are used in a generic and descriptive sense only and not for purposes of limitation, the scope of the invention being set forth in the following claims.

That which is claimed is:

1. A system for risk portfolio management that enables switches between traders, comprising:
    means for receiving risk position portfolios associated with respective said traders;
    means for calculating relative positions for each of said risk position portfolios associated with respective said traders;
    means for presenting said relative positions to each of said traders, wherein said means for presenting is configured for determining potential switches between said traders of said relative positions of said traders based upon at least one of credit preferences of a first trader and credit preferences of a second trader, and wherein said means for presenting is further configured for presenting to said first trader at least one offsetting position in said risk position portfolio of said first trader which corresponds with a position in said risk position portfolio of said second trader representing one of said potential switches; and
    means for executing a switch between at least two of said traders based on said relative positions, wherein the switch comprises an exchange of (a) at least one financial instrument defining a financial risk position for (b) at least one financial instrument defining an opposite financial risk position.

2. The system of claim 1, wherein said means for presenting is further configured for determining said potential switches between said traders of said relative positions of said traders based upon said credit preferences of said first trader and said credit preferences of said second trader, and wherein said means for presenting is further configured for presenting to said first trader at least one possible switch combination of said potential switches with said second trader based on respective said risk position portfolios associated with said first and second traders.

3. The system of claim 1, wherein said means for presenting is further configured for presenting to said second trader at least one offsetting position in said risk position portfolio of said first trader which corresponds with a position in said risk position portfolio of a second trader, wherein said at least one offsetting position is one of said potential switches determined based at least in part upon credit preferences of said first trader.

4. The system of claim 1, wherein said at least one offsetting position is visually encoded to reflect switch eligibility based on at least one of said credit preferences of said first trader and credit preferences of said second trader when presented to said first trader.

5. The system of claim 1, wherein said means for receiving comprising means for uploading risk position portfolio data by file transfer.

6. The system of claim 1, further including means for updating said risk position portfolio in real-time.

7. The system of claim 1, wherein respective said risk position portfolios comprise interest rate reset risk.

8. The system of claim 1, wherein said risk position portfolio includes position data for at least 90 days forward.

9. The system of claim 1, wherein said risk position portfolio includes position data for at least 2 days forward.

10. The system of claim 1, wherein said risk position portfolio includes data for at least two financial instruments.

11. The system of claim 1, wherein respective said risk position portfolios comprise bonds.

12. The system of claim 1, wherein said means for presenting said relative positions presents said relative positions anonymously to respective said traders.

13. A method for risk portfolio management that enables switches between traders, comprising:
- receiving, at a central processing center of a electronic trading system, risk position portfolios associated with respective said traders;
- calculating, via said central processing center, relative positions for each of said risk position portfolios associated with respective said traders;
- anonymously presenting said relative positions to each of said traders, wherein anonymously presenting said relative positions comprises:
  - determining, via said central processing center, potential switches between said traders of said relative positions of said traders based upon at least one of credit preferences of a first trader and credit preferences of a second trader; and
  - presenting to said first trader at least one offsetting position in said risk position portfolio of said first trader which corresponds with a position in said risk position portfolio of said second trader representing one of said potential switches; and
- executing, via said central processing center, a switch between at least two of said traders based on said relative positions, wherein the switch comprises an exchange of (a) at least one financial instrument defining a financial risk position for (b) at least one financial instrument defining an opposite financial risk position.

14. The method of claim 13, further comprising determining said potential switches between said traders of said relative positions of said traders based upon said credit preferences of said first trader and said credit preferences of said second trader.

15. The method of claim 13, further comprising presenting to said second trader at least one offsetting position in said risk position portfolio of said first trader which corresponds with a position in said risk position portfolio of the second trader, wherein said at least one offsetting position is one of said potential switches determined based at least in part upon credit preferences of said first trader.

16. The method of claim 13, further comprising visually encoding said at least one offsetting position presented to said first trader to reflect switch eligibility based on at least one of said credit preferences of said first trader and said credit preferences of said second trader.

17. The method of claim 13, wherein receiving risk position portfolios associated with respective said traders comprises receiving risk position portfolio data uploaded by file transfer.

18. The method of claim 13, further comprising updating said risk position portfolio in real-time.

19. The method of claim 13, further comprising:
- receiving a request to initiate execution of a switch of said at least one offsetting position between said first trader and said second trader;
- applying the credit preferences of said first trader for said second trader and any credit preferences of said second trader for said first trader to confirm the current switch eligibility of the requested switch of said at least one offsetting position between said first trader and said second trader; and
- if the switch is confirmed to currently be an eligible switch between said first trader and said second trader based upon said credit preferences of said first trader for said second trader, executing the requested switch.

20. The method of claim 13, further comprising:
- receiving said credit preferences from at least said first trader using a first trader node of a plurality of trader nodes configured to be connected to a communications network, wherein said credit preferences comprise at least two credit preferences of said first trader; and
- storing said credit preferences of said first trader for said second trader in a computer-readable storage medium.

21. The method of claim 20, wherein receiving said credit preferences from at least said first trader comprises receiving at least one of the credit preferences selected from the group of binary, line binary, and complex credit preferences.

22. The method of claim 20, wherein receiving said credit preferences from at least said first trader comprises receiving at least two of the credit preferences selected from the group of binary, line binary, and complex credit preferences.

23. The method of claim 20, wherein receiving said credit preferences from at least said first trader comprises receiving at least one each of the credit preferences of the group of line binary credit preferences and complex credit preferences.

24. The method of claim 20, wherein receiving said credit preferences from at least said first trader comprises receiving an upload of an electronic file from the first trader, wherein the electronic file comprises said credit preferences of said first trader.

25. A computer-readable storage medium having computer-readable program code embodied in said medium for causing a switch between traders in response to execution by a computer of a central processing center of an electronic trading system, said computer-readable program code comprising:
- a first computer program instruction code configured to receive risk position portfolios associated with respective said traders;
- a second computer program instruction code configured to calculate relative positions for each of said risk position portfolios associated with respective said traders;
- a third computer program instruction code configured to anonymously present said relative positions to each of said traders, wherein said third computer program instruction code is further configured to determine potential switches between said traders of said relative positions of said traders based upon at least one of credit preferences of a first trader and credit preferences of a second trader, and wherein said third computer program instruction code is further configured to present to said first trader at least one offsetting position in said risk position portfolio of said first trader which corresponds with a position in said risk position portfolio of said second trader representing one of said potential switches; and
- fourth computer program instruction code configured to execute a switch between at least two of said traders based on said relative positions, wherein the switch comprises an exchange of (a) at least one financial instrument defining a financial risk position for (b) at least one financial instrument defining an opposite financial risk position.

26. The computer-readable storage medium of claim 25, wherein said third computer program instruction code is further configured to determine said potential switches between said traders of said relative positions of said traders based upon said credit preferences of said first trader and said credit preferences of said second trader.

27. The computer-readable storage medium of claim 25, wherein said third computer program instruction code is further configured to present to said second trader at least one offsetting position in said risk position portfolio of said first trader which corresponds with a position in said risk position portfolio of the second trader, wherein said at least one offsetting position is one of said potential switches determined based at least in part upon credit preferences of said first trader.

28. The computer-readable storage medium of claim 25, wherein said third computer program instruction code is further configured to visually encode said at least one offsetting position presented to said first trader to reflect switch eligibility based on at least one of said credit preferences of said first trader and said credit preferences of said second trader.

29. The computer-readable storage medium of claim 25, wherein said first computer program instruction code is further configured to receive risk position portfolio data uploaded by file transfer.

30. The computer-readable storage medium of claim 25, further comprising fifth computer program instruction code configured to update said risk position portfolio in real-time.

31. The computer-readable storage medium of claim 25, further comprising:
    fifth computer program instruction code configured to receive a request to initiate execution of a switch of said at least one offsetting position between said first trader and said second trader;
    sixth computer program instruction code configured to apply the credit preferences of said first trader for said second trader and any credit preferences of said second trader for said first trader to confirm the current switch eligibility of the requested switch of said at least one offsetting position between said first trader and said second trader; and
    computer program instruction code configured to execute the requested switch if the switch is confirmed to currently be an eligible switch between said first trader and said second trader based upon said credit preferences of said first trader for said second trader.

32. The computer-readable storage medium of claim 25, further comprising:
    fifth computer program instruction codes configured to receive said credit preferences from at least said first trader using a first trader node of a plurality of trader nodes configured to be connected to a communications network, wherein said credit preferences comprise at least two credit preferences of said first trader; and
    sixth computer program instruction code configured to store said credit preferences of said first trader for said second trader in a computer-readable storage medium.

33. The computer-readable storage medium of claim 32, wherein said fifth computer program instruction code is further configured to receive at least one of the credit preferences selected from the group of binary, line binary, and complex credit preferences.

34. The computer-readable storage medium of claim 32, wherein said fifth computer program instruction code is further configured to receive at least two of the credit preferences selected from the group of binary, line binary, and complex credit preferences.

35. The computer-readable storage medium of claim 32, wherein said fifth computer program instruction code is further configured to receive at least one each of the credit preferences of the group of line binary credit preferences and complex credit preferences.

36. The computer-readable storage medium of claim 32, wherein said fifth computer program instruction code is further configured to receive an upload of an electronic file from the first trader, wherein the electronic file comprises said credit preferences of said first trader.

\* \* \* \* \*